(12) United States Patent
Tokita et al.

(10) Patent No.: US 7,836,464 B2
(45) Date of Patent: Nov. 16, 2010

(54) DISK HOLDER, DISK ALIGNMENT MECHANISM AND DISK DRIVE

(75) Inventors: Keiji Tokita, Tokyo (JP); Kouji Seki, Tokyo (JP); Kazuya Tanaka, Tokyo (JP); Yoshio Suzuki, Tokyo (JP); Shouichiro Kokubo, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 12/618,550

(22) Filed: Nov. 13, 2009

(65) Prior Publication Data

US 2010/0088713 A1 Apr. 8, 2010

Related U.S. Application Data

(62) Division of application No. 10/551,684, filed as application No. PCT/JP2004/004677 on Mar. 31, 2004.

(30) Foreign Application Priority Data

| Mar. 31, 2003 | (JP) | ............................. 2003-096626 |
| Mar. 31, 2003 | (JP) | ............................. 2003-096863 |
| May 23, 2003 | (JP) | ............................. 2003-146943 |

(51) Int. Cl.
*G11B 17/028* (2006.01)
(52) U.S. Cl. ..................................................... 720/703
(58) Field of Classification Search .............. 369/30.55; 720/703, 614, 675, 612
See application file for complete search history.

(56) References Cited

U.S. PATENT DOCUMENTS

| 5,768,240 A | * | 6/1998 | Hiraga ......................... 720/656 |
| 5,841,744 A | * | 11/1998 | Menke et al. ............. 369/30.85 |
| 5,982,720 A |   | 11/1999 | Takemasa et al. |
| 6,744,704 B1 | * | 6/2004 | Funaya et al. ............. 369/30.85 |
| 6,817,022 B1 |   | 11/2004 | Taniguchi et al. |
| 2003/0021194 A1 |   | 1/2003 | Nakamichi |

FOREIGN PATENT DOCUMENTS

| EP | 0 84 726 | 12/1998 |
| EP | 0 936 609 | 8/1999 |
| EP | 0 980 072 | 2/2000 |
| JP | 11-232753 | 8/1999 |
| JP | 11-273219 | 10/1999 |
| JP | 11-306637 | 11/1999 |
| JP | 2000-048459 | 2/2000 |
| JP | 2000-048465 | 2/2000 |
| JP | 2000-195134 | 7/2000 |
| JP | 2001-101754 | 4/2001 |
| JP | 2002-237124 | 8/2002 |
| WO | 02/25655 | 3/2002 |

* cited by examiner

*Primary Examiner*—Allen T Cao

(57) ABSTRACT

A disk holder, disk alignment mechanism and disk drive employing same that for permitting accurate alignment of a disk are provided.

The disk drive comprises a disk holder 10 that comprises a plurality of holder plates 11 that individually hold disks D, a drive unit 62 that plays back disks D, disk selectors 41A and 41B that form a space above and below a desired disk D by raising and lowering the holder plates 11, and a drive base 60 that moves the drive unit 62 into the space that is formed as a result of raising and lowering the holder plates 11. Disk hold links 17 and 18 comprising catches 17a and 18a respectively that engage with and disengage from the center hole of disk D are provided on the holder plates 11 such that the disk hold links 17 and 18 are able to turn, and a disk hold arm 16 that allows the disk hold links 17 and 18 to turn is provided so as to be able to perform a sliding movement.

11 Claims, 106 Drawing Sheets

OPEN DURING PLAYBACK   OPEN DURING LOADING
WHEN THE SIXTH HEIGHT IS THE REFERENCE
HEIGHT WHEN DISK IS INSERTED

WHEN A HEIGHT BETWEEN THE FIRST HEIGHT AND THE SIXTH HEIGHT IS THE REFERENCE HEIGHT WHEN DISK IS INSERTED

FIG. 34
(A)
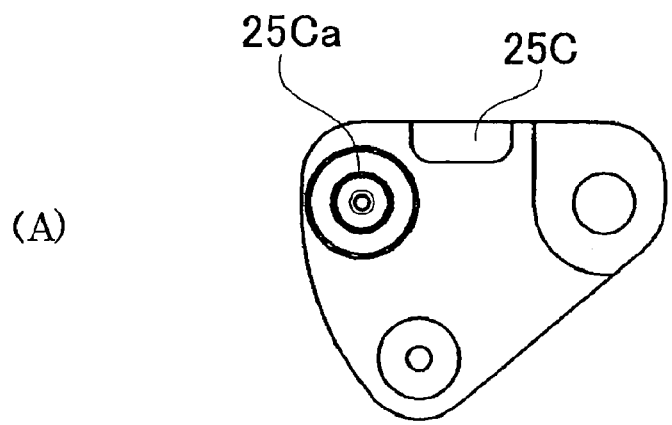
(B)
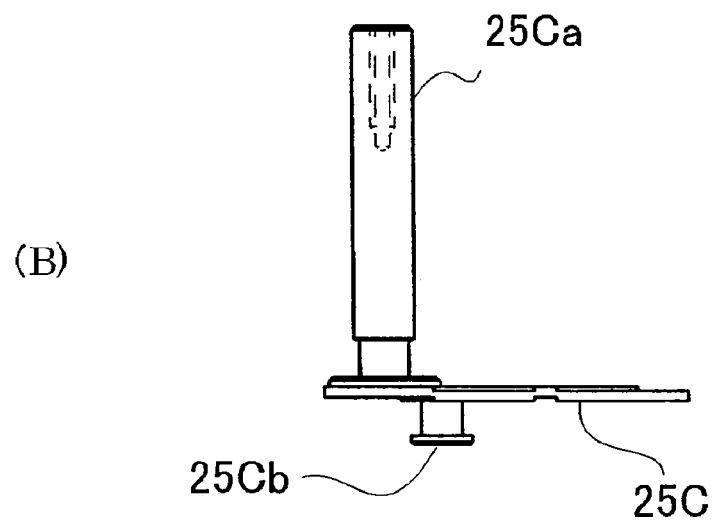

FIG.35
(A) 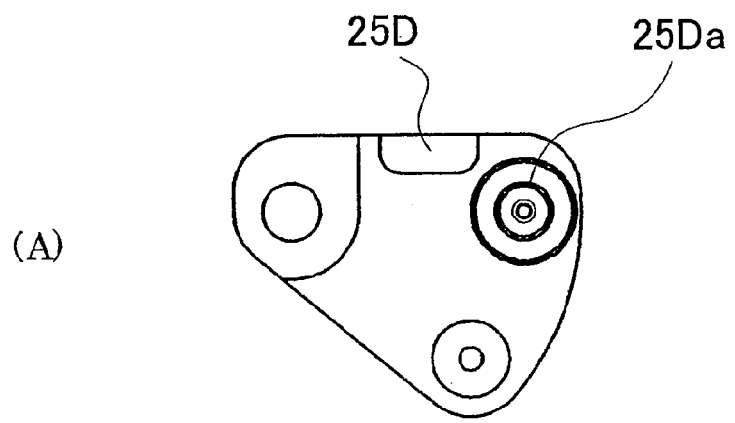
(B) 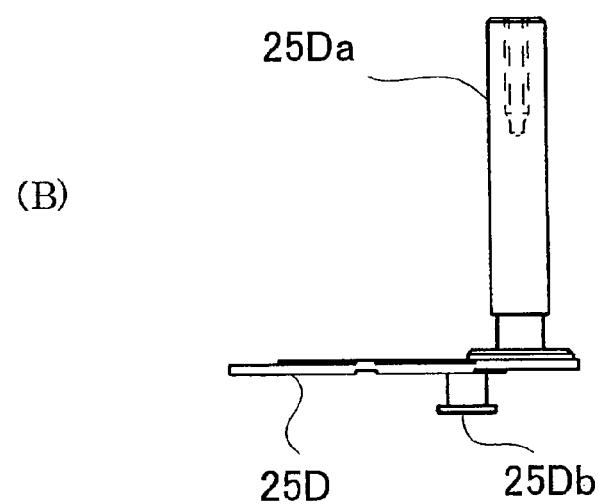

(A)  (B)

FIG.66
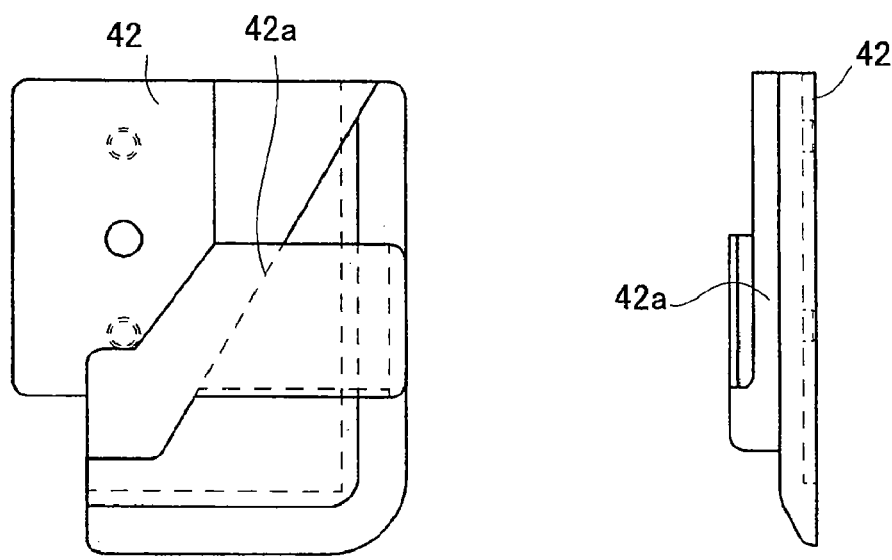
(A)
(C)
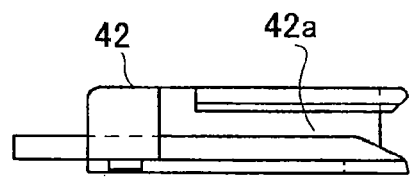
(B)

(A)　　　　　　　　　(B)

(A)   (B)

FIG.92
(A)
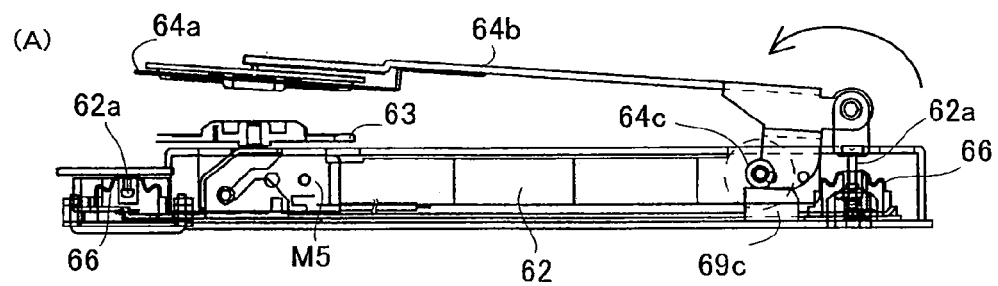
(B)
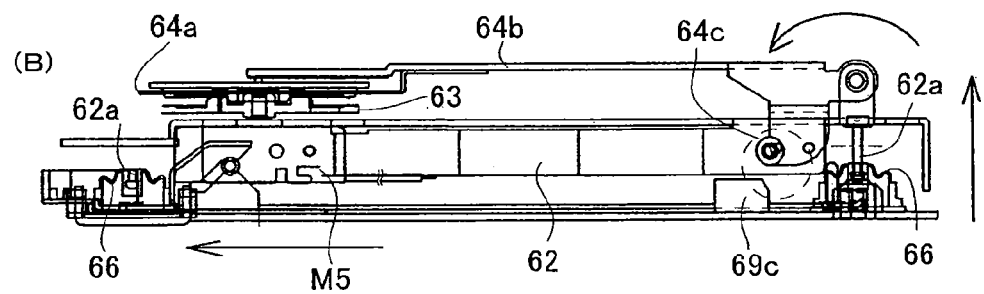
(C)
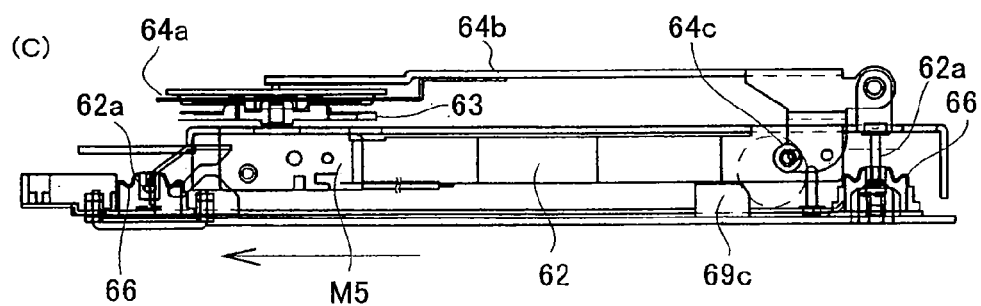

FIG.95

FLOW OF OPERATION DURING DISK LOADING

| | OPERATION CONTENT | WORKING MOTOR | | | | |
|---|---|---|---|---|---|---|
| | | M1 | M2 | M3 | M4 | M5 |
| 1 | DRIVE CHASSIS UNIT IS MOVED INTO A POSITION PERMITTING THE SELECTION OF A HOLDER PLATE FOR STORING THE LOADED DISK | | O | | | |
| 2 | DISK SELECTOR IS MOVED TO OPEN THE HOLDER PLATE TO A WIDTH PERMITTING THE INSERTION OF THE LOADING ROLLER (HOLDER OPEN POSIITON (1)). | O | | | | |
| 3 | DRIVE CHASSIS UNIT IS RAISED TO A HEIGHT THAT ALLOWS DISK LOADING | | O | | | |
| 4 | LOADING ROLLER IS MOVED TOWARD THE DISK HOLDER TO ENTER A STATE ALLOWING A DISK TO BE HELD | O | | | | |
| | SHUTTER IS OPENED | | | | | |
| | CATCHES OF DISK HOLD LINKS ARE CLOSED AND DISK HOLDER IS OPENED FURTHER SO THAT THE CENTER OF THE HOLDER PLATE DOES NOT OBSTRUCT THE DISK INSERTION PATH (HOLDER OPEN POSITION (2)). | | | | | |
| 5 | DISK IS DETECTED BY SENSOR AND LOADING ROLLER IS ROTATED IN THE LOADING DIRECTION (FORWARD DIRECTION) | | | | O | |
| 6 | THE COMPLETE STORAGE OF THE DISK IN THE DISK HOLDER IS DETECTED AND ROTATION OF THE LOADING ROLLER IS STOPPED | | | | | |
| 7 | SHUTTER IS CLOSED AND DISK IS HELD ON HOLDER PLATE | O | | | | |
| 8 | DRIVE CHASSIS UNIT IS MOVED SO THAT THE HOLDER PLATE IS AT THE HEIGHT OF THE INITIAL POSITION | | O | | | |
| 9 | LOADING ROLLER AND DISK STOPPER ARE REMOVED FROM DISK | O | | | | |
| | DISK SELECTOR IS REMOVED FROM HOLDER PLATE TO ESTABLISH A STATE WHERE THE HOLDER PLATE IS BONDED | | | | | |
| 11 | DRIVE CHASSIS UNIT MOVES TO HEIGHT OF INITIAL POSITION | | O | | | |

FIG.96

FLOW OF OPERATION DURING DISK PLAYBACK

| | OPERATION CONTENT | WORKING MOTOR | | | | |
|---|---|---|---|---|---|---|
| | | M1 | M2 | M3 | M4 | M5 |
| 1 | DRIVE CHASSIS UNIT IS MOVED INTO A POSITION PERMITTING THE SELECTION OF A HOLDER PLATE FOR STORING THE DISK TO BE PLAYED BACK | | O | | | |
| 2 | DISK SELECTOR IS MOVED TO OPEN THE HOLDER PLATE TO A WIDTH PERMITTING THE INSERTION OF THE LOADING ROLLER (HOLDER OPEN POSITION (1)). | O | | | | |
| | LOADING ROLLER AND DISK STOPPER ARE MOVED TO HOLD DISK | | | | | |
| | CATCHES OF DISK HOLD LINKS ARE CLOSED AND DISK IS REMOVED BY OPENING THE DISK HOLDER FURTHER (HOLDER OPEN POSITION (2)). | | | | | |
| | DISK HOLDER IS OPENED FURTHER (HOLDER OPEN POSITION (3)) TO INTRODUCE DRIVE BASE | | | | | |
| | TURNTABLE IS INTRODUCED BELOW DISK BY ROTATING THE DRIVE BASE | | | | | |
| | CLAMPER RING IS CLOSED WHILE LIFTING UP DRIVE UNIT AND DISK IS CHUCKED ON TURNTABLE | | | | | |
| | LOADING ROLLER AND DISK STOPPER ARE MOVED TO A POSITION OF NON-CONTACT WITH THE DISK | | | | | |
| | FLOATING BLOCK IS RELEASED TO PUT DRIVE UNIT IN FLOATING STATE | | | | | |
| 3 | PICKUP IS FED TO INNER CIRCUMFERENCE BY THREAD MOTOR | | | | O | |
| 4 | DISK IS PLAYED BACK THROUGH ROTATION | | | | | O |

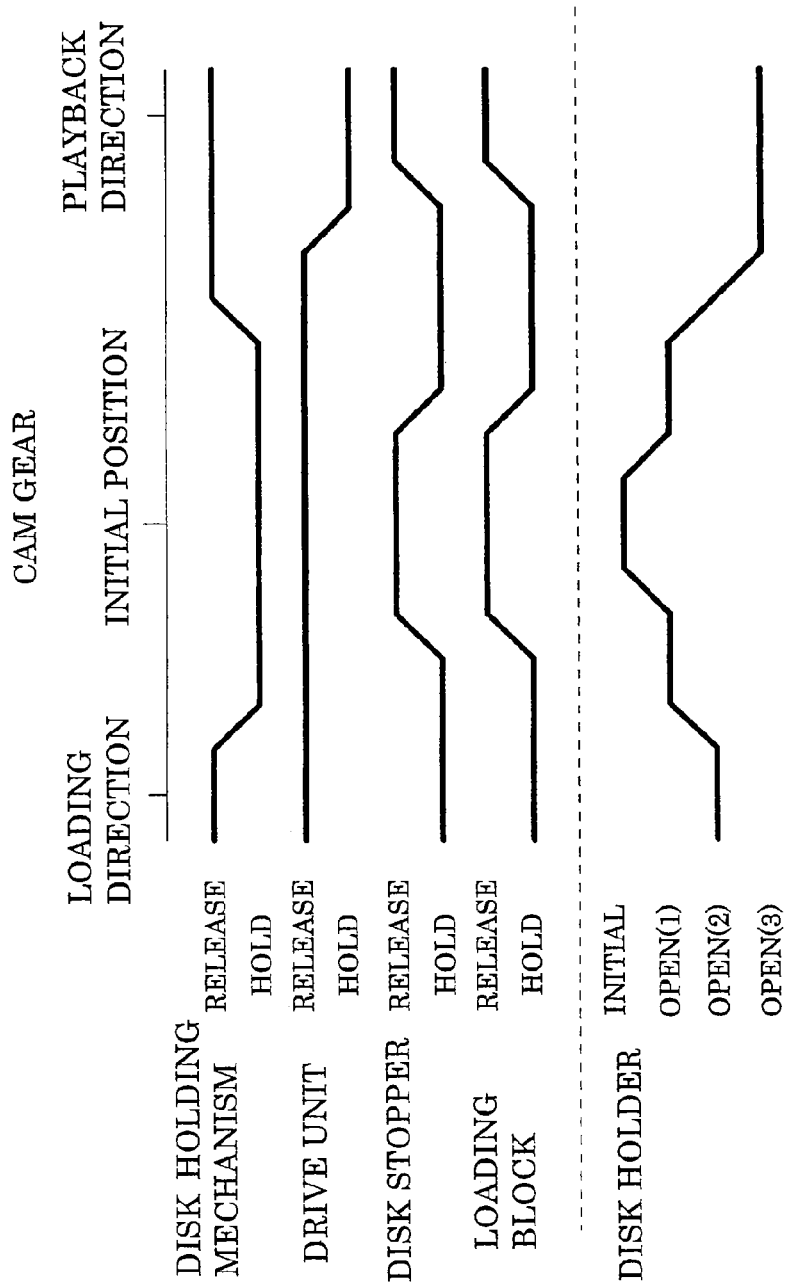

DISK HOLDER, DISK ALIGNMENT MECHANISM AND DISK DRIVE

RELATED APPLICATION

The present application is a divisional application of U.S. patent Ser. No. 10/551,684 filed on Jul. 31, 2006, which claims priority from PCT/JP2004/004677 filed on Mar. 31, 2004, which claims priority from Japanese Patent Application 2003-096626 filed on Mar. 31, 2003, Japanese Patent Application 2003-096863 filed on Mar. 31, 2003, and Japanese Patent Application 2003-146943 filed on May 23, 2003.

TECHNICAL FIELD

The present invention relates to a disk holder, disk alignment mechanism and disk drive that afford an improvement in the alignment of a disk in a drive.

BACKGROUND ART

Conventionally, disk drives of the type that involve mounting a magazine storing disks in a drive and automatically playing back a disk that is withdrawn from the magazine have become widespread. Such disk drives exhibit superior operability on account of the fact that it is not necessary to perform the operations of inserting and ejecting disks one at a time each time a disk is played back.

However, because the magazine which is mounted in and detached from the disk drive needs to be sufficiently strong to protect a plurality of disks that are protected by the magazine when withdrawn to the outside, the walls of the main body of the magazine are quite thick and, as a result, the overall size of the magazine and disk drive in which the magazine is mounted increases. Further, guide grooves and rail portions are provided on the inner faces of the magazine side walls in order to remove the tray or the like protecting the disk in the magazine. When such grooves and rail portions are formed, the thickness of the magazine side walls increases further and the gap between adjacent disk holders also widens. Hence, the height dimension of the magazine increases and the disk drive in which the magazine is mounted also increases in size.

In addition, in order to withdraw and play back the disk held in the magazine, an adequate space must be provided in the disk drive and the disk drive increases in size. As in the case of an in-vehicle disk drive or the like in particular, the demand for miniaturization when the housing must be 180× 50(mm), which is known as 'DIN size' or 180×100(mm), which is known as 'double DIN size', is high.

In order to deal with this demand, as a method of dividing the magazine, a disk drive that is able to perform playback without withdrawing the disk from the magazine by inserting a drive unit for disk playback in a space formed by dividing the magazine mounted in the disk drive has been developed (Patent Documents 1 and 2). In this disk drive, because the space for withdrawing and playing back the disk is not necessary, miniaturization of the disk drive overall can be achieved.

In addition, a disk drive in which, instead of using a detachable-type magazine, disk holders capable of storing a plurality of disks in the drive are integrated in a stacked state in the drive beforehand, and in which disks inserted via disk-slots are automatically stored in the disk holders and the stored disks can be automatically ejected has been proposed. In this disk drive, because a thick magazine and an opening and mechanism and so forth for mounting/detaching the magazine are not required, miniaturization of the drive can be implemented. The invention disclosed in Patent Document 3 in particular provides a disk holder that can be vertically divided as in the case of the magazine of the division method above and makes it possible to play back a disk without withdrawing same by inserting drive units in the divided disk holder, whereby further miniaturization is achieved.

Problem to be Solved

Further, in the case of a conventional disk drive that uses a division-type disk magazine and disk holders or the like as above, a structure for holding disks such as individual trays and disk holders or the like in a disk magazine is required. As a structure for this purpose, a member or mechanism for holding the outer edge of the disk is generally adopted.

However, when the outer edge of the disk is held, excess space for the member or mechanism for holding the outer edge of the disk is required at the circumference of the disk in the tray or disk holder, whereby the size of the disk magazine and disk holder or the like increases. Further, when the trays or disk holders are arranged in stacked fashion, because the thickness increases as a result of the member or mechanism holding the outer edge of the disk, there is also a size increase in the stacking direction.

Further, in order to hold the outer edge of the disk, because it is necessary to hold the outer edge of the disk from at least the opposing outer-periphery side, the tray or disk holder necessitates at the very least a surface area that is equal to a disk half circle and the required space in the disk drive is large.

In addition, the disk in the tray or disk holder desirably has the center hole at the center of the disk in a matching relationship with the turntable on which the disk is mounted. However, when the outer edge, which is spaced apart from the center of the disk, is held, it is hard to match the center of the disk and a high level of precision is required of the member or mechanism in order to achieve the correct alignment.

Furthermore, in the case of a disk drive that employs the aforementioned division-type disk holder, an operation of transferring the disk from the desired disk holding member to the turntable is required. As a result, a complicated operation in which, once the disk holder has been divided and the drive unit has been inserted, the disk holding member holding the desired disk is moved beside the drive unit and the desired disk is clamped onto the turntable is necessary, which results in complexity in the cam and drive mechanism and so forth.

Further, because a disk holding member is used to transfer the disk from the disk holder to the drive unit, a disk clamping mechanism that performs chucking reliably with the disk interposed between the disk clamping mechanism and the turntable cannot be used and a special structure for grasping the inner edge of the disk is required on the turntable side.

DISCLOSURE OF THE INVENTION

An object of the present invention is to provide a disk holder, disk alignment mechanism and disk drive that make it possible to accurately align a disk in the disk drive.

In order to achieve the above object, the present invention possesses the following technological characteristics in a disk holder that comprises a plurality of holder plates that individually hold a plurality of disks and a plurality of disk holding mechanisms with which the holder plates are provided.

That is, the present invention is characterized in that the disk holding mechanism comprises a disk hold link that comprises a catch that engages with and disengages from the center hole of the disk.

In such an aspect, the disk is held in the holder plate by allowing the catch of the disk hold link to engage with and disengage from the center hole of the disk, and, therefore, in comparison with a case where the outer edge of the disk is held, the centers of the respective disks can be easily matched and accurately aligned. Further, because a space for a member or mechanism for holding the outer edge of the disk is not required at the circumference of the disk of the holder plate, miniaturization is possible.

In a preferred embodiment, at least a pair of the disk hold links is provided to so as to be able to turn in the direction of engagement with and disengagement from the disk center hole about a common axis; a disk hold arm for allowing the disk hold link to turn is provided so as to be able to perform a sliding movement in the radial direction of the disk; and a depressed portion that is biased by an external force is provided in the vicinity of the outer edge of the disk of the disk hold arm.

In such an aspect, a catch can be caused to engage with and disengage from the center hole by allowing the disk hold links to turn via the disk hold arm by biasing a single depressed portion and, therefore, the mechanism for holding and releasing the disk can be simplified and miniaturization is possible.

In a preferred embodiment, a hole is formed in a position corresponding with the center hole in the disk of the holder plate; and the disk hold link is installed in the hole.

In such an aspect, because the disk hold link is installed in the hole, the gap between individual plates when the holder plates are arranged stacked can be reduced, whereby an increase in thickness is suppressed and there is a size increase in the stacking direction.

In a preferred embodiment, the holder plate is substantially fan-shaped and the arc of the holder plate is shorter than a semi-circle of the disk.

In such an aspect, because the circular arc of the substantially fan-shaped holder plate is shorter than the semi-circle of the disk, the space required by the disk holder in the disk drive can be reduced.

In a preferred embodiment, the disk drive comprises a disk holder, wherein a plurality of the holder plate in the disk holder are arranged stacked such that each holder plate can be individually raised and lowered, the disk drive comprising: a drive unit for playing back a desired disk; a disk selector that forms a space above and below a desired disk by raising and lowering a holder plate in the disk holder; and drive moving means for moving the drive unit into the space formed as a result of raising and lowering the holder plate.

In such an aspect, the disk holding mechanism of the disk holder holds the center hole of the disk and, therefore, the disk can be accurately aligned with respect to the drive unit and the required space in the disk drive can be reduced and the drive can be miniaturized overall.

In a preferred embodiment, disk grasping means for grasping and releasing the desired disk is provided in sync with the engagement and disengagement of the catch of the disk hold link when the holder plate is raised and lowered by the disk selector.

In such an aspect, by synchronizing the release of the desired disk from the disk holding means and the grasping of the desired disk by the disk grasping means, the retraction of the holder plate for playing back the desired disk can be performed smoothly.

A preferred embodiment is a disk alignment mechanism for aligning a desired disk when the desired disk is transferred between a disk holder capable of housing a plurality of disks and a drive unit for playing back the desired disk, comprising: disk grasping means for grasping only the desired disk by separating the same from the disk holder in a space that is produced by dividing the disk holder.

In such an aspect, when the desired disk is transferred from the disk holder to the drive unit, the disk grasping means is able to temporarily grasp the desired disk and, therefore, the disk holder may perform the operations of division and retraction from the desired disk, whereby the cam and drive mechanism and so forth can be simplified and the transfer operation can be performed smoothly.

In a preferred embodiment, the disk grasping means comprises a disk feed mechanism that feeds a disk into and out of the disk holder.

In such an aspect, by combining usage of the disk feed mechanism with the disk grasping means, a reduction in the number of members is possible and miniaturization of the disk drive can be implemented.

In a preferred embodiment, the disk feed mechanism comprises a loading roller that is provided so as to be capable of moving in the direction of contact with and separation from the desired disk.

In such an aspect, when feeding and aligning the disk, the disk is fed and grasped reliably by moving the loading roller in the direction of contact with the disk and, when the disk is played back, interference with the disk can be avoided by moving the loading roller in a direction away from the disk.

In a preferred embodiment, the disk grasping means comprises a disk stopper mechanism that grasps the outer edge of the desired disk.

In such an aspect, as a result of the outer edge of the disk being grasped by the disk stopper mechanism, the disk is not an obstacle to the disk holder and drive unit and reliable alignment is possible. When this is combined with a disk feed mechanism in particular, more reliable and accurate alignment is possible, which results in resistance to vibration.

In a preferred embodiment, a disk holding mechanism, which releases the center hole of the disk in sync with the grasping of the disk by the disk grasping means and holds the center hole of the disk in sync with the release of the disk by the disk grasping means, is provided in the disk holder.

In such an aspect, by synchronizing the disk holding mechanism and disk grasping means, the transition from the disk release of the disk holder to the disk alignment state of the disk grasping means and disk storage in the disk holder can be performed smoothly and reliably.

In a preferred embodiment, a disk clamping mechanism, which releases the center hole of the disk in sync with the grasping of the disk by the disk grasping means and holds the center hole of the disk in sync with the release of the disk by the disk grasping means, is provided in the drive unit.

In such an aspect, by synchronizing the disk clamping mechanism and disk grasping means, the transition from the state of disk alignment by the disk grasping means to the placing of the disk on the drive unit, disk release of the drive unit, and then the state of disk positioning by the disk grasping means can be performed smoothly and reliably.

A preferred embodiment is a disk alignment mechanism for aligning a desired disk when the desired disk is transferred between a disk holder capable of housing a plurality of disks and a drive unit for playing back the desired disk and when the desired disk is ejected from the disk holder, comprising: disk grasping means for grasping only the desired disk by separating the same from the disk holder in a space that is produced by dividing the disk holder, wherein the disk grasping means comprises a disk stopper mechanism that grasps the outer edge of the desired disk and a disk feed mechanism that feeds the desired disk in and out of the disk holder; the disk feed mechanism is provided so as to be able to move in the direction of contact with and separation from the disk in order to contact the disk following the operation to grasp the desired disk by the disk stopper mechanism.

In such an aspect, when the disk is transferred between the disk holder and drive unit and ejected, because the disk feed mechanism is in contact with the disk in a state where the disk stopper grasps the disk, the outer circumference of the disk is no longer free when the disk feed mechanism is in contact with the disk, swing caused by vibration is prevented, and the disk can be reliably transferred and ejected.

In a preferred embodiment, the disk feed mechanism comprises a loading roller that feeds the disk by sandwiching the disk.

In such an aspect, because disk swing can be prevented, even when a constitution in which the disk is sandwiched by a loading roller is adopted, a mechanism for opening and closing the loading roller in accordance with the disk swing width need not be provided, whereby miniaturization resulting from the small foot-print can be implemented.

In a preferred embodiment, the disk grasping means comprises a disk guide that guides the movement of the disk by contacting the disk between the operation to grasp the desired disk by the disk stopper mechanism and the operation to contact the disk by the disk feed mechanism.

In such an aspect, because the disk guide abuts against the moving disk, disk swing is further prevented and the disk can be even more reliably transferred and ejected. Further, because the progressive direction of the disk can be changed by the disk guide, an effective application of space can be achieved by shifting the disk insert position and disk holder position.

In a preferred embodiment, the disk guide is provided so as to move in the direction of contact with and separation from the disk in accordance with the movement of the disk feed mechanism.

In such an aspect, because it is possible to make the disk guide contact the disk only when the disk is moving and to retract the disk guide at other times to avoid the obstruction of other members, space can be effectively adopted.

BRIEF DESCRIPTION OF THE DRAWINGS

FIG. 34 is a planar view (A) and front view (B) of a right disk stopper link;

FIG. 35 is a planar view (A) and front view (B) of a left disk stopper link;

FIG. 66 is a planar view (A), front view (B), and right side view (C) of the disk guide of the drive chassis unit in FIG. 1;

FIG. 92 is a right side view of an initial state (A) of the drive unit, the floating lock release start state (B), and the floating state (C) of the embodiment in FIG. 1;

FIG. 95 is an explanatory diagram of the flow of the operation during disk loading of the embodiment in FIG. 1;

FIG. 96 is an explanatory diagram of the flow of the operation during disk playback of the embodiment in FIG. 1;

FIG. 97 is an explanatory diagram showing the relationship between the turning position of the cam gear, the state of each part, and the open position of the disk holder;

BEST MODE FOR CARRYING OUT THE INVENTION

An embodiment ('the present embodiment' hereinbelow) of an in-vehicle disk drive to which the present invention is applied will be described in concrete terms hereinbelow with reference to the drawings. Further, the drive moving means of the claims correspond with the drive base and the mechanism for turning the drive base, the disk grasping means corresponds to the disk stopper mechanism, and the disk feed mechanism corresponds to the loading block. Further, in the following drawings, the front side of the disk drive is at the front, the rear side is at the rear, and from a front perspective side, the upper side is at the top, the lower side is at the bottom, the left side is on the left and the right side is on the right.

A. Overall Constitution

Figure 1:
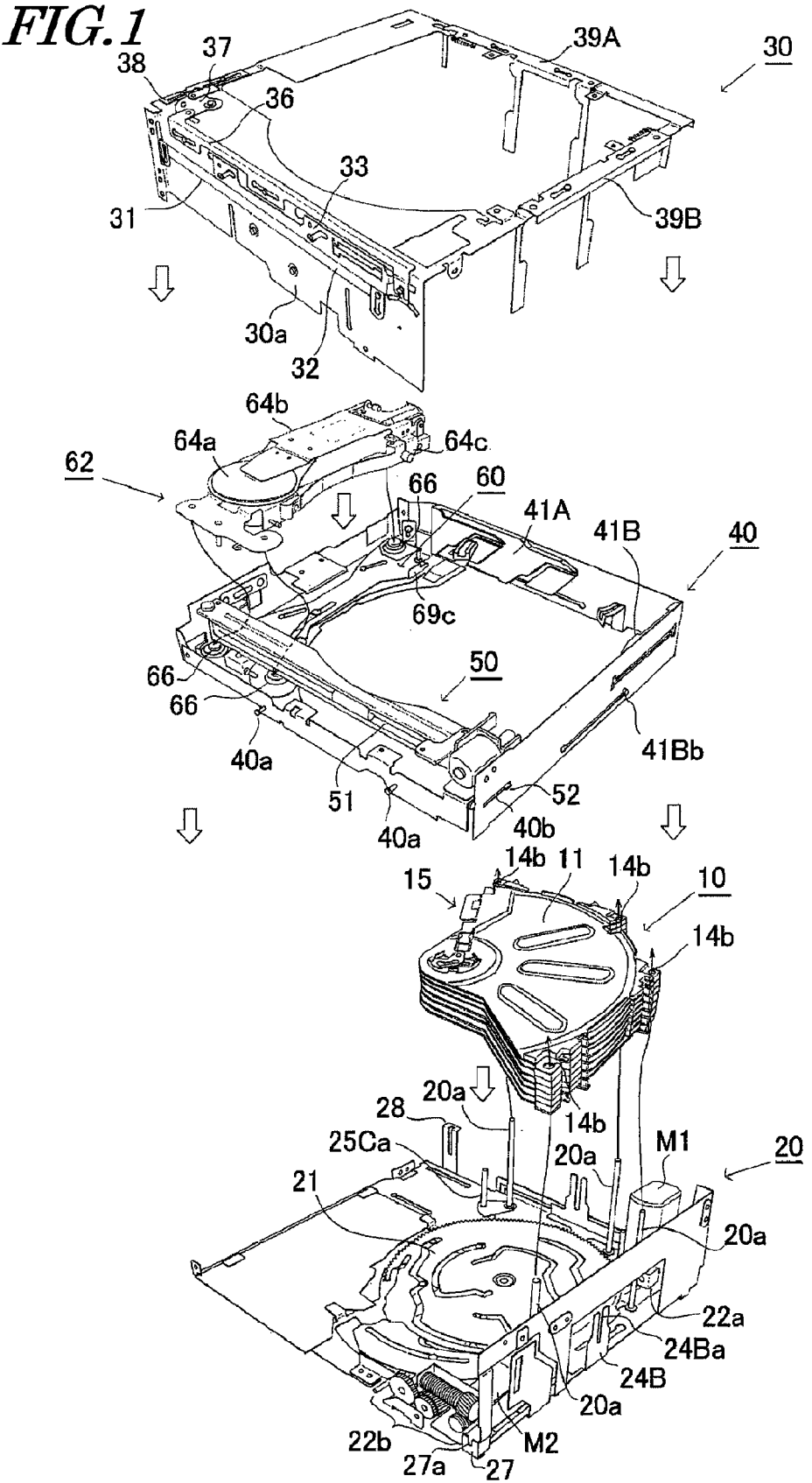
FIG. 1 is an exploded perspective view of an embodiment of the disk drive of the present invention.
Figure 2:
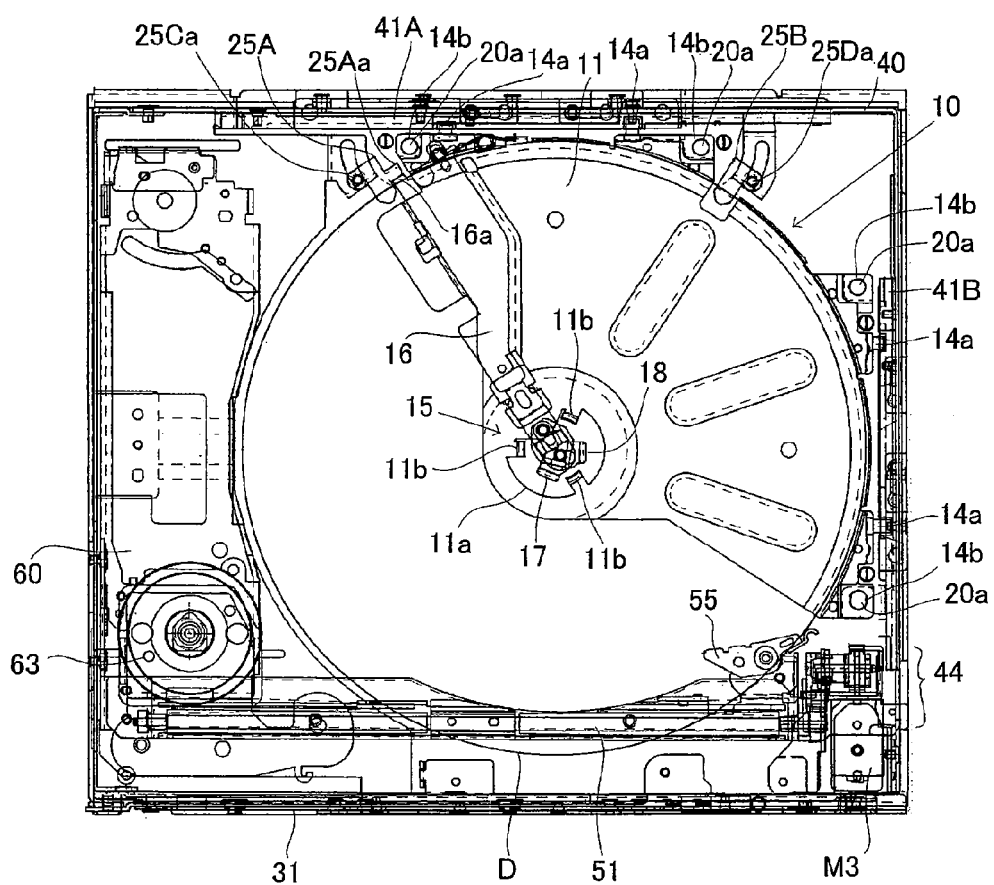
FIG. 2 is a transparent planar view during disk loading of the embodiment in FIG. 1.
Figure 3:
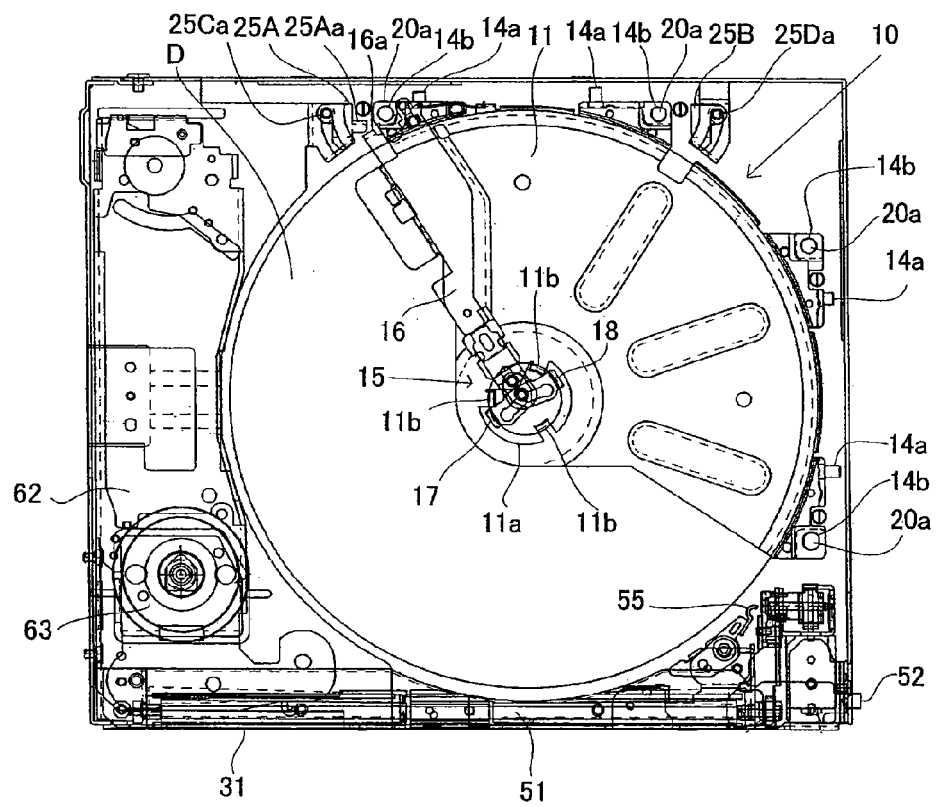
FIG. 3 is a transparent planar view of a state where the disk is stored in the disk holder of the embodiment in FIG. 1.
Figure 4:
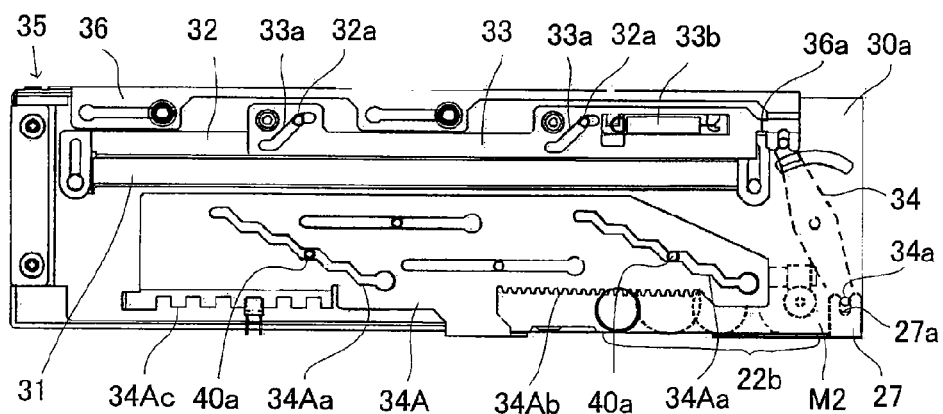
FIG. 4 is a front view of the embodiment in FIG. 1.

As shown in FIGS. 1 to 4, the present embodiment is constituted by the following constitutional parts. Further, FIG. 1 is an exploded perspective view of the overall constitution of the present embodiment, FIGS. 2 and 3 are transparent planar views, and FIG. 4 is a front view. Further, although some of the members are not illustrated in FIGS. 1 to 4, the details of the members of the respective constitutional parts are disclosed in each of the illustrations shown in brackets.

(1) A disk holder 10 (FIGS. 5 to 20) in which a plurality of holder plates 11 capable of housing disks D individually are stacked;

(2) A lower chassis unit 20 in which the disk holder 10 is mounted (FIGS. 21 to 44);

(3) An upper chassis unit 30 comprising a disk slot 31 (FIGS. 45 to 51);

(4) A drive chassis unit 40 comprising disk selectors 41A and 41B that divide the disk holder 10 (FIGS. 52 to 66);

(5) A loading block 50 comprising a loading roller 51 that inserts and ejects the disk in and from the disk holder 10 (FIGS. 67 to 74);

(6) A drive base unit 60 provided such that same can be inserted between disk holders 10 and which comprises a drive unit 62 for disk playback (FIGS. 75 to 94).

Figure 11:
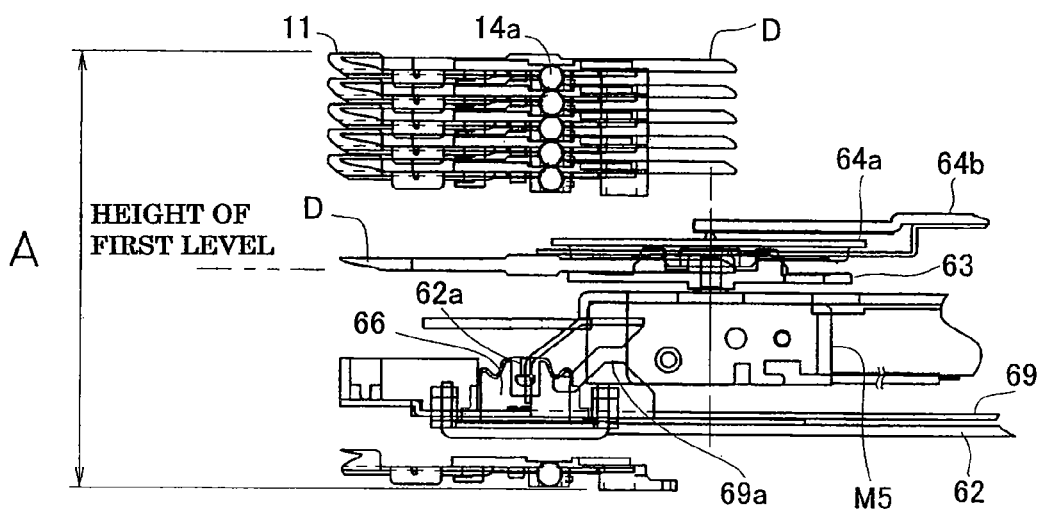
FIG. 11 is a side view of a state where the disk holder is divided and the disk stored in the holder plate on the lowest level is set on the turntable, in the embodiment in FIG. 1.
Figure 12:
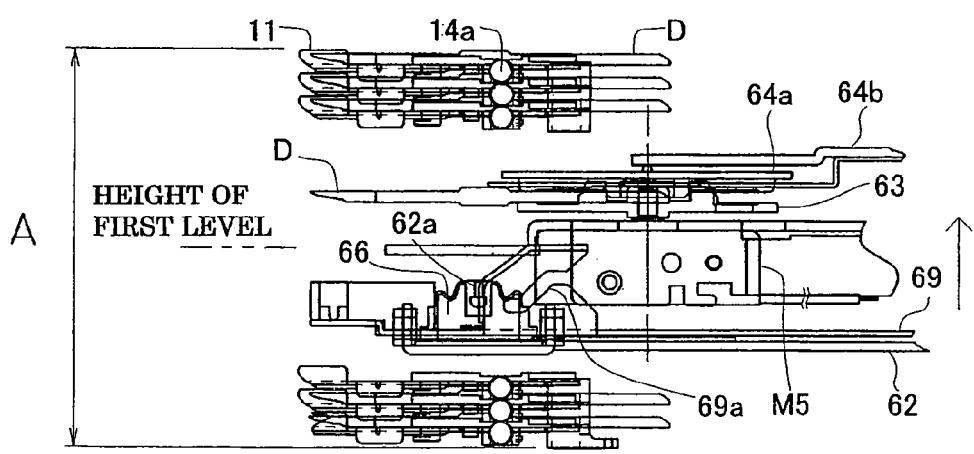
FIG. 12 is a side view of a state where the disk holder is divided and the disk stored in the holder plate on the third level from the bottom is set on the turntable, in the embodiment in FIG. 1.
Figure 58:
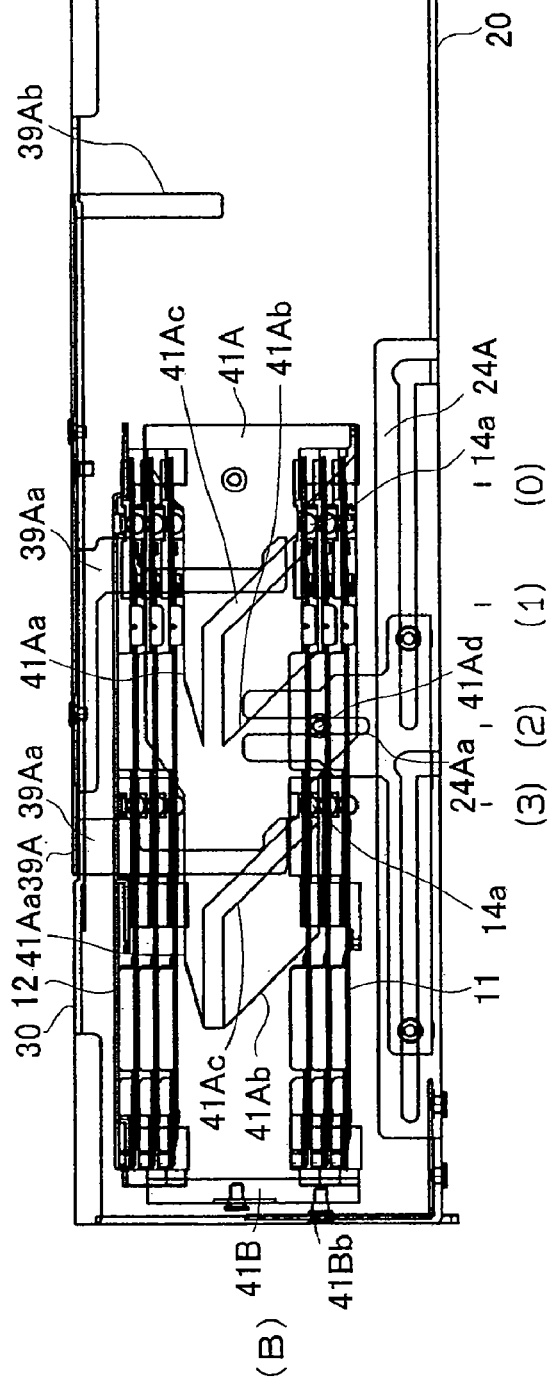
FIG. 58 is an explanatory diagram (A) of the disk selector and protrusion in the holder open position (2) and a transparent rear view (B) of the disk drive in the same state.
Figure 87:
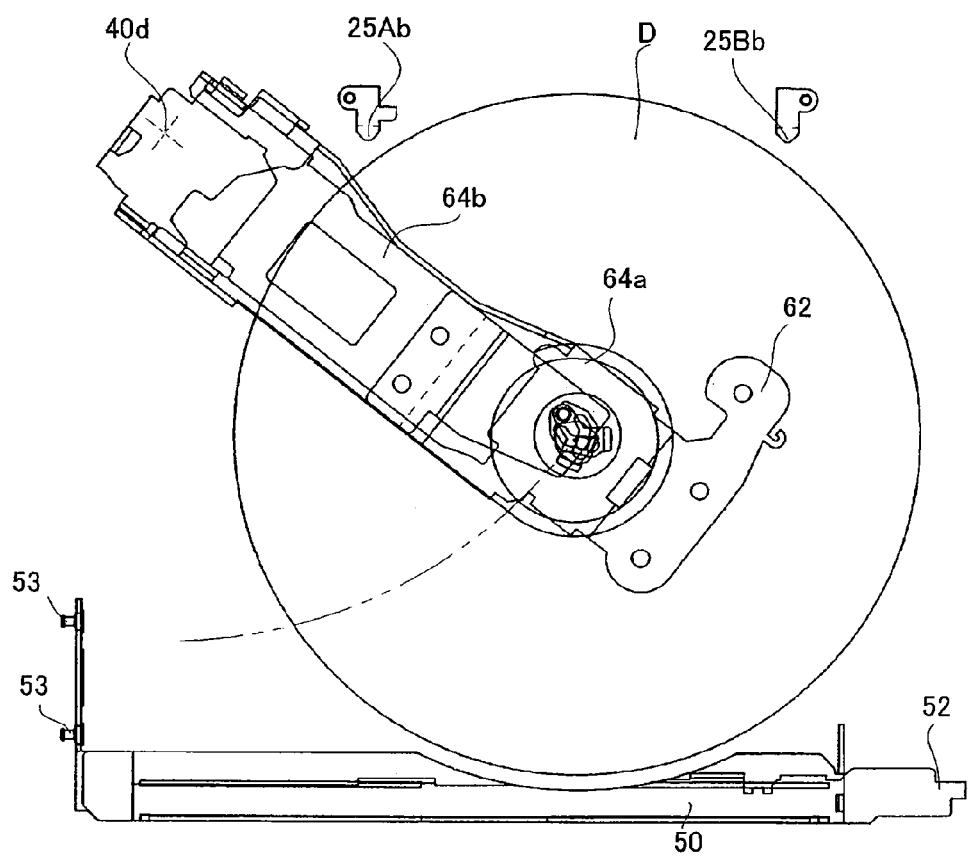
FIG. 87 is a planar view of a state in which the drive unit is inserted of the embodiment in FIG. 1.

In the case of the present embodiment, as shown in FIGS. 2 and 3 and 11 to 13, a disk D that is brought in by the loading roller 51 via the disk slot 31 can be stored above each holder plate 11. Further, during disk playback, the height of the drive chassis unit 40 is matched with the desired disk D among the disks D stored in the holder plates 11 and, as shown in FIG. 58, the holder plates 11 above and below this disk D can be divided and retracted by the disk selectors 41A and 41B. As shown in FIGS. 12 and 87, the drive unit 62 is inserted in the space generated by retracting the holder plates 11 in this manner and the information of disk D is read by placing disk D in the drive unit 62.

B. Outline of the Constitution of Each Unit

An outline of the constitution of each part of the present embodiment will now be described in simple terms.

1. Disk Holder (FIGS. 5 to 20)

Disk holder 10 is constituted such that same can be vertically divided (the gap between the respective holder plates 11 can be modified) in the desired positions by providing six holder plates 11 that divide the disks and one upper plate 12 in a stacked state so that these plates 11 and 12 can go up and down. Further, each of the holder plates 11 is provided with a disk holding mechanism 15 that holds disks D one by one above individual holder plates 11 by grasping the edge of the center hole of (called the 'disk inner edge' hereinafter) of the disks D.

2. Lower Chassis Unit (FIGS. 21 to 44)

The lower chassis unit 20 is constituted to divide the disk holder 10, grasp/release the inner edge of the disk, grasp/release the outer edge of the disk D, move the loading roller 51 forward or backward, open/close the disk slot 31, and turn the drive base unit 60 and so forth by turning a cam gear 21 that is provided on the inside bottom face of the lower chassis unit 20. The cam gear 21 is provided such that same is able to turn via the cam gear drive gear mechanism 22*a* the drive power source of which is a cam gear drive motor M1. Further, the lower chassis unit 20 is provided with a drive chassis elevator gear mechanism 22*b* the drive source of which is a drive chassis elevator motor M2.

3. Upper Chassis Unit (FIGS. 45 to 51)

The disk slot 31 of the upper chassis unit 30 is provided on the front-side front plate 30*a*. Further, a shutter 32 for opening and closing the disk slot 31 is provided by a shutter opening/closing plate 33 on the front plate 30*a*. Further, the front plate 30*a* of the upper chassis unit 30 and drive chassis elevator plates 34A and 34B that allow the drive chassis unit 40 to rise and fall to the desired position are provided on the rear outside face of the front plate 30*a* (FIGS. 4 to 44).

4. Drive Chassis Unit (FIGS. 52 to 66)

The drive chassis unit 40 is provided such that same is capable of rising and falling within the drive in accordance with the sliding movement of the drive chassis elevator plates 34A and 34B. The disk selector 41A that divides the holder plates 11 and raises or lowers the holder plates 11 is provided on the rear inside face of the drive chassis unit 40 such that the disk selector 41A can slide laterally. Further, a disk selector 41B that divides and raises and lowers the holder plates 11 is provided together with the disk selector 41A on the right inside face of the drive chassis unit 40 such that the disk selector 41B is capable of sliding forward and backward. In addition, a loading motor M3 for turning the loading roller 51 and a loading gear mechanism 44 of which the loading motor M3 is the drive power supply are provided on the right front portion of the drive chassis unit 40.

5. Loading Block (FIGS. 67 to 74)

The loading block 50 is provided at the front of the drive chassis unit 40 so as to be capable of sliding forward and backward and comprises the loading roller 51 that is disposed in parallel to the disk slot 31 as means for inserting and ejecting the disk D from the disk slot 31. The loading roller 51 is constituted to turn in the disk insertion direction (forward direction) or the ejection direction (reverse direction) with the loading motor M3 serving as the drive source as a result of a roller gear 51*a* provided at the end of the loading roller 51 engaging on the aforementioned loading gear mechanism 44 when the loading block 50 moves backward.

6. Drive Base Unit (FIGS. 75 to 94)

The drive base unit 60 comprises a drive base 61, which is a plate that is inserted in the divided disk holder 10 and the drive unit 62 that is provided on the drive base 61. The drive unit 62 comprises members required for playback of the disk D such as a turntable 63 and a pickup unit 65a. Further, the drive base 61 is provided with a floating lock mechanism that switches between a floating state in which the drive unit 62 is elastically supported by only a damper 66 and a locked state of being fixed to the top of the drive base unit 60. That is, the drive base 61 is constituted such that, when the drive base 61 is inserted in the divided disk holder 10, the drive unit 62 is in the floating state and the desired disk is placed on the turntable 63 and played back by the pickup unit 65a.

C. Details of Constitution and Functions of Each Unit

In addition, the constitution and functions of each unit will be described in more detail with reference to FIGS. 1 to 94.

1. Disk Holder 1-1. Holder Plate

Figure 5:
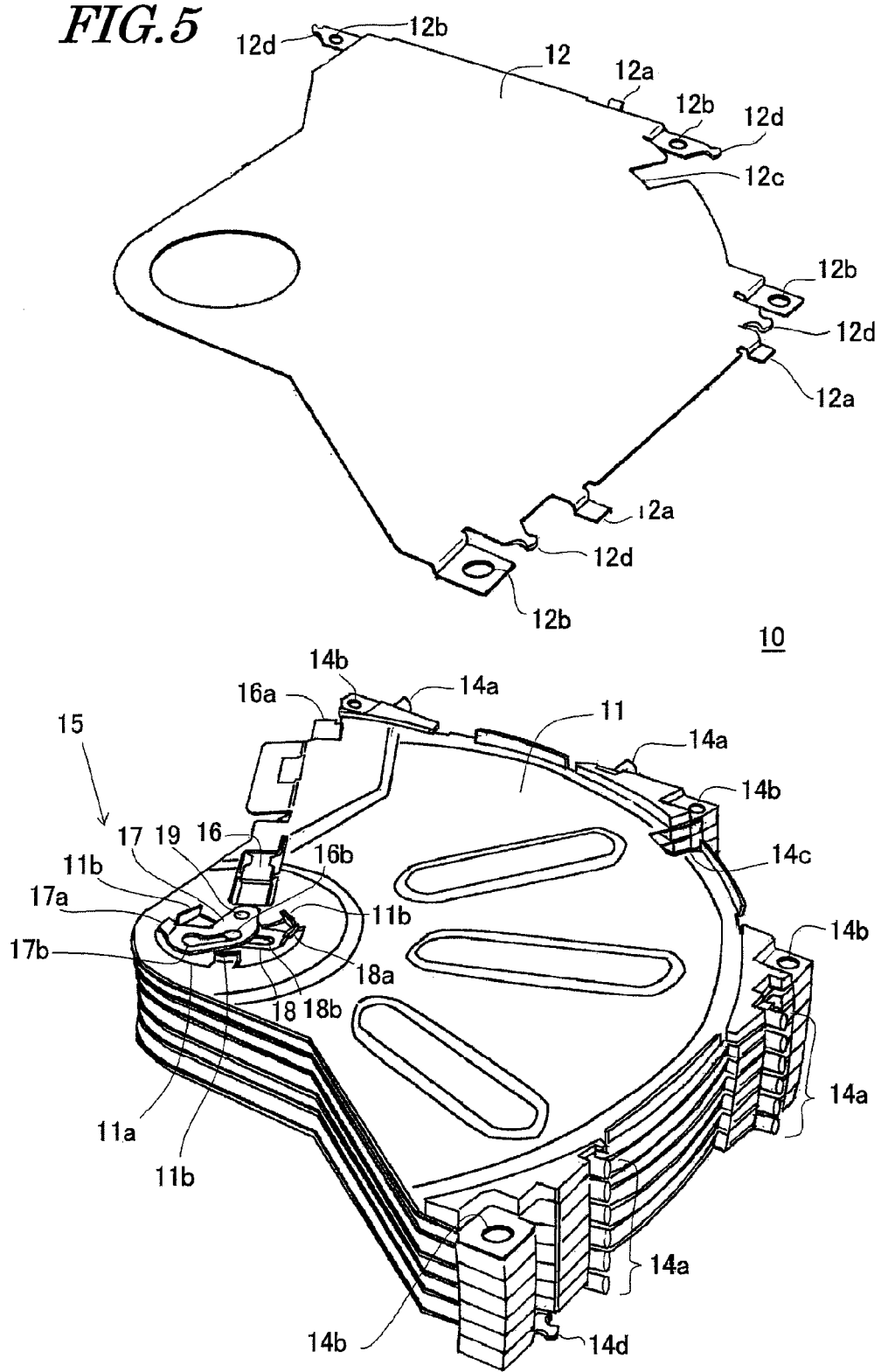
FIG. 5 is an exploded perspective view of the disk holder of the embodiment in FIG. 1.

As shown in FIGS. 5 to 8, the holder plate 11 is a substantially fan-shaped plate the circular arc of which is formed to follow the outer edge of the disk and is formed a little shorter than a semi-circle. The holder plate 11 is provided with a protuberance 14a that engages with the disk selectors 41A and 41B in positions corresponding with the right side face and rear side face of the lower chassis unit 20. Further, guide holes 14b are formed in the holder plate 11 and four guide shafts 20a (See FIG. 1) that stand upright in a vertical direction from the inside bottom of the lower chassis unit 20 are pushed through the guide holes 14b. In addition, a recess portion 14c for introducing a protrusion 25Ba of a disk stopper 25B (described subsequently) is formed at the rear of the holder plate 11. Further, although omitted from the other drawings, as shown in FIG. 5, an upper plate 12 provided with a protrusion 12a, guide hole 12b, and recess 12c that correspond with the protrusion 11a, guide hole 14b, and recess 14c is provided on the top of the highest holder plate 11.

Figure 7:
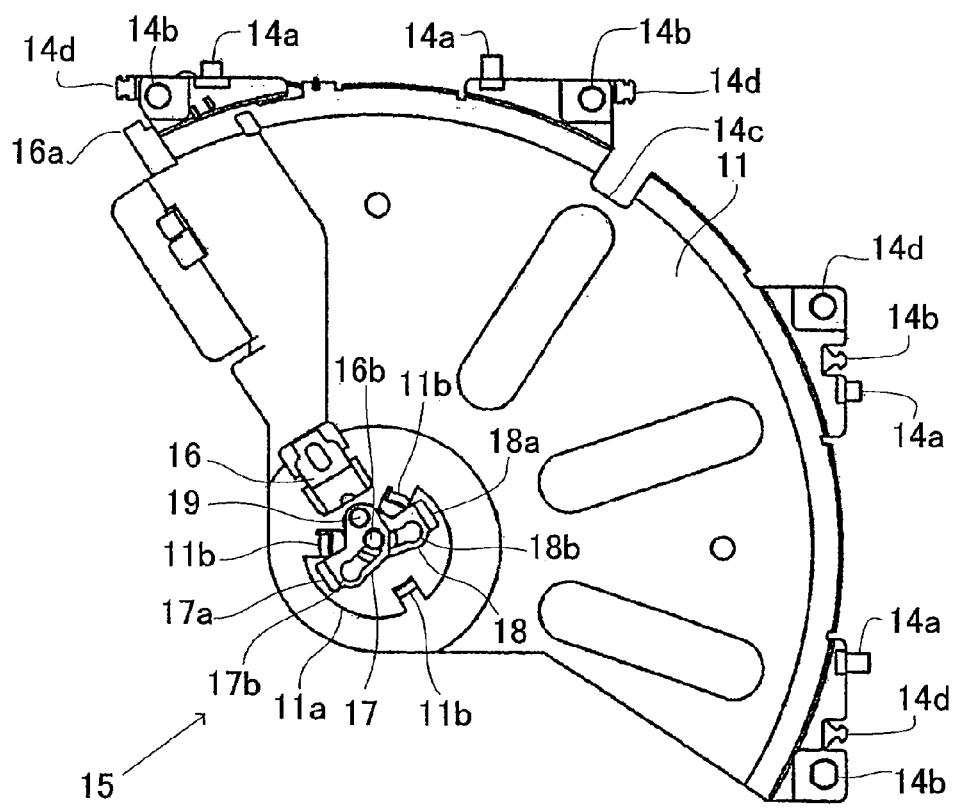
FIG. 7 is a planar view of the holder plate and disk holding mechanism of the lowest layer of the disk holder in FIG. 5.
Figure 8:
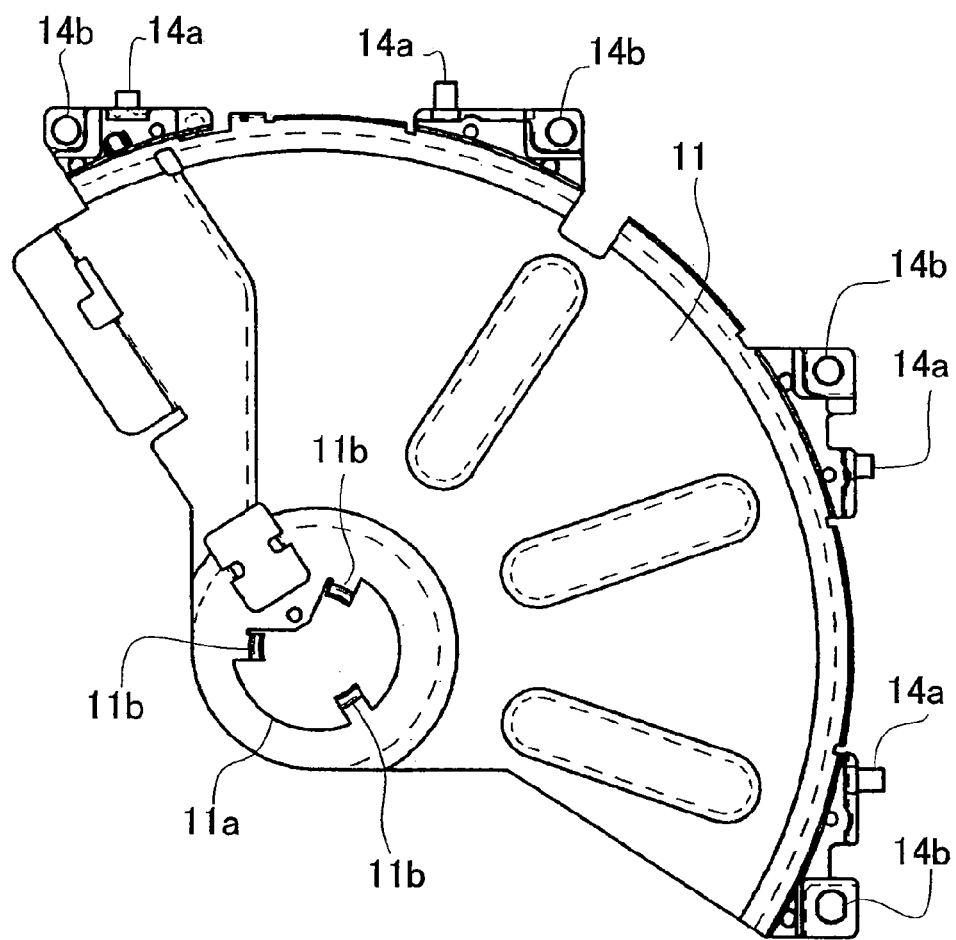
FIG. 8 is a planar view of the holder plate in FIG. 6.
Figure 9:
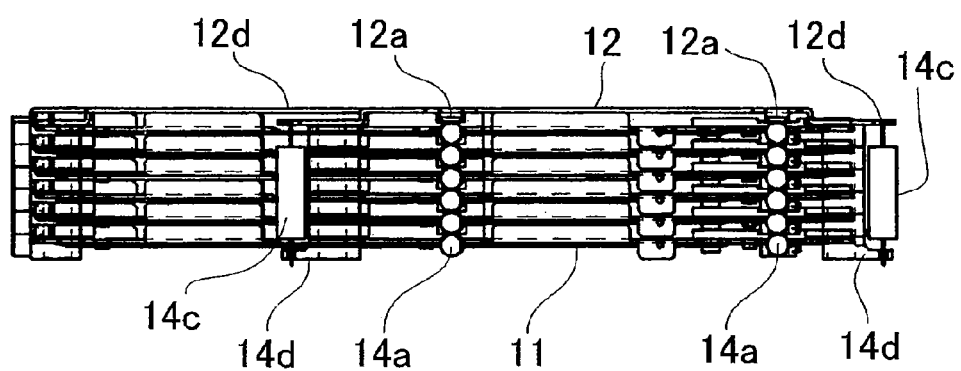
FIG. 9 is a rear view of the disk holder in FIG. 5.
Figure 10:
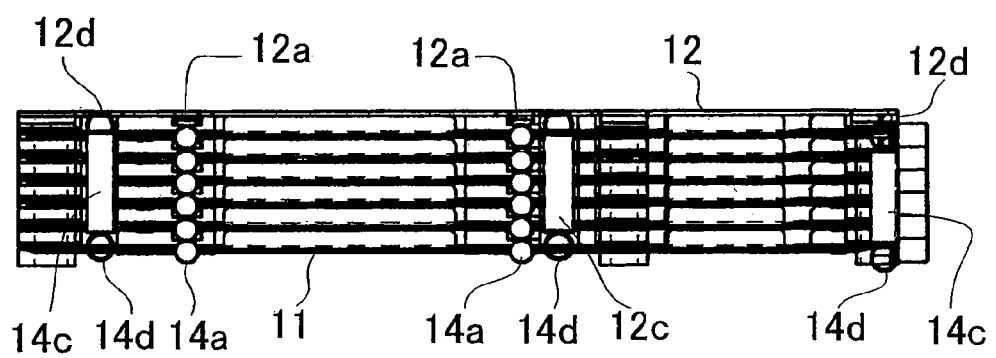
FIG. 10 is a right side view of the disk holder in FIG. 5.
Figure 13:
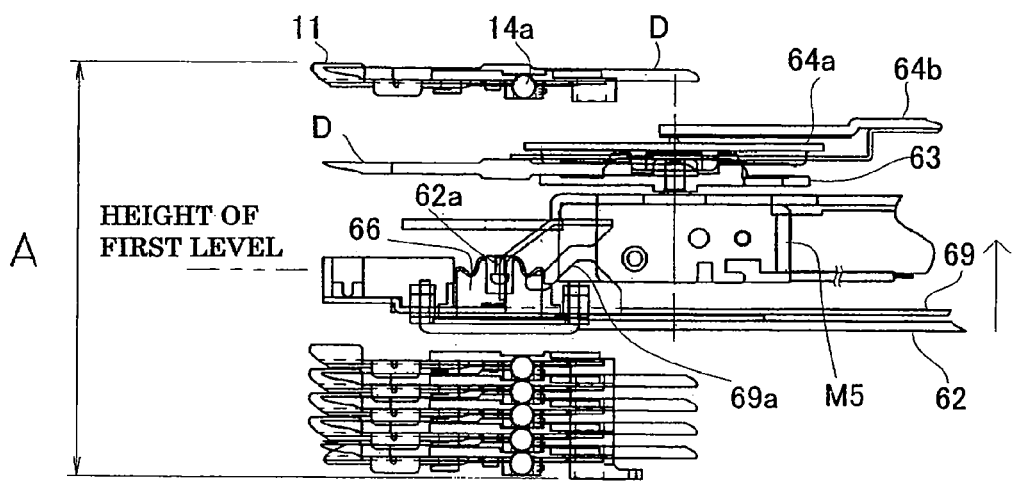
FIG. 13 is a side view of a state where the disk holder is divided and the disk stored in the holder plate on the highest level is set on the turntable, in the embodiment in FIG. 1.
Figure 14:
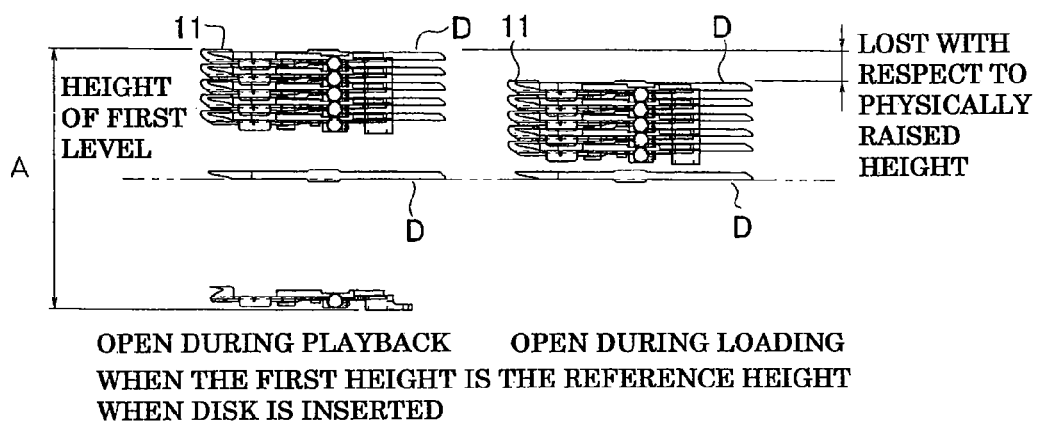
FIG. 14 is an explanatory diagram of the opening amount of the disk holder in a case where the holder plate on the lowest level is at the reference height during disk loading.
Figure 15:
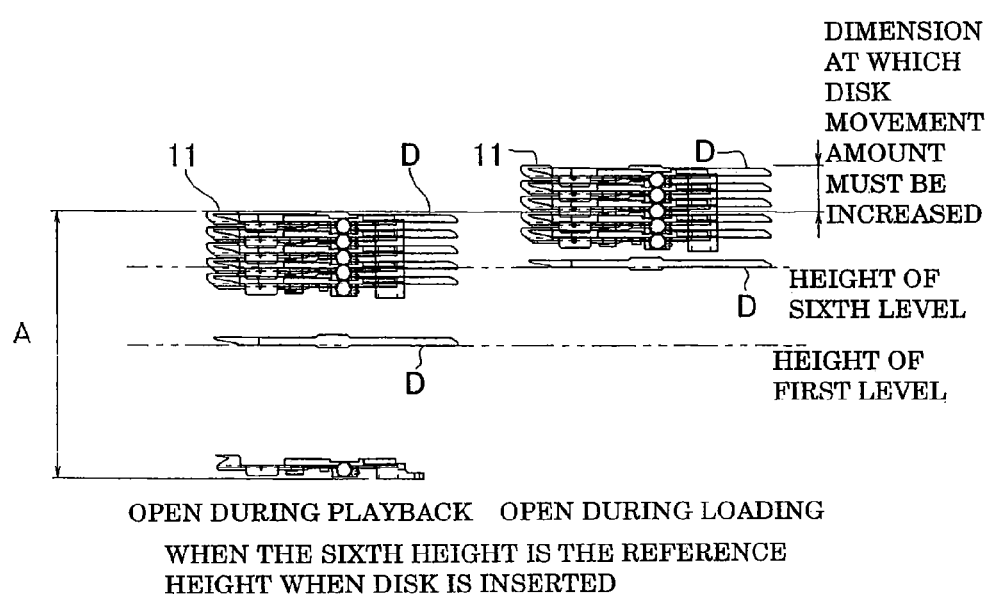
FIG. 15 is an explanatory diagram of the opening amount the disk holder in a case where the holder plate on the highest level is at the reference height during disk loading.
Figure 16:
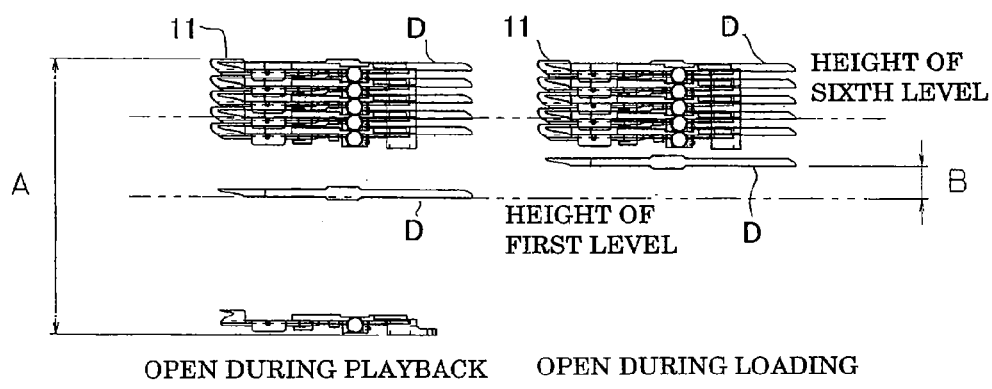
FIG. 16 is an explanatory diagram of the opening amount the disk holder when a height between the lowest level and the highest level is the reference height when the disk is inserted.

As shown in FIGS. 5 and 7, anchor protrusions 12d and 14d are provided on the upper face plate 12 and lowest holder plate 11 respectively and, as shown in FIGS. 9 and 10, the top and bottom ends of a spring 14e constituting the extension coil spring in the vertical direction are attached to the anchor protrusions 12d and 14d. As a result, all the holder plates 11 are biased in a mutually adjoining direction (direction in which the disk holder 10 closes) by the spring 14e. Further, as mentioned above, the disk holder 10 is constituted such that the holder plates 11 above and below the disk D are retracted during disk loading and disk playback. However, as shown in FIGS. 11 to 13, the dimension of the opening amount A of the disk holder 10 is the same during disk loading and disk playback and, as shown in FIG. 16, the position of disk D during disk loading (position corresponding with the disk slot 31) is established to be higher than the position of the disk D during disk playback by a dimension B.

Figure 60:
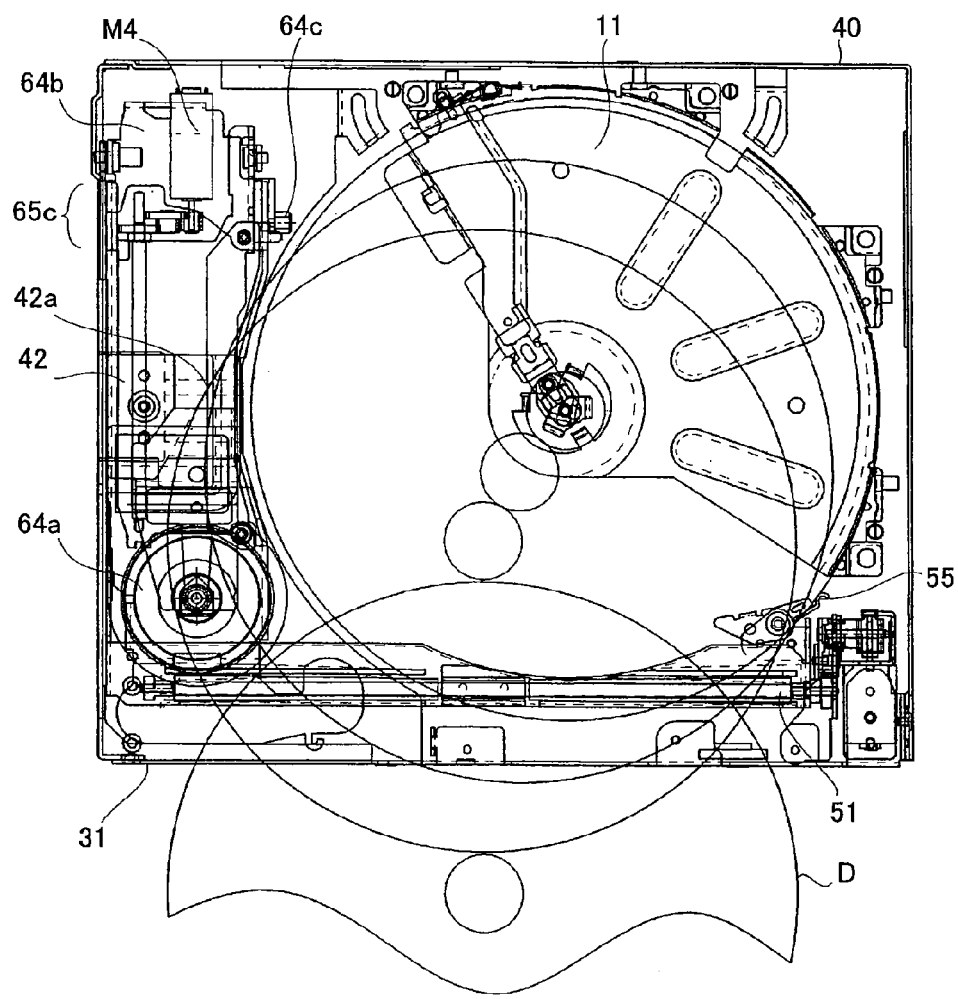
FIG. 60 is a planar view of the insertion/ejection path of the disk of the embodiment in FIG. 1.

Further, as shown in FIGS. 5 to 8, a substantially circular hole 11a is formed in a position corresponding with the center hole of the disk D in each of the holder plates 11. The hole 11a is provided with three abutting claws 11b that abut against the disk inner edge. In addition, as shown in FIGS. 3, 2 and 60, the disk holder 10 mounted in the lower chassis unit 20 is established such that the center of the hole 11a is in a position that is displaced a little to the right from the center of the disk slot 31 when viewed in a planar direction.

1-2. Disk Holding Mechanism

The disk holding mechanism 15 is a mechanism for holding the inner edge of the disk D together with the abutting claws 11b. That is, as shown in FIGS. 17 and 18, the disk holding mechanism 15 is constituted by a disk hold arm 16 that is provided such that same is able to perform a sliding movement in the radial direction of disk D and disk hold links 17 and 18 that engage with and disengage from the inner edge of the disk D in accordance with the movement of the disk hold arm 16.

Figure 19:
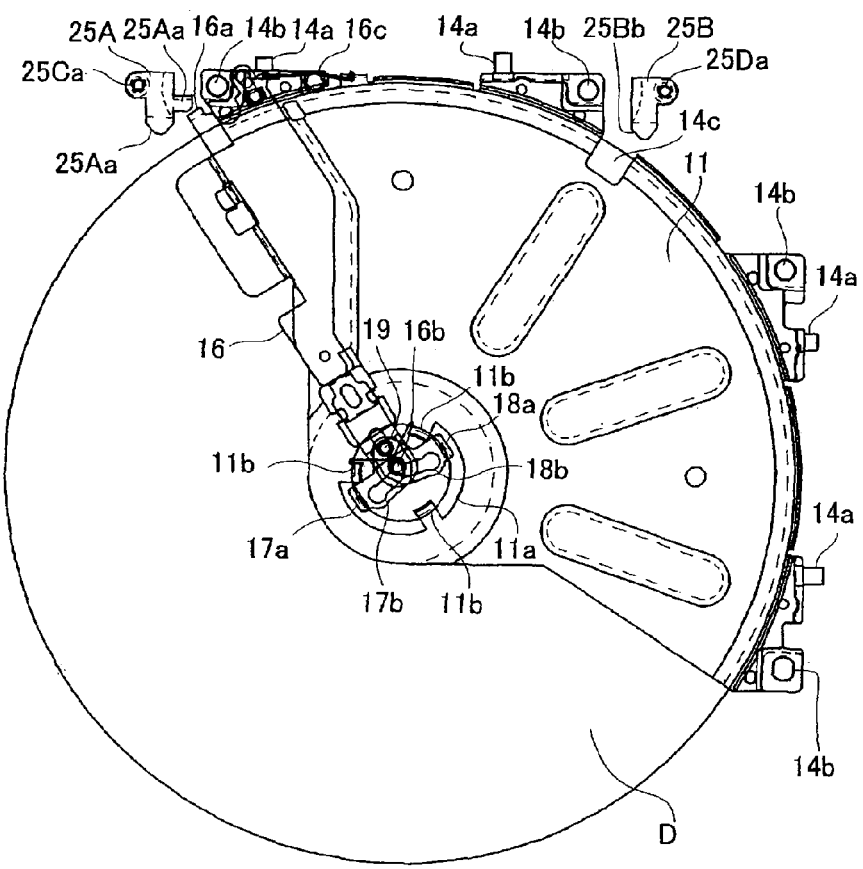
FIG. 19 is a planar view of a state where a disk is held by the disk holding mechanism of the disk holder in FIG. 5.
Figure 20:
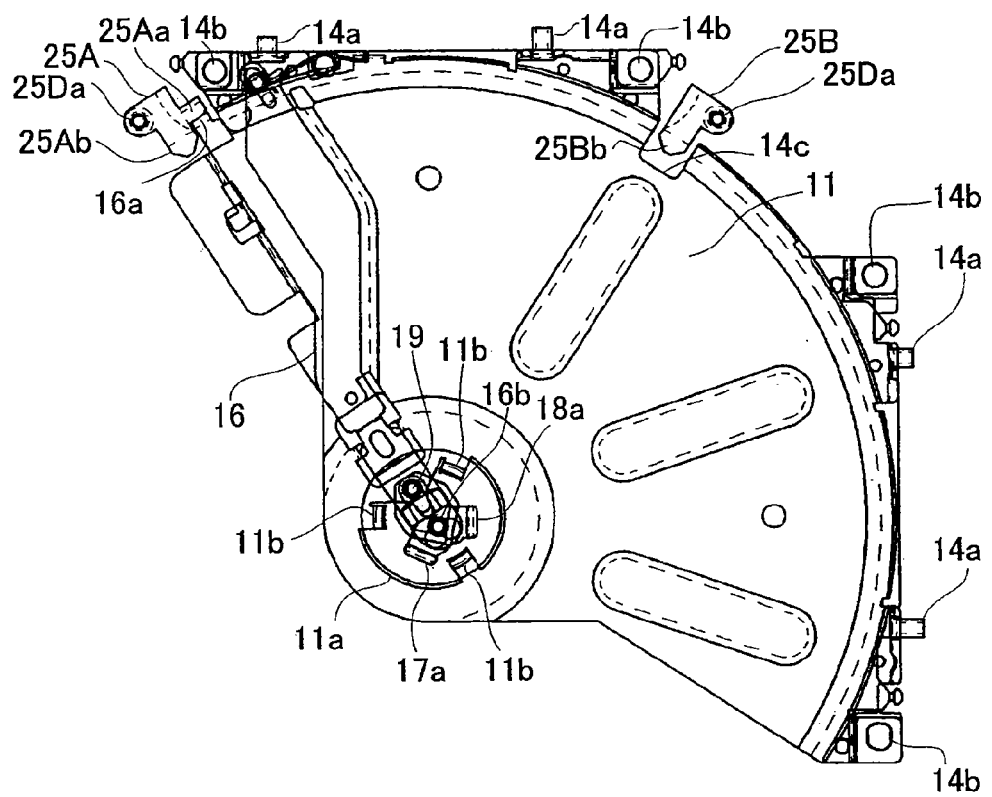
FIG. 20 is a planar view of a state where the disk has been released by the disk holding mechanism of the disk holder in FIG. 5.

As shown in FIGS. 19 and 20, the disk hold arm 16 is provided with a depressed portion 16a that is depressed by a convex portion 25Aa of the disk stopper 25A (described subsequently) on the end on the disk outside-edge side of the disk hold arm 16 and is biased toward the disk outside-edge side by a torsion spring 16c. Further, a pin 16b is provided on the end on the disk-center side of the disk hold arm 16.

Figure 6:
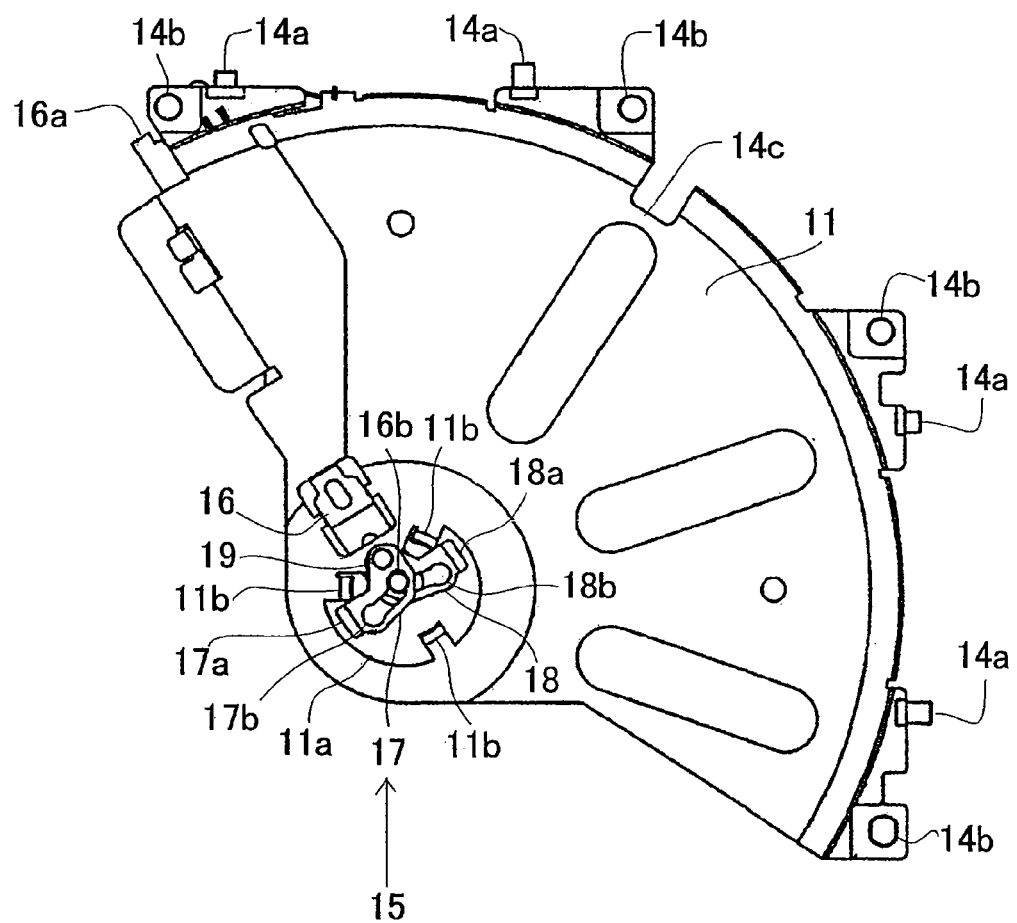
FIG. 6 is a planar view of a holder plate and disk holding mechanism of the disk holder in FIG. 5.
Figure 17:
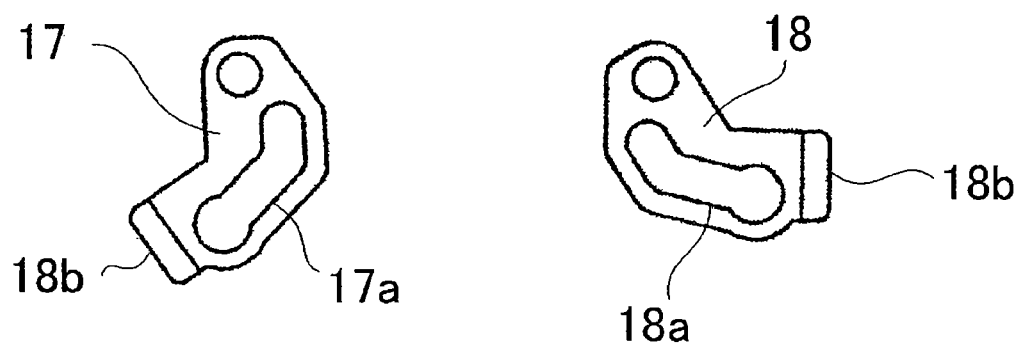
FIG. 17 is a planar view of a disk hold link of the disk holding mechanism of the disk holder in FIG. 5.
Figure 18:
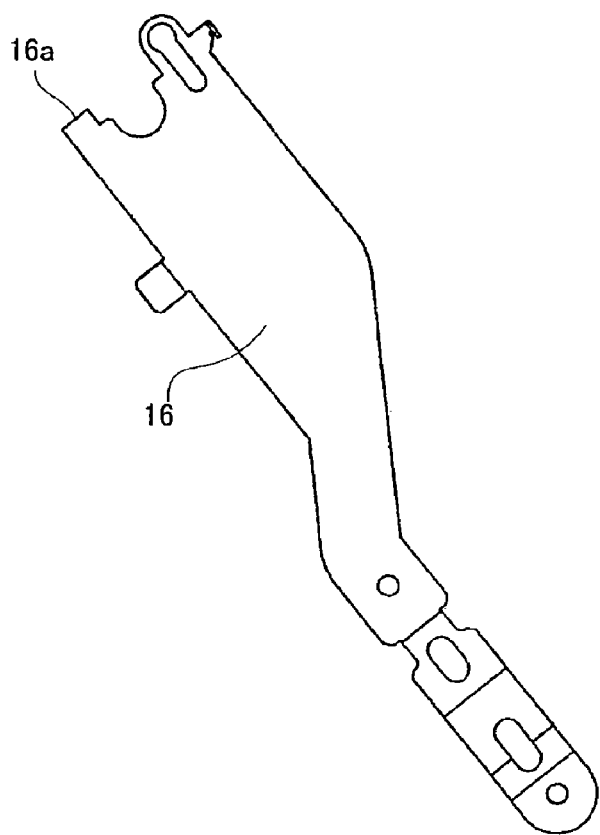
FIG. 18 is a planar view a disk hold arm of the disk holding mechanism of the disk holder in FIG. 5.

As shown in FIG. 17, disk hold links 17 and 18 are each substantially L-shaped plates at whose one end catches 17a and 18a that engage with the inner edge of the disk D are provided. As shown in FIGS. 6, 7, and 19, the disk hold links 17 and 18 are constituted such that the ends on the side opposite the catches 17a and 18a overlap to engage with the disk D in the mutual reciprocity (opening) direction of the catches 17a and 18a and are capable of turning about a common axis 19 that is provided at the edge of the hole 11a in the holder plates 11.

Further, substantially "<" letter-shaped cam holes 17b and 18b are formed in the disk hold links 17 and 18 and the pin 16b of the disk hold arm 16 is pushed through the cam holes 17b and 18b respectively to be capable of performing a sliding movement. As a result, as shown in FIG. 20, when the disk hold arm 16, the depressed portion 16a of which is pushed, makes a sliding movement toward the center of the disk D, the pin 16b moves to follow the cam holes 17b and 18b. Therefore, the disk hold links 17 and 18 are constituted to release the inner edge of the disk by turning in the direction in which the catches 17a and 18a are closed (approach one another).

2. Lower Chassis Unit 2-1. Cam Gear

Figure 21:
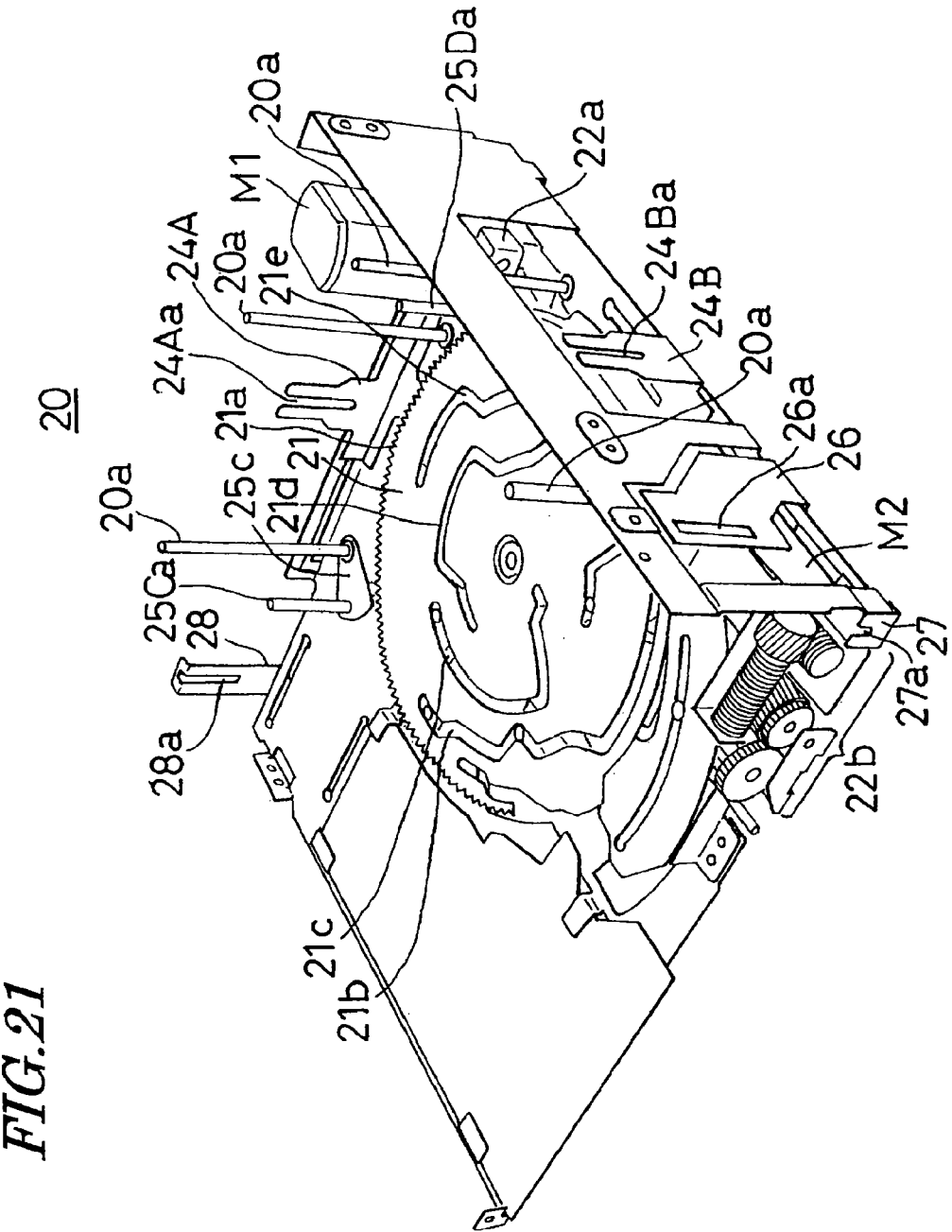
FIG. 21 is a perspective view of a lower chassis unit of the disk holder in FIG. 1.
Figure 22:
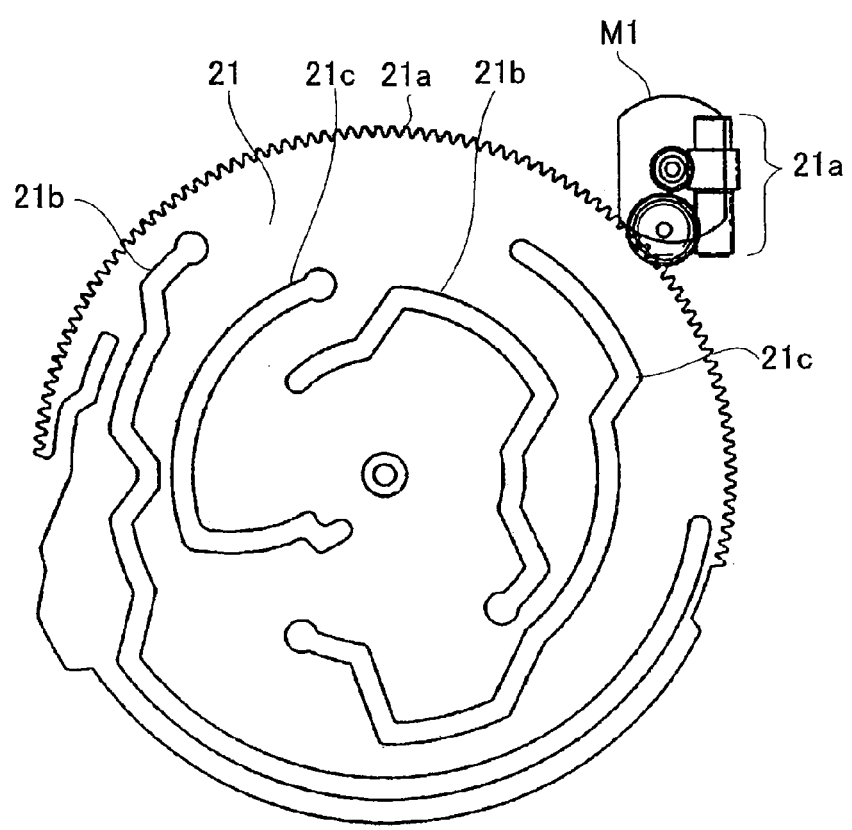
FIG. 22 is a planar view of the cam gear that is provided on the lower chassis unit in FIG. 21.

As shown in FIGS. 21 and 22, the circular cam gear 21 that is provided such that same is able to turn on the inside bottom face of the lower chassis unit 20 has an arc-shaped gear groove 21a formed on the outer edge of the circular cam gear 21. The cam gear drive gear mechanism 22a for which the cam gear drive motor M1 acts as a drive source engages in the gear groove 21a. Further, in order to divide the disk holder 10 in the desired position and form the space in which the drive base unit 60 is inserted, the cam gear 21 is formed having a disk selector drive control cam 21b for controlling the disk selectors 41A and 41B, a drive unit drive control cam 21c for turning the drive base unit 60 and inserting and withdrawing same in and from the insertion space, a disk stopper drive control cam 21d for controlling the holding/release of the disk D, and a loading block drive control cam 21e for moving the loading block 50 forward and backward.

Each of the cams provided on the cam gear 21 are concentric with the cam gear 21 and constituted such that a plurality of circular arcs of different rotational diameter are made to communicate, such that the position of the control target in which the pin is provided is determined by moving the pin inserted in each cam to any point. That is, as shown in FIGS. 23 to 27, the disk selector drive control cam 21b comprises a part for setting the disk selectors 41A and 41B in an initial position (0), a part for setting the disk selectors 41A and 41B in the holder open position (1) for retracting the holder plates 11 above and below the desired holder plate 11, a part for setting the disk selectors 41A and 41B in the holder open position (2) for lowering the desired holder plate 11 to retract same from the disk, and a part for setting the disk selectors 41A and 41B in the holder open position (3) to further retract all the holder plates 11 vertically.

Figure 32:
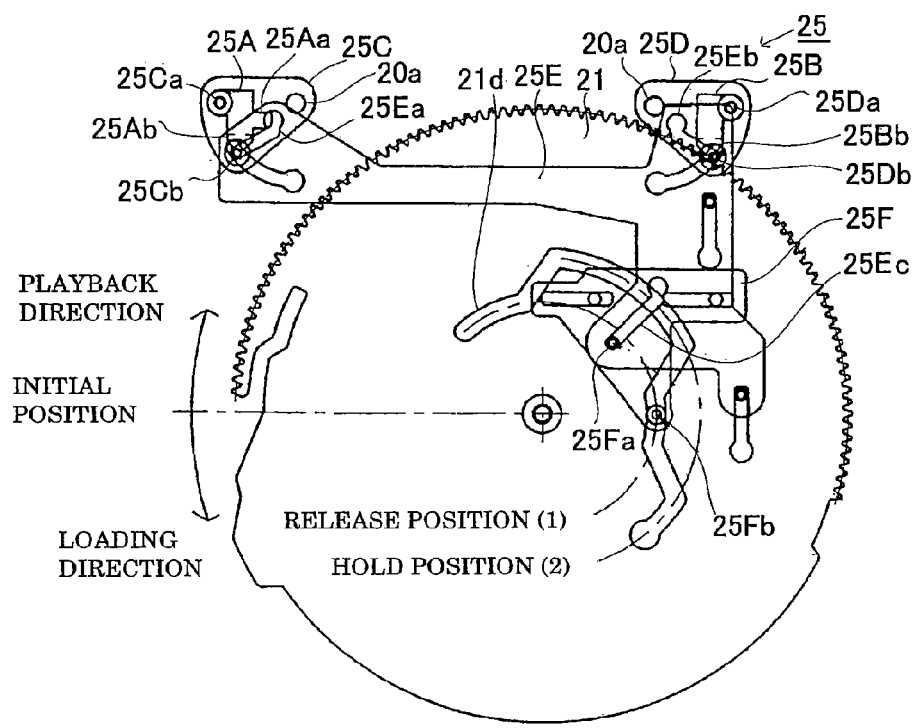
FIG. 32 is a planar view of the cam gear when the disk stopper mechanism is in the disk release position.
Figure 33:
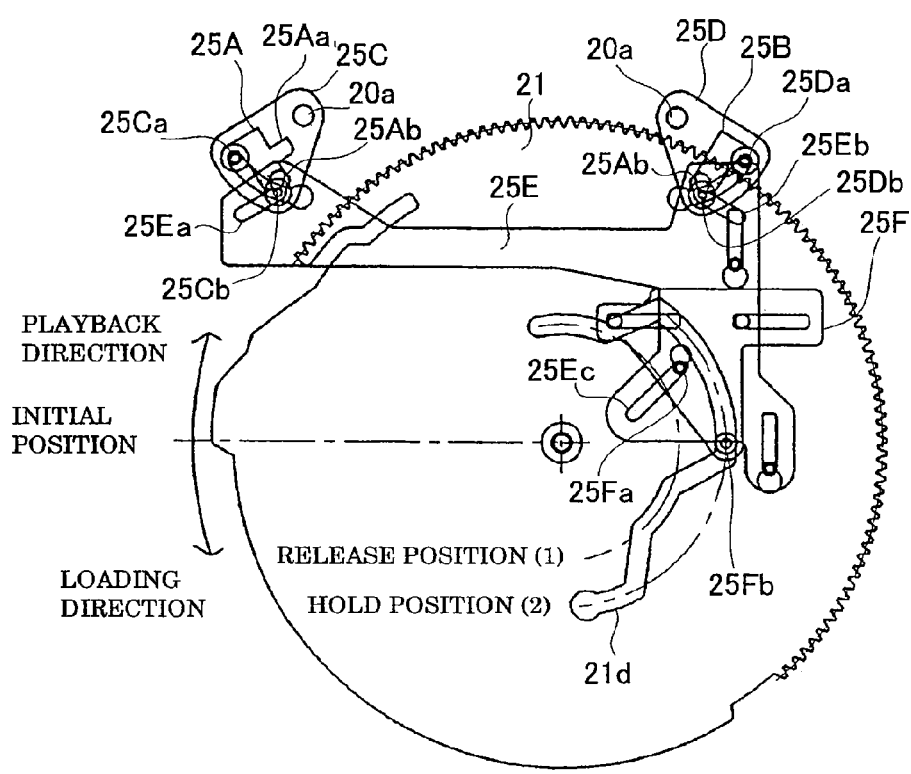
FIG. 33 is a planar view of the cam gear when the disk stopper mechanism is in the disk hold position.
Figure 36:
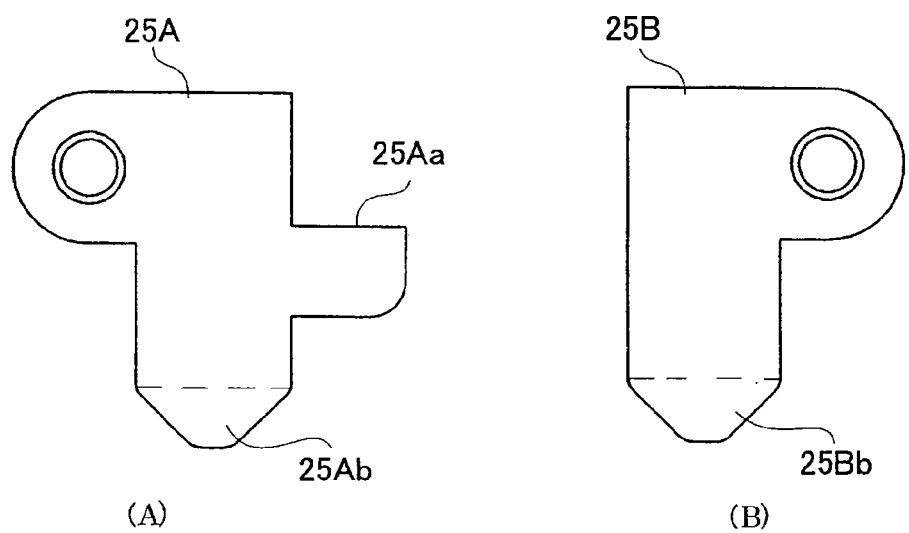
FIG. 36 is a planar view (A) of a right disk stopper and a planar view (B) of a left disk stopper.
Figure 39:
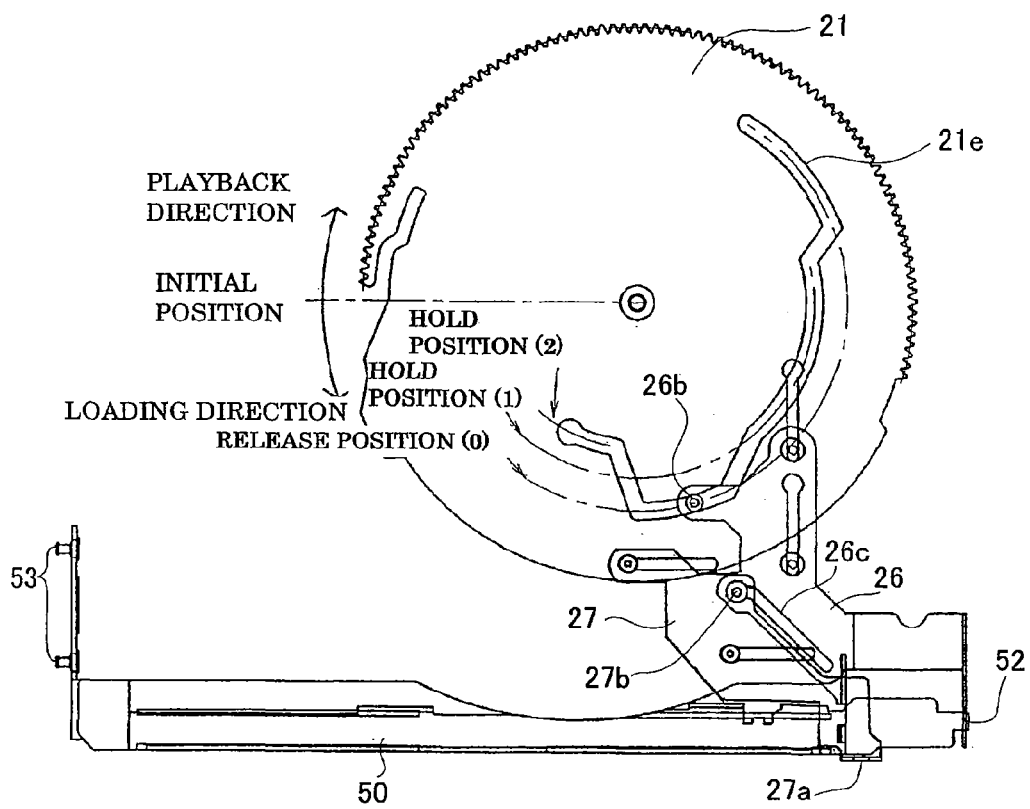
FIG. 39 is a planar view of the cam gear when a loading block is in the disk release position.
Figure 40:
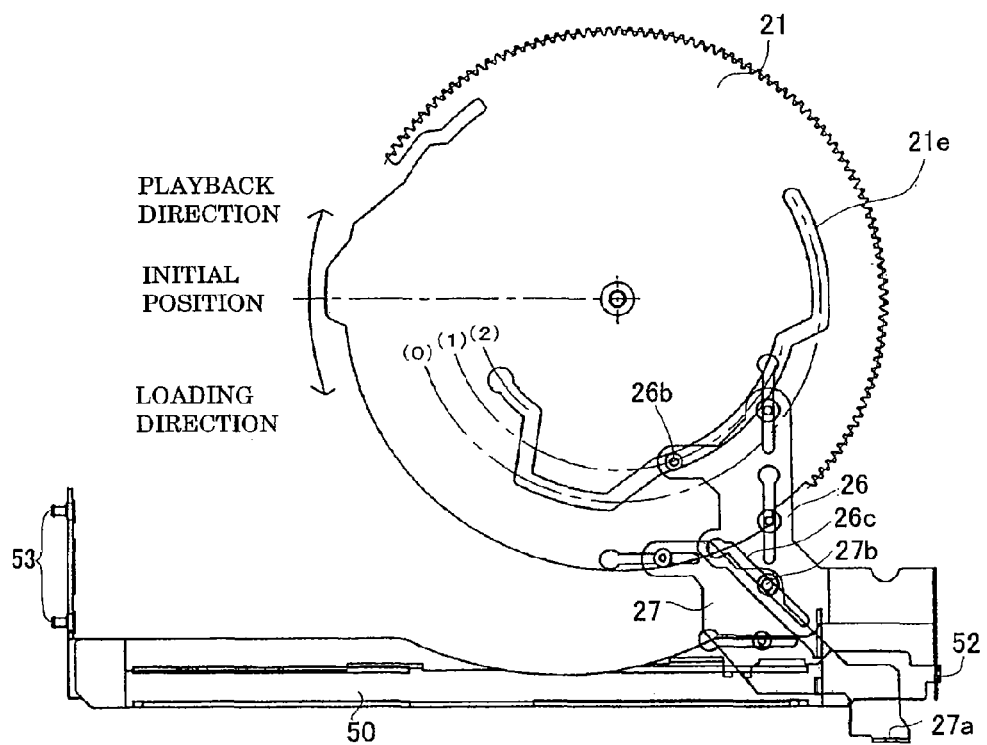
FIG. 40 is a planar view of the cam gear when the loading block is in the disk hold position (1)
Figure 41:
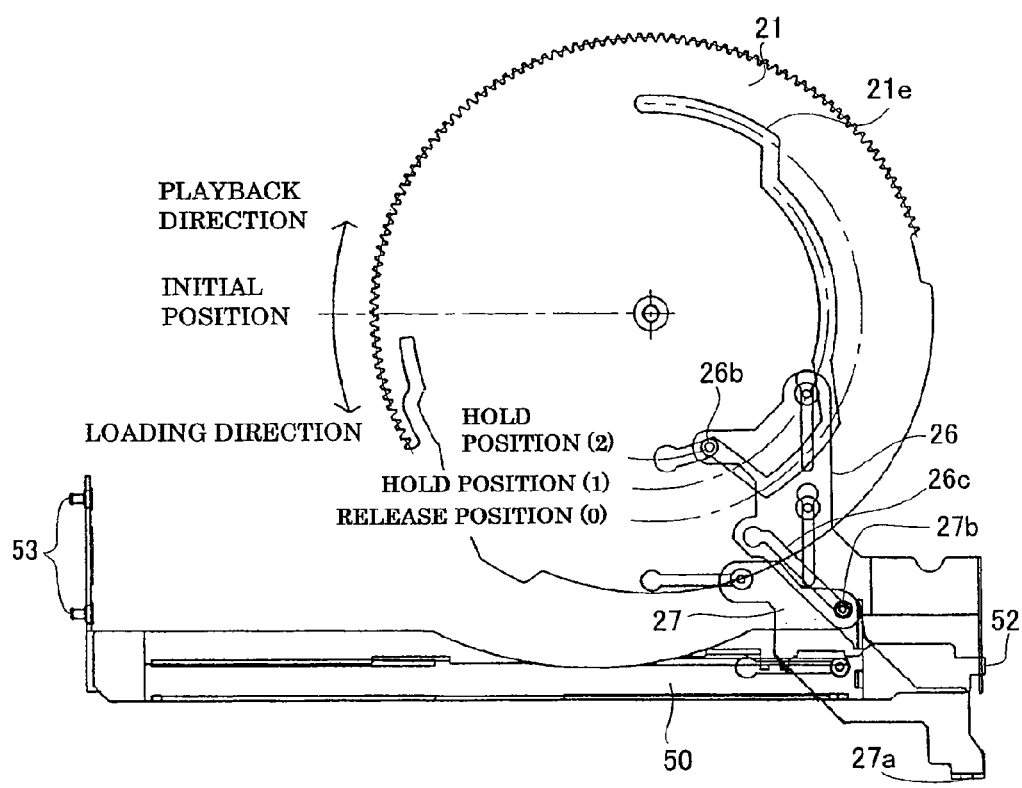
FIG. 41 is a planar view of the cam gear when the loading block is in a disk hold position (2)
Figure 43:
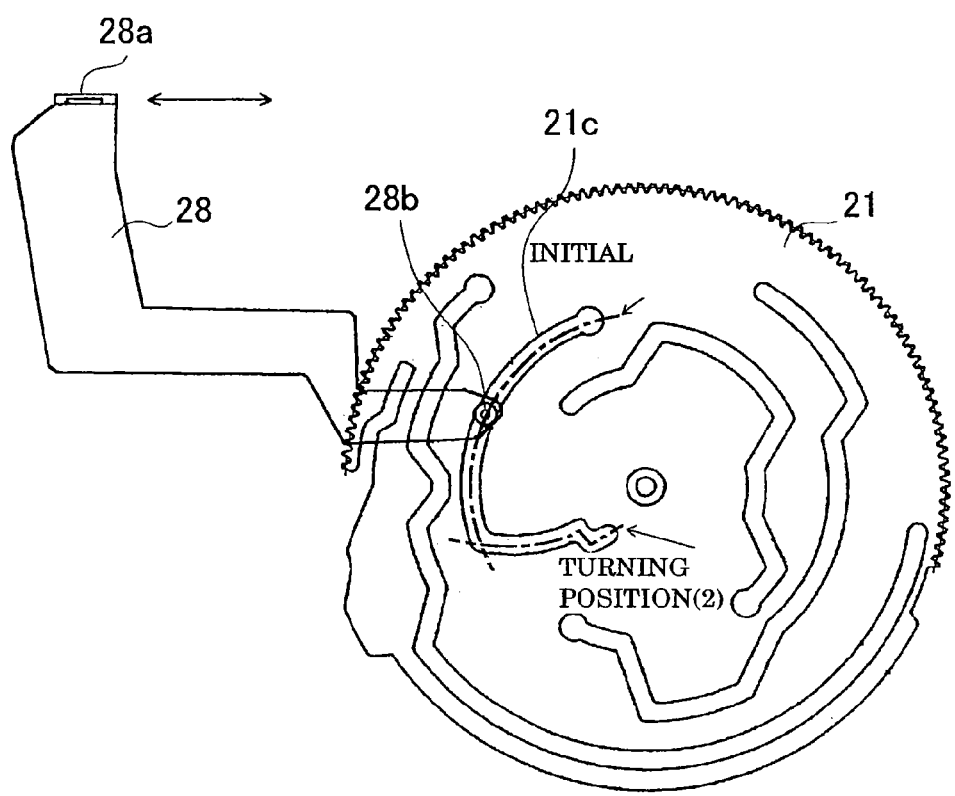
FIG. 43 is a planar view of the cam gear when the drive base drive plate is in an initial position.

As shown in FIGS. 32 and 33, the disk stopper drive control cam 21d comprises a part for setting disk stoppers 25A and 25B (described subsequently) in a release position (1) for releasing the disk D, and a part for setting disk stoppers 25A and 25B in the hold position (2) for grasping the disk D. As shown in FIGS. 39 to 41, the loading block drive control cam 21e comprises a part for setting the loading roller 51 in the release position (0) for releasing the loading roller 51 from the disk D, a part for setting the loading roller 51 in the hold position (1) that enables the disk D to be held by moving the loading roller 51 backward, and a part for setting the loading roller 51 in the hold position (2) that enables disk loading and disk unloading by moving the loading roller 51 further backward. Furthermore, as shown in FIG. 43, the drive unit drive control cam 21c comprises a part for holding the drive base 61 in the initial position (1), and a part for setting the drive base 61 in the turn position (2).

Each mechanism that is provided in the lower chassis unit 20 and which is driven by the cam gear 21 as above will be described hereinbelow.

2.2 Disk Selector Drive Mechanism

Figure 23:
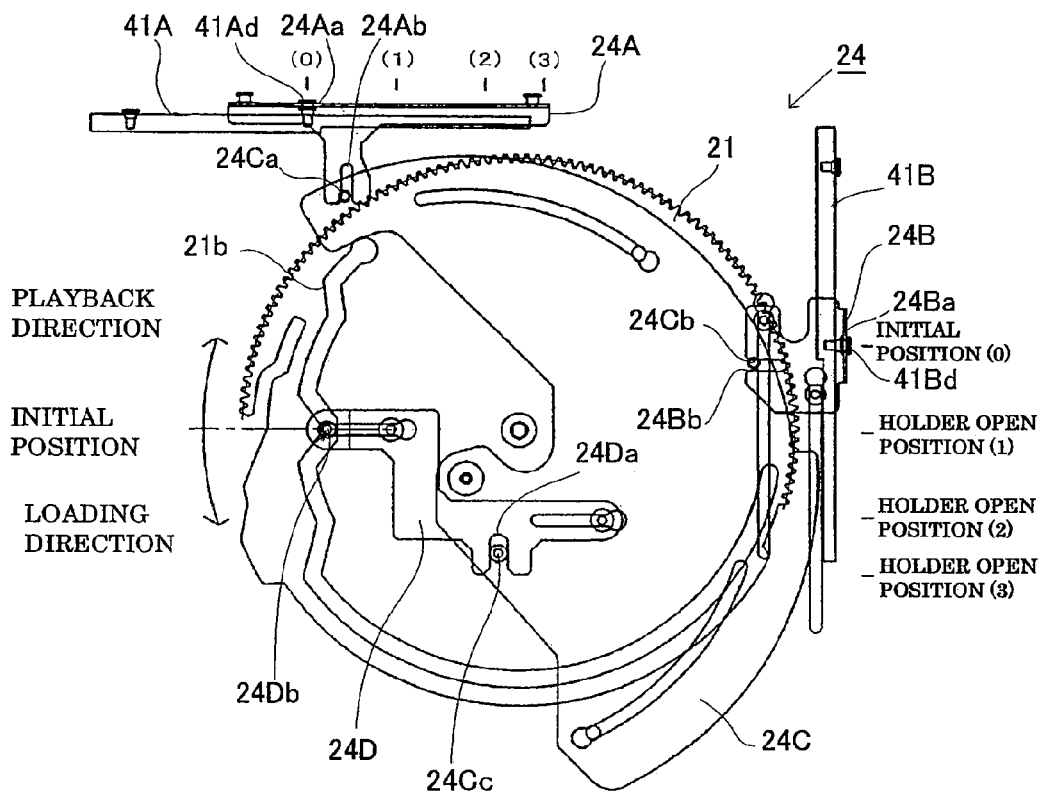
FIG. 23 is a planar view of the cam gear when the disk selector is in an initial position.

A disk selector drive mechanism 24 for driving the disk selectors 41A and 41B provided in the drive chassis unit 40 will be described first. That is, as shown in FIGS. 21 and 23, the disk selector drive mechanism 24 comprises disk select plates 24A and 24B that directly contact and drive the disk selectors 41A and 41B and disk select plates 24C and 24D that transmit the drive force from the cam gear 21 to the disk select plates 24A and 24B.

As shown in FIGS. 28A and 28B, the disk select plate 24A is a plate comprising a horizontal face that follows the inside bottom of the lower chassis unit 20 and a vertical face that follows the rear side, the disk select plate 24A being provided so that same is able to perform a sliding movement in a lateral direction. A recess 24Aa for a link with a pin 41Ad that is provided on the disk selector 41A is formed on the vertical face of the disk select plate 24A and a recess 24Ab for a link with a pin 24Ca that is provided on the disk select plate 24C is formed on the horizontal face of the disk select plate 24A.

As shown in FIGS. 29A, 29B, and 29C, the disk select plate 24B is a plate having a horizontal face that follows the inside bottom of the lower chassis unit 20 and a vertical face that follows the right side of the lower chassis unit 20, and the disk select plate 24B is provided such that same is capable of performing a sliding movement in the frontward/backward direction. A recess 24Ba for a link with a pin 41Bd that is provided on the disk selector 41B is formed on the vertical face of the disk select plate 24B and a recess 24Bb for a link with a pin 24Cb that is provided on the disk select plate 24C is formed on the horizontal face of the disk select plate 24B.

Figure 30:
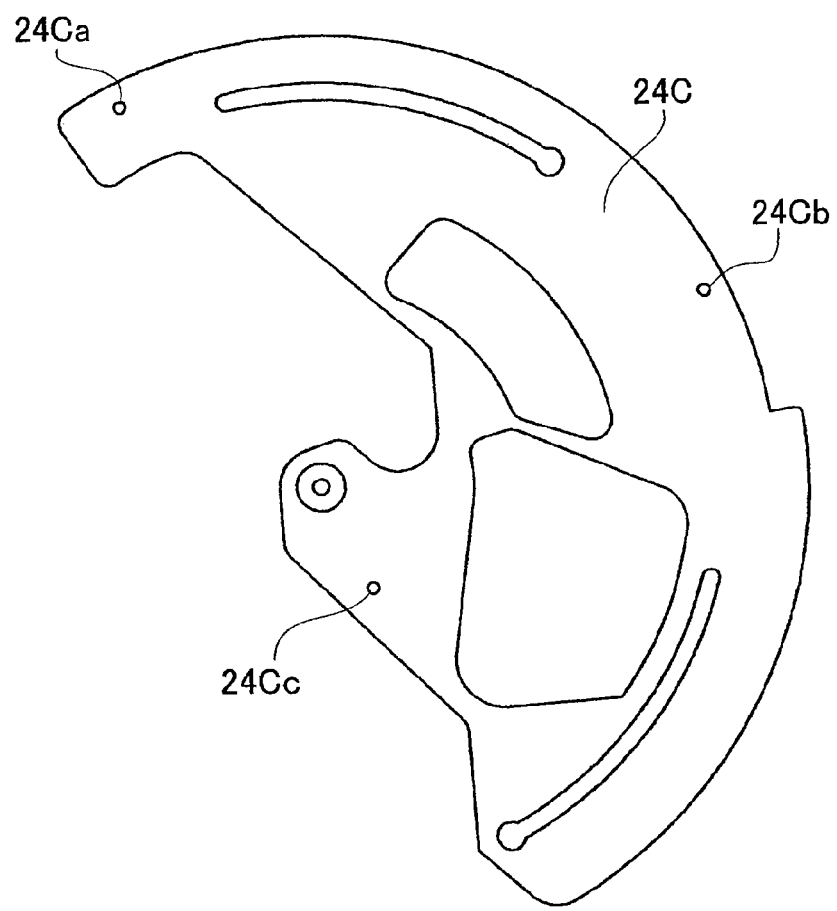
FIG. 30 is a planar view of a disk select plate 24C that drives the disk select plates 24A and 24B.
Figure 31:
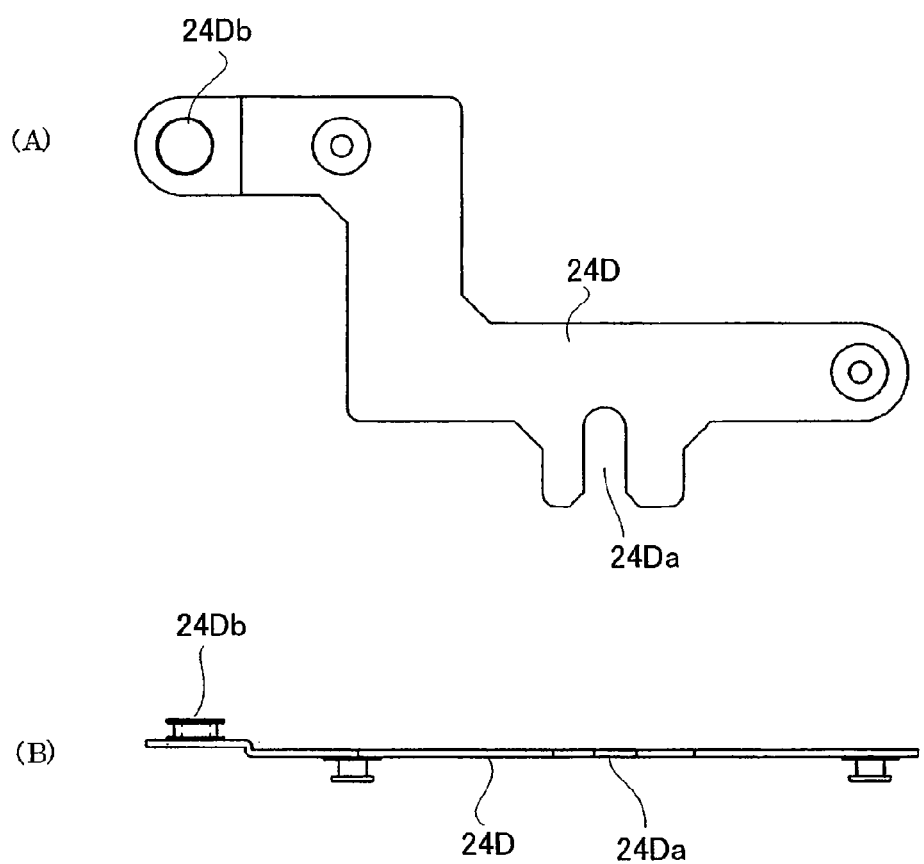
FIG. 31 is a planar view (A) and front view (B) of a disk select plate 24D that drives the disk select plate 24C.

As shown in FIG. 30, the disk select plate 24C is a substantially semi-circular plate that is provided such that same can turn on the inside bottom of the lower chassis unit 20 about an axis that is provided close to the axis of the cam gear 21. Further, as mentioned above, the disk select plate 24C is provided such that same is capable of transmitting power to the disk selectors 41A and 41B via the pins 24Ca and 24Cb. Further, a pin 24Cc that transmits a biasing force from the disk select plate 24D is also provided on the disk select plate 24C.

As shown in FIGS. 31A and 31B, the disk select plate 24D is a crank-shaped plate that is provided such that same is capable of performing a lateral sliding movement in the vicinity of the axis of the disk select plate 24C on the inside bottom of the lower chassis unit 20. A recess 24Da for a link with the pin 24Cc of the disk select plate 24C is provided on the disk select plate 24D. Further, a pin 24Db that is inserted in the disk selector drive control cam 21b of the cam gear 21 is provided at the end of the disk select plate 24D.

2-3. Disk Stopper Mechanism

A disk stopper mechanism 25 that is released during playback after grasping the disk D to be played back among the disks D stored in the disk holder 10 between the loading rollers 51 and retracting the holder plate 11 will be described next. That is, as shown in FIG. 32, the disk stopper mechanism 25 comprises disk stoppers 25A and 25B that abut against the edge of the disk, disk stopper links 25C and 25D for moving the disk stoppers 25A and 25B, a disk stopper plate 25E for driving the disk stopper links 25C and 25D, and a disk stopper plate 25F for transmitting the drive force from the cam gear 21 to the disk stopper plate 25E.

As shown in FIGS. 1 to 3, and 19 and 20, the disk stoppers 25A and 25B are attached to vertical shafts 25Ca and 25Da that are provided on the disk stopper links 25C and 25D. As shown in FIG. 36A, the disk stopper 25A comprises the convex portion 25Aa that biases the depressed portion 16a of the disk hold arm 16 of the disk holding mechanism 15 in accordance with the movement of the shaft 25Ca and a grasping portion 25Ab that contacts and leaves the edge of the disk D. As shown in FIG. 35B, the disk stopper 25B comprises a grasping portion 25Bb that contacts and leaves the disk D in accordance with the movement of the shaft 25Da.

As shown in FIGS. 21 and 32, the disk stopper links 25C and 25D are each provided such that same are capable of turning about the guide shafts 20a at the back of the inside bottom of the lower chassis unit 20. Further, as shown in FIGS. 34 and 35, shafts 25Ca and 25Da to which the disk stoppers 25A and 25B are attached are provided on the disk stopper links 25C and 25D. In addition, the disk stopper links 25C and 25D are provided with pins 25Cb and 25Db for transmitting the biasing force of the disk stopper plate 25E.

Figure 37:
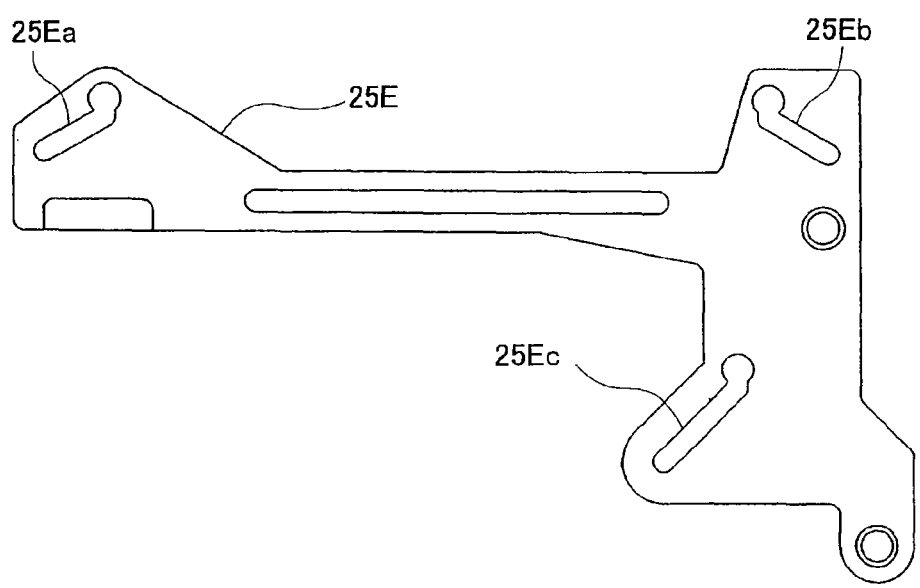
FIG. 37 is a planar view of a disk stopper plate 25E that drives the disk stopper.
Figure 38:
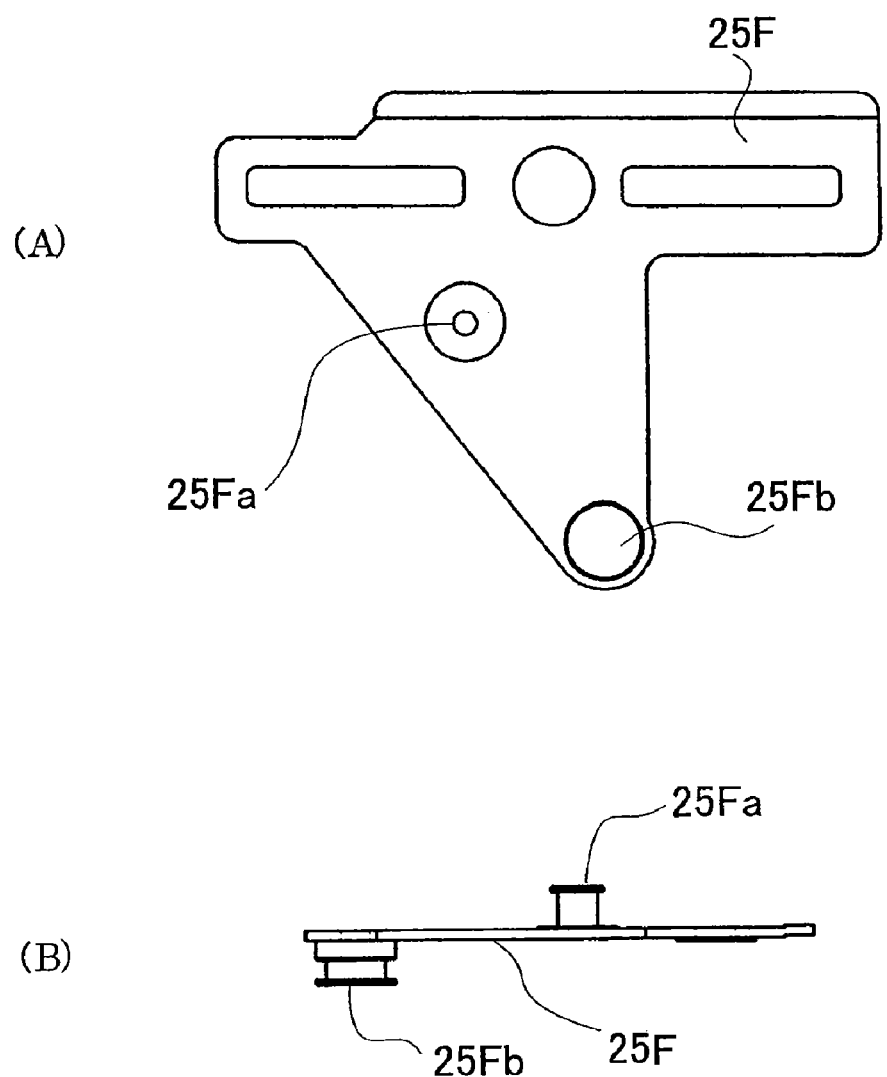
FIG. 38 is a planar view (A) and front view (B) of a disk stopper plate 25F that drives the disk stopper plate 25E.
Figure 44:
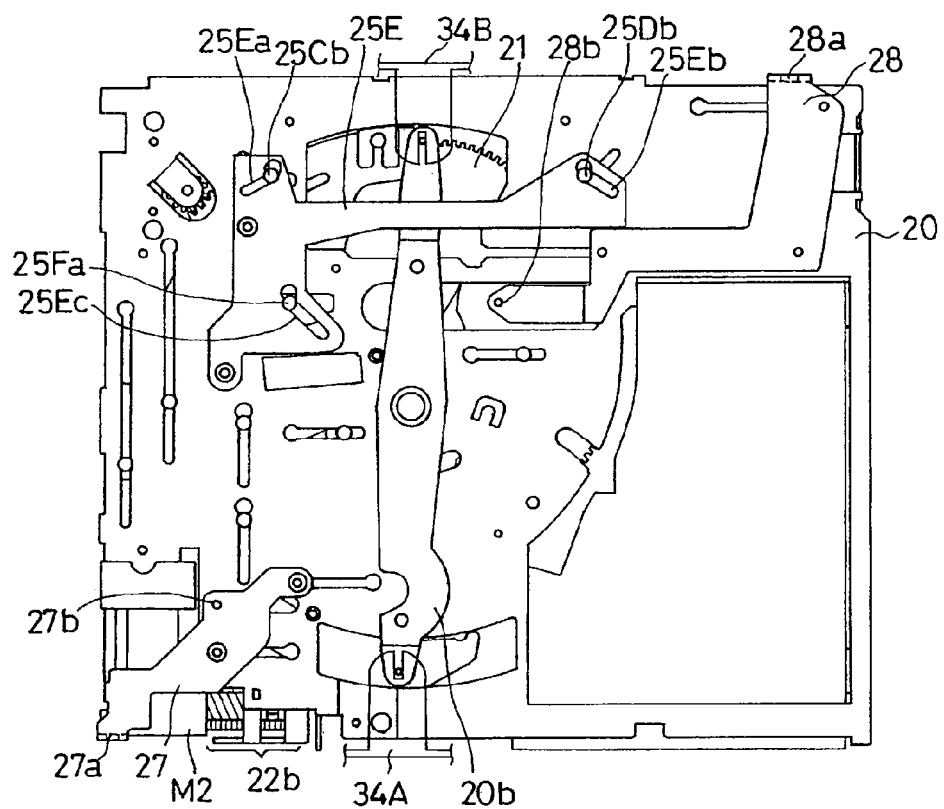
FIG. 44 is an external bottom view of the lower chassis unit in FIG. 21.

As shown in FIGS. 32 and 44, the disk stopper plate 25E is provided such that same is capable of performing a sliding movement forward and backward on the outside bottom of the lower chassis unit 20. As shown in FIG. 37, the disk stopper plate 25E is formed having substantially V-shaped cam holes 25Ea and 25Eb into which pins 25Cb and 25Db of the disk stopper links 25C and 25D respectively are inserted. Further, the disk stopper plate 25E is provided with a slanting cam hole 25Ec into which a pin 25Fa of the disk stopper plate 25F is inserted. As shown in FIG. 32, the disk stopper plate 25F is provided such that same is capable of a lateral sliding movement on the inside bottom of the lower chassis unit 20. As shown in FIG. 38, the pin 25Fa is provided on the disk stopper plate 25F. Further, the disk stopper plate 25F is provided with a pin 25Fb into which the disk stopper drive control cam 21d of the cam gear 21 is inserted.

2-4. Right Loading Block Slide Plate

Figure 42:
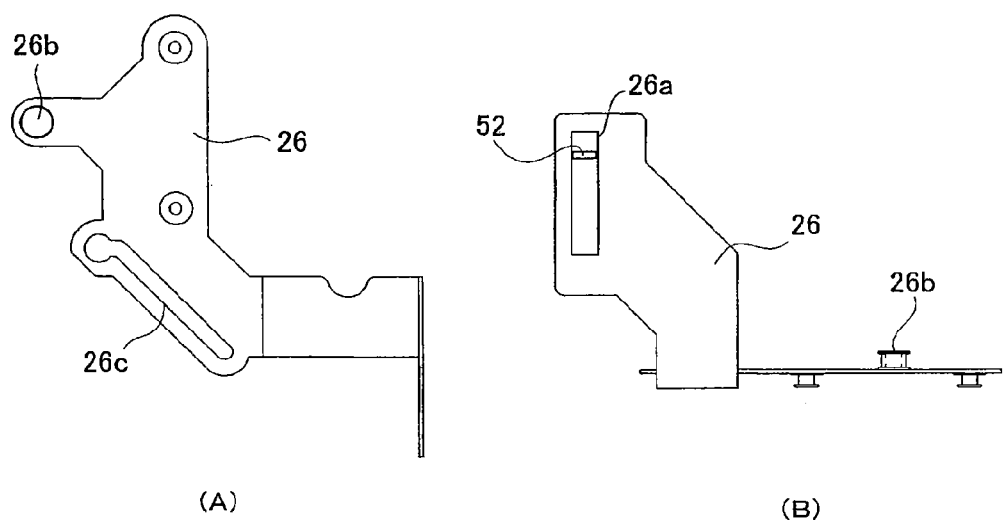
FIG. 42 is a planar view (A) and right-side view (B) of a right loading block slide plate.

A right loading block slide plate 26 for moving the loading block 50 forward and backward will be described next. That is, as shown in FIGS. 21 and 39, the right loading block slide plate 26 is a plate comprising a horizontal portion that follows the outside bottom of the lower chassis unit 20 and a vertical portion that follows the right side, the horizontal portion being provided such that same is capable of sliding forward and backward on the inside bottom of the lower chassis unit 20. As shown in FIG. 42, a hole 26a that engages with a protruding portion 52 at the right end of the loading block 50 (described subsequently) is provided on the vertical portion of the right loading block slide plate 26.

The hole 26a moves the loading block 50 forward and backward in accordance with the forward/backward movement of the right loading block slide plate 26 but is formed in an oblong rectangular shape to allow the loading block 50 to rise and fall in accordance with the vertical action of the drive chassis unit 40. Further, the right loading block slide plate 26 is provided with a pin 26b that is inserted in the loading block drive control cam 21e of the cam gear 21. In addition, the right loading block slide plate 26 is formed having a slanting cam hole 26c for driving a shutter link plate 27.

2-5. Shutter Link Plate

Furthermore, the lower chassis unit 20 is provided with the shutter link plate 27 for transmitting a drive force to the shutter opening/closing mechanism (described subsequently). As shown in FIGS. 21, 39, and 44, the shutter link plate 27 is a plate comprising a horizontal portion that follows the outside bottom of the lower chassis unit 20 and a vertical portion following the front face, the horizontal portion being provided such that same is capable of performing a lateral sliding movement on the outside bottom of the lower chassis unit 20. The vertical portion of the shutter link plate 27 is provided with a recess 27a for transmitting a drive force to the turning plate 34 of the shutter opening/closing mechanism. Further, the horizontal portion of the shutter link plate 27 is provided with a pin 27b that is inserted in the cam hole 26c of the loading block slide plate 26.

2-6. Drive Base Drive Plate

Figure 79:
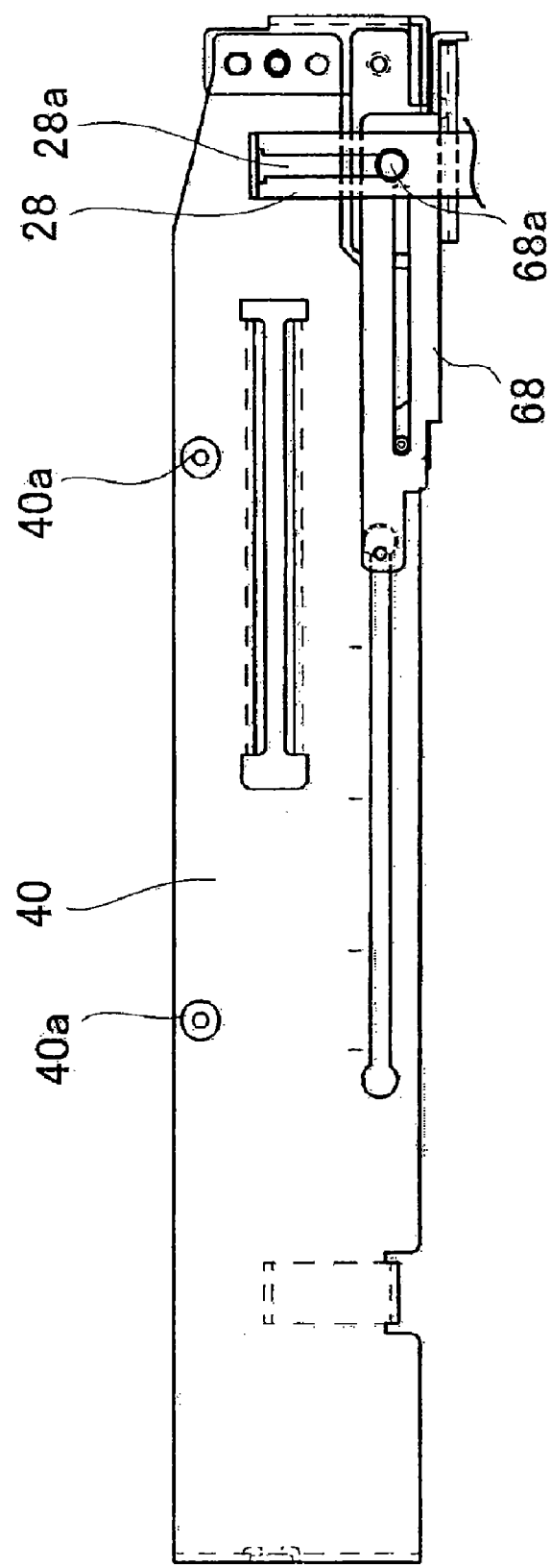
FIG. 79 is a rear view of the drive chassis unit in FIG. 76.
Figure 80:
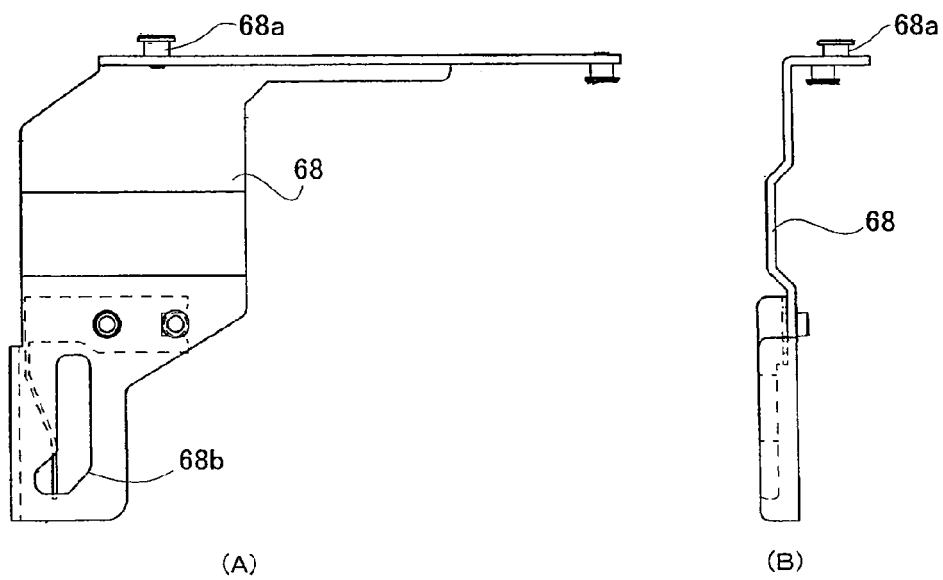
FIG. 80 is a planar view (A) and left-side view (B) of the drive shift plate of the drive chassis unit in FIG. 76.

In addition, the lower chassis unit 20 is provided with a drive base drive plate 28 for turning the drive base unit 60. That is, as shown in FIGS. 21, 43, and 44, the drive base drive plate 28 is a plate comprising a horizontal portion that follows the outside bottom of the lower chassis unit 20 and a vertical portion that follows the rear face, the horizontal portion being provided such that same is capable of performing a lateral sliding movement on the outside bottom of the lower chassis unit 20. As shown in FIG. 79, the vertical portion of the drive base drive plate 28 is formed having a hole 28a for transmitting a drive force to the drive base unit 60. The hole 28a is formed having an oblong rectangular shape to allow the drive base unit 60 to rise and fall in accordance with the vertical action of the drive chassis unit 40. Further, the horizontal portion of the drive base drive plate 28 is provided with a pin 28b that is inserted in the drive unit drive control cam 21c of the cam gear 21.

3. Upper Chassis Unit 3-1. Disk Slot Opening/Closing Mechanism

Figure 45:
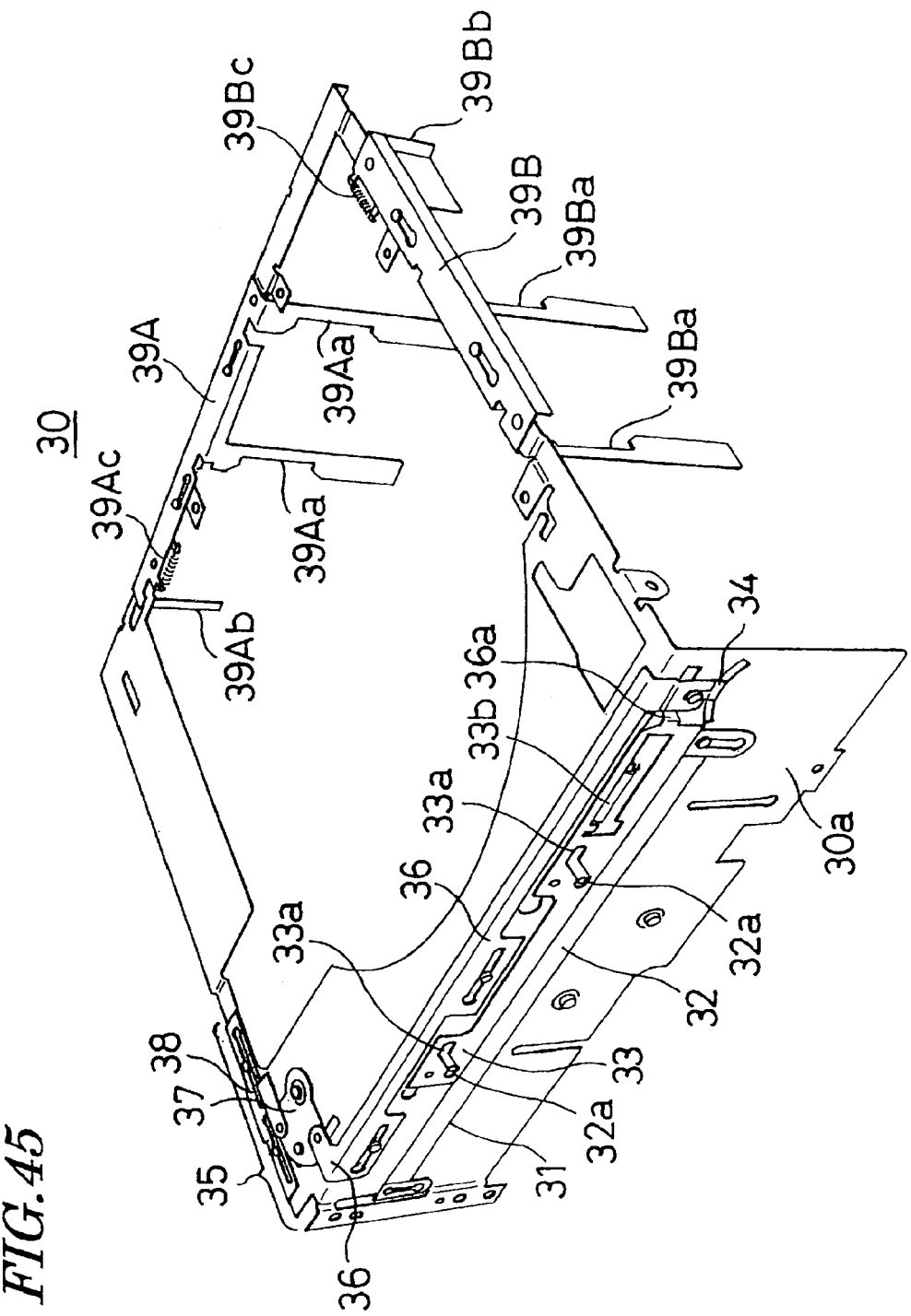
FIG. 45 is a perspective view of an upper chassis unit of the embodiment in FIG. 1.
Figure 46:
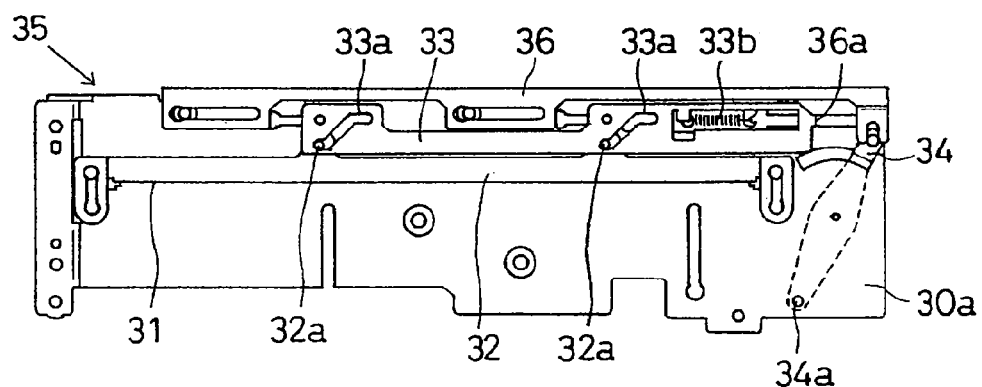
FIG. 46 is a front view of when the shutter of the upper chassis unit in FIG. 45 is closed.
Figure 47:
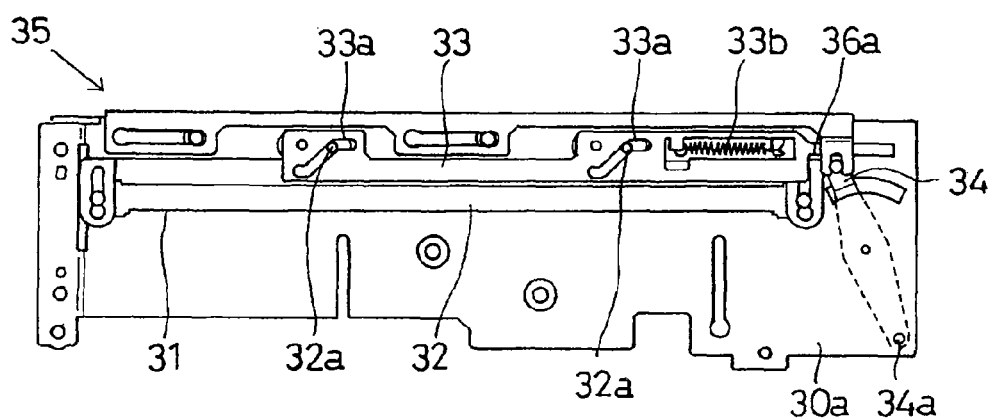
FIG. 47 is a front view of when the shutter of the upper chassis unit in FIG. 45 is open.

As shown in FIGS. 45 to 47, the disk slot 31 of the front plate 30a of the upper chassis unit 30 is formed such that the position in the height direction of the disk slot 31 is at the top of the disk drive, while the position of the disk slot 31 in the width direction is formed substantially in the center of the disk drive. The shutter 32 that opens and closes the disk slot 31 is provided on the front plate 30a such that the shutter 32 is capable of performing a vertical sliding movement. Further, the shutter opening/closing plate 33 is provided on the front plate 30a such that the shutter opening/closing plate 33 is capable of performing a sliding movement and a pin 32a that is provided on the shutter 32 is inserted in a slanting cam hole 33a provided in the shutter opening/closing plate 33. As a result, as shown in FIGS. 46 and 47, the slanting cam hole 33a biases the pin 32a upward or downward in accordance with the lateral movement of the shutter opening/closing plate 33 and is therefore constituted such that the disk slot 31 opens and closes as a result of the vertical action of the shutter 32.

Further, the shutter opening/closing plate 33 is biased toward the right by a spring 33b such that, in an initial state, the shutter 32 is in the closed position. Further, the front plate 30a is provided with a turning plate 34 such that same is capable of turning. As shown in FIG. 4, a pin 34a that engages with the recess 27a of the shutter link plate 27 is provided at the lower end of the turning plate 34. Further, as will be mentioned subsequently, the constitution is such that the shutter opening/closing plate 33 and left loading block slide mechanism 35 act in accordance with the turning of the turning plate 34.

3-2. Left Loading Block Slide Mechanism

As shown in FIGS. 45 to 49, the left loading block slide mechanism 35 is constituted by a slide link 36, turning link 37, and left loading block slide plate 38. The slide link 36 is provided such that same is capable of a lateral sliding movement on the front plate 30a and the right end of the slide link 36 is linked to the upper end of the turning plate 34. Further, the slide link 36 is provided with a depressed portion 36a that biases the right end of the shutter opening/closing plate 33 in accordance with a sliding movement toward the left. The turning link 37 is provided such that same is capable of turning in the front left-hand corner of the upper face of the upper chassis unit 30, and is constituted such that one end of the turning link 37 is linked to the left end of the slide link 36 such that the turning link 37 turns in accordance with the sliding movement of the slide link 36.

Figure 49:
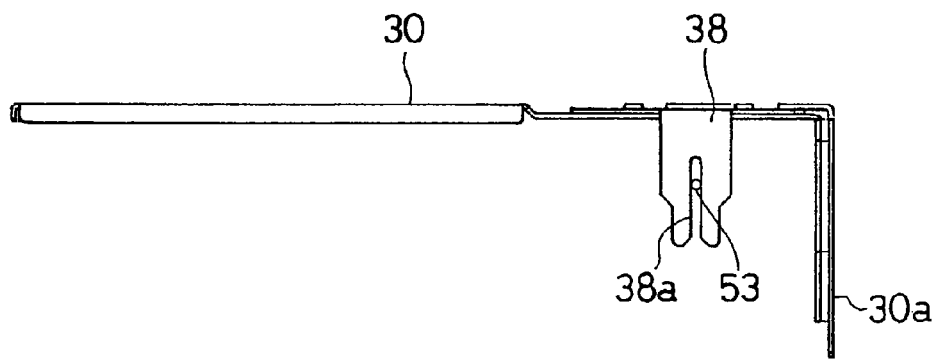
FIG. 49 is a left side view of the upper chassis unit in FIG. 45.

The left loading block slide plate 38 is a plate comprising a horizontal portion that follows the upper face of the upper chassis unit 30 and a vertical portion that follows the left side of the upper chassis unit 30, the horizontal portion being provided such that same is capable of a forward and backward sliding movement on the upper face of the upper chassis unit 30. The constitution is such that the other end of the turning link 37 is linked to the horizontal portion of the left loading block slide plate 38 and therefore performs a sliding movement in accordance with the turning of the turning link 37. As shown in FIG. 49, the vertical portion of the left loading block slide plate 38 is provided with a groove 38a that engages with a pin 53 on the left end of the loading block 50 (described subsequently). The groove 38a is formed as an oblong such that the loading block 50 moves forward and backward in accordance with the forward and backward action of the left loading block slide plate 38 but such that the loading block 50 that follows the vertical action of the drive chassis unit 40 is allowed to rise and fall.

3-3. Drive Chassis Elevator Plate

As shown in FIGS. 4 and 44, the drive chassis elevator plates 34A and 34B are provided such that same are capable of a lateral sliding movement on the front and rear faces of the upper chassis unit 30 respectively. The pair of drive chassis elevator plates 34A and 34B are linked such that same are capable of sliding in mutually opposing directions by a link plate 20b that is provided such that same is capable of turning on the outside bottom face of the lower chassis unit 20. Further, a step-shaped cam 34Aa (34B is not illustrated) is formed on the drive shaft elevator plates 34A and 34B and the step-shaped cam 34Aa is constituted such that, by inserting a pin 40a that is provided at the front and back of the drive chassis unit 40 (described subsequently), the drive chassis unit 40 rises and falls in accordance with the sliding movement of the drive chassis elevator plates 34A and 34B.

Furthermore, as shown in FIG. 4, a horizontal rack 34Ab is formed on the drive chassis elevator plate 34A and the drive chassis elevator gear mechanism 22b that is driven by the drive chassis elevator motor M2 provided on the lower chassis unit 20 engages with the rack 34Ab. Accordingly, the constitution is such that, when the drive chassis elevator motor M2 operates, the drive chassis elevator plate 34A performs a sliding movement via the drive chassis elevator gear mechanism 22b and, at the same time, as shown in FIG. 44, the drive chassis elevator plate 34B performs a sliding movement in the reverse direction via a link plate 20b. Further, as shown in FIG. 4, a rectangular-wave-shaped groove 34Ac is formed in the drive chassis elevator plate 34A and, as a result of a sensor sensing the groove 34Ac, the position of the drive chassis elevator plate 34A is detected and the height of the drive chassis unit 40 can be controlled.

3-4. Disk Holder Division Guide

Figure 48:
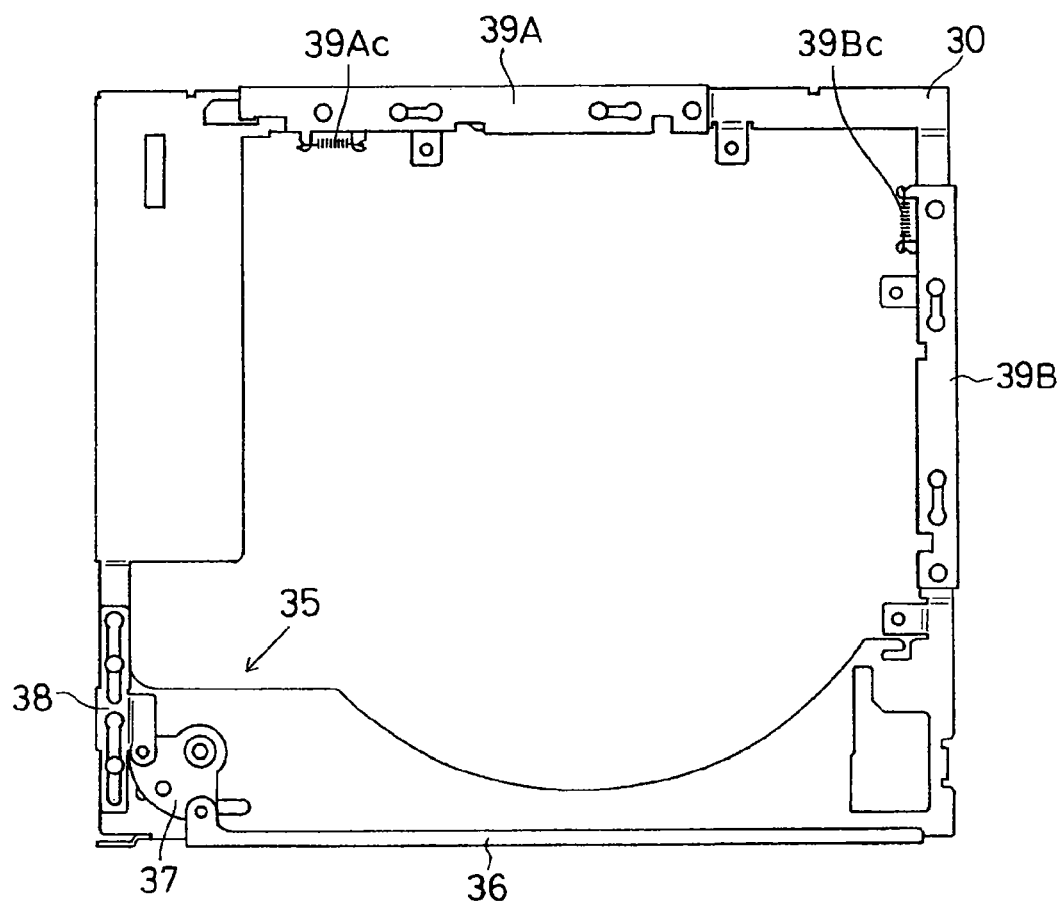
FIG. 48 is a planar view of the upper chassis unit in FIG. 45.
Figure 50:
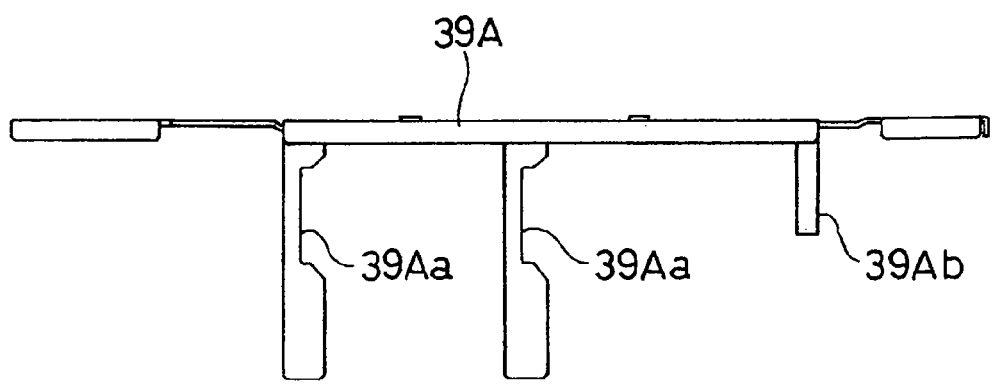
FIG. 50 is a rear view of the upper chassis unit in FIG. 45.
Figure 51:
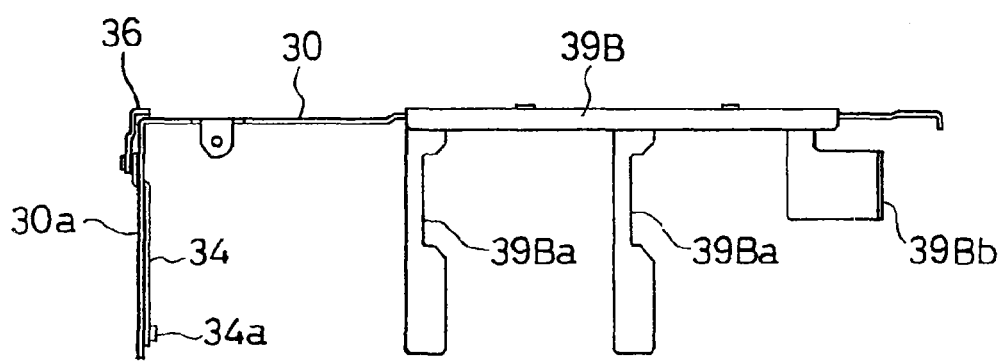
FIG. 51 is a right side view of the upper chassis unit in FIG. 45.
Figure 56:
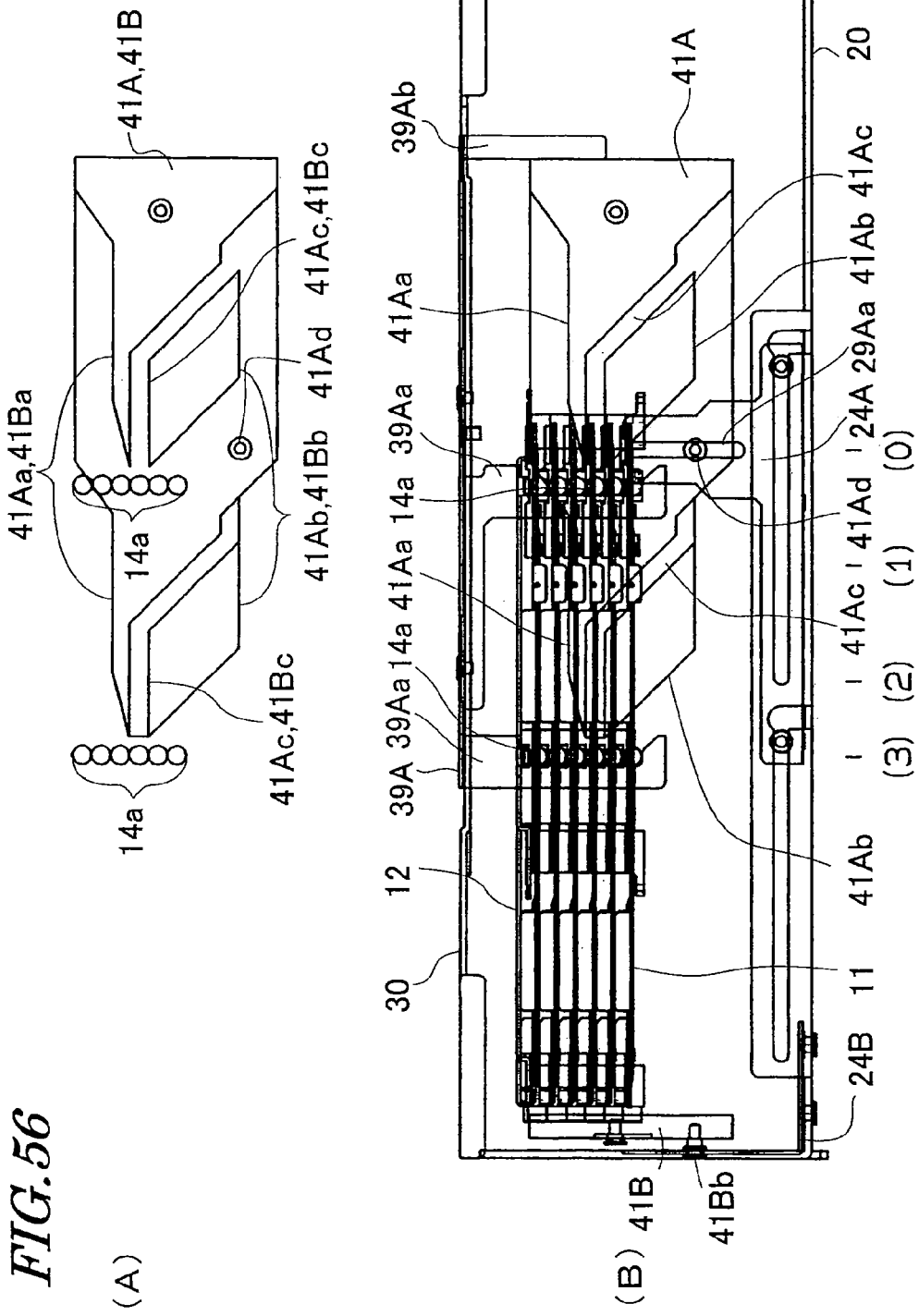
FIG. 56 is an explanatory diagram (A) of the disk selector and protrusion in the initial position and a transparent rear view (B) of the disk drive in the same state.

In addition, as shown in FIGS. 48, 50, and 51, the upper chassis unit 30 is provided with disk holder division guides 39A and 39B. The disk holder division guide 39A comprises a horizontal portion that follows the rear upper face of the upper chassis unit 30 and a vertical portion that is parallel to the rear side, the horizontal portion being provided such that same is capable of performing a lateral sliding movement on the upper face of the upper chassis unit 30. The vertical portion of the disk holder division guide 39A is provided with a guide portion 39Aa. As shown in FIG. 56, the guide portion 39Aa abuts against a protrusion 13 of the holder plate 11 that is biased by the disk selector 41A so that the disk holder 10 is divided smoothly, from the side opposite the bias direction. Further, the left end (right end when viewed from the rear side) of the disk holder division guide 39A is provided with an abutment portion 39Ab against which the end of the disk selector 41A abuts. In addition, the disk holder division guide 39A is biased toward the right (in the same direction as the bias direction of the disk selector 41A when the disk is divided) by a spring 39Ac.

The disk holder division guide 39B comprises a horizontal portion that follows the upper right face of the upper chassis unit 30 and a vertical portion that is parallel to the right side, the horizontal portion being attached such that same can slide forward and backward to the upper face of the upper chassis unit 30. The vertical portion of the disk holder division guide 39B is provided with a guide portion 39Ba. The guide portion 39Ba abuts against the protrusion 13 of the holder plate 11 biased by the disk selector 41B from the opposite side from the bias direction. Further, the rear end (right end when viewed from the side) of the disk holder division guide 39B is provided with an abutment portion 39Bb against which the end of the disk selector 41B abuts. In addition, the disk holder division guide 39B is forwardly biased (in the same direction as the bias direction of the disk selector 41B during disk division) by a spring 39Bc.

4. Drive Chassis Unit 4-1. Disk Selector

Figure 52:
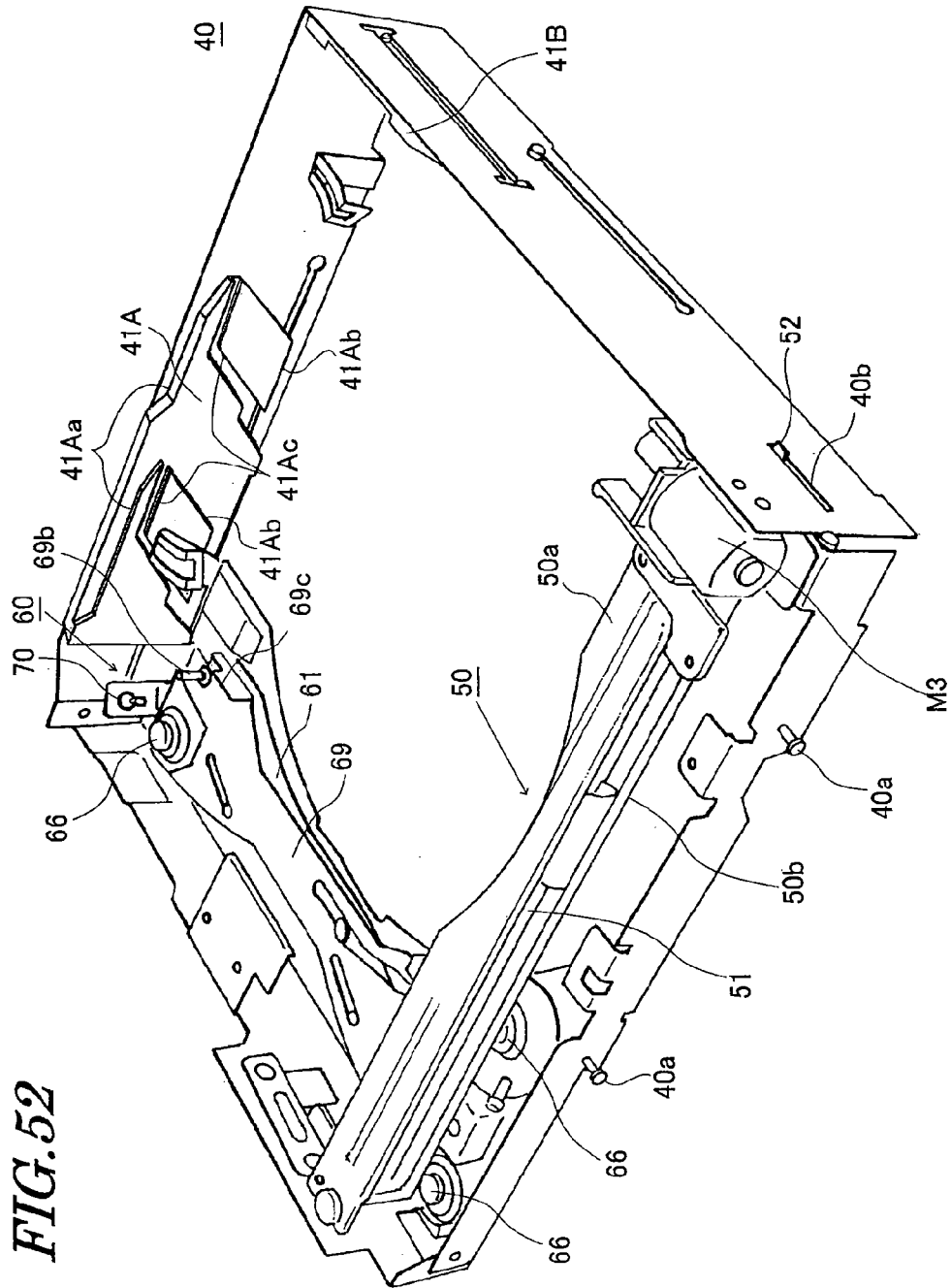
FIG. 52 is a perspective view of a drive chassis unit of the embodiment in FIG. 1.
Figure 53:
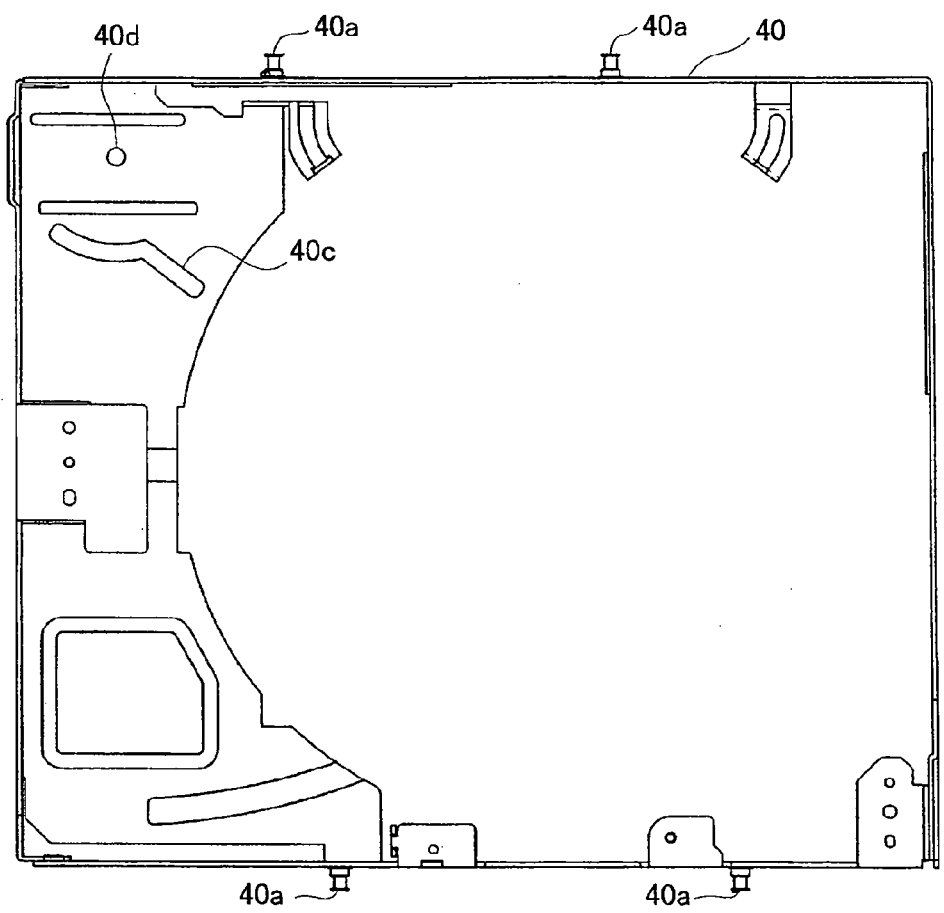
FIG. 53 is a planar view of a frame of the drive chassis unit in FIG. 52.
Figure 54:
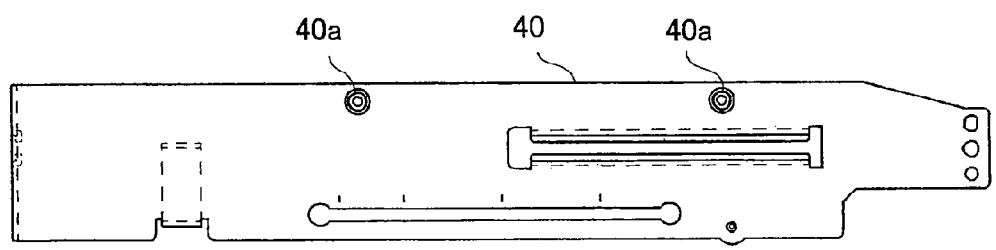
FIG. 54 is a rear view of FIG. 53.

As mentioned earlier, the drive chassis unit 40 is raised or lowered by the drive chassis elevator plates 34A and 34B but plays the role of aligning the disk selectors 41A and 41B in the desired division position of the disk holder 10. As shown in FIG. 52, the disk selectors 41A and 41B are provided such that same are capable of sliding to the rear inside face and right inside face of the drive chassis unit 40. As shown in FIGS. 56A and 56B, the tips of the cams formed on the disk selectors 41A and 41B have a wedge shape and the cams comprise flat upper cams 41Aa and 41Ba, lower cams 41Ab and 41Bb and middle cams 41Ac and 41Bc that abut against the protuberance 14a of the holder plate 11 in accordance with the movement of the cams.

The upper cams 41Aa and 41Ba are cams that comprise a rising oblique face and a horizontal face that is joined to the rising oblique face, and a further rising oblique face and a horizontal face that is joined to the rising oblique face in order to bias upward the protuberance 14a of the holder plate 11 above the holder plate 11 that stores the disk D that is played back. The lower cams 41Ab and 41Bb are cams that comprise a falling oblique face and a horizontal face that is joined to the falling oblique face and a further falling oblique face and a horizontal face that is joined to the falling oblique face in order to bias downward the protuberance 14a of the holder plate 11 below the holder plate 11 storing the disk that is played back. The middle cams 41Ac and 41Bc are cams provided between the upper cams 41Aa and 41Ba and the lower cams 41Ab and 41Bb that comprise a horizontal face and a falling oblique face that is joined to the horizontal face so that the protuberance 14a of the holder plate 11 that stores the disk that is played back moves downward behind the holder plate 11 below the protuberance 14a and the middle cams 41Ac and 41Bc merge with the lower cams 41Ab and 41Bb.

4.2 Disk Guide

As shown in FIG. 60, a disk guide 42 is provided on the left within the drive chassis unit 40 and is constituted such that the left edge of the disk D abuts against the disk guide 42 when a disk is fed into the disk holder 10. More specifically, as shown in FIGS. 61 to 66A to 66C, the disk guide 42 is a substantially C-shaped member that allows one disk to pass from a front perspective. An oblique face 42a that slants up and to the right from a planar perspective is formed on the left inside face of the disk guide 42. As a result, as shown in FIGS. 60 and 62 to 65, when a disk is fed in, a disk that is introduced in a direction that is orthogonal to the loading roller 51 from the disk slot 31 changes course as a result of the left edge of the disk abutting against the oblique face 42a and is guided obliquely upward and to the right from a planar perspective. Further, when the disk is fed out, the disk, which is ejected obliquely downward and to the left from a planar perspective, changes course in a direction orthogonal to the loading roller 51 as a result of the left edge of the disk abutting against the oblique face 42a and is ejected from the disk slot 31. Therefore, as shown in FIGS. 60 and 62, even when the center C1 of the disk holder 10 is displaced to the right from the center hole of the disk D in the disk slot 31 from a planar perspective, the disk D is correctly fed into the disk holder 10 and fed out therefrom as shown in FIGS. 60 and 63 to 65.

5. Loading Block

Figure 55:
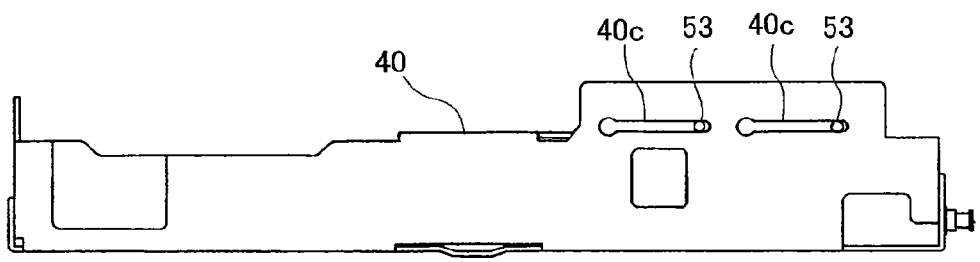
FIG. 55 is a left side view of FIG. 53.

As shown in FIGS. 67 to 71, the loading block 50 comprising the loading roller 51 is a rectangular frame rendered by integrating the upper and lower loading plates 50a and 50b and the protruding portion 52 provided at the right end of the rectangular frame is slidably inserted in a forward/backward slit 40b that is formed in the right side of the drive chassis unit 40 as shown in FIG. 52. Further, the pin 53 provided on the left end of the loading block 50 is slidably inserted in a forward/backward slit 40c that is formed on the left side of the drive chassis unit 40 as shown in FIG. 55.

Further, as shown in FIGS. 39 to 42, the protruding portion 52 engages with the hole 26a of the right loading block slide plate 26 and, as shown in FIG. 49, the pin 53 engages in the groove 38a of the left loading block slide plate 38. As a result, the constitution is such that the loading block 50 slides forward and backward in accordance with the movement of the left and right loading block slide plates 26 and 28.

Figure 73:
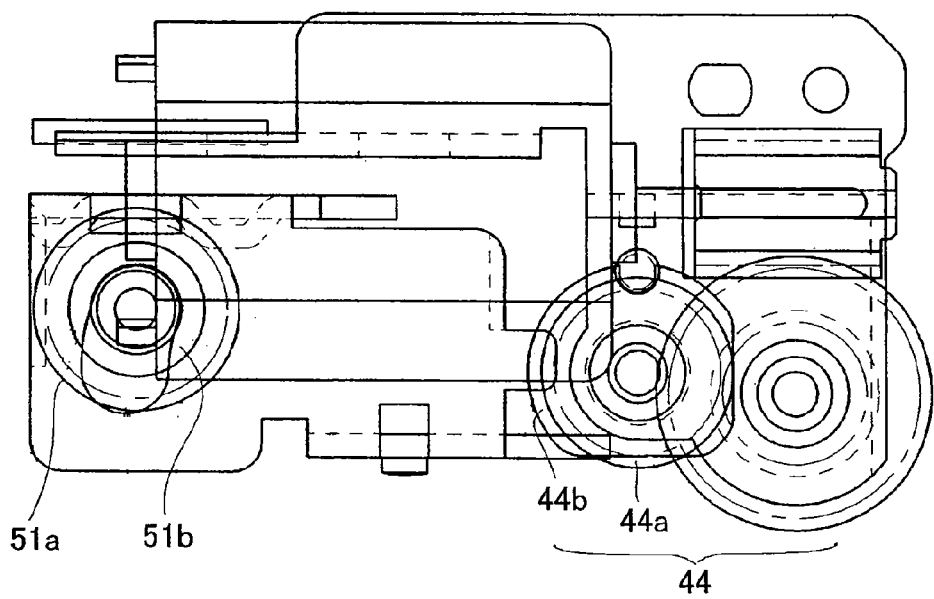
FIG. 73 is a transparent side view of a state where the roller gear of the loading block in FIG. 67 and the loading gear mechanism are separate.
Figure 74:
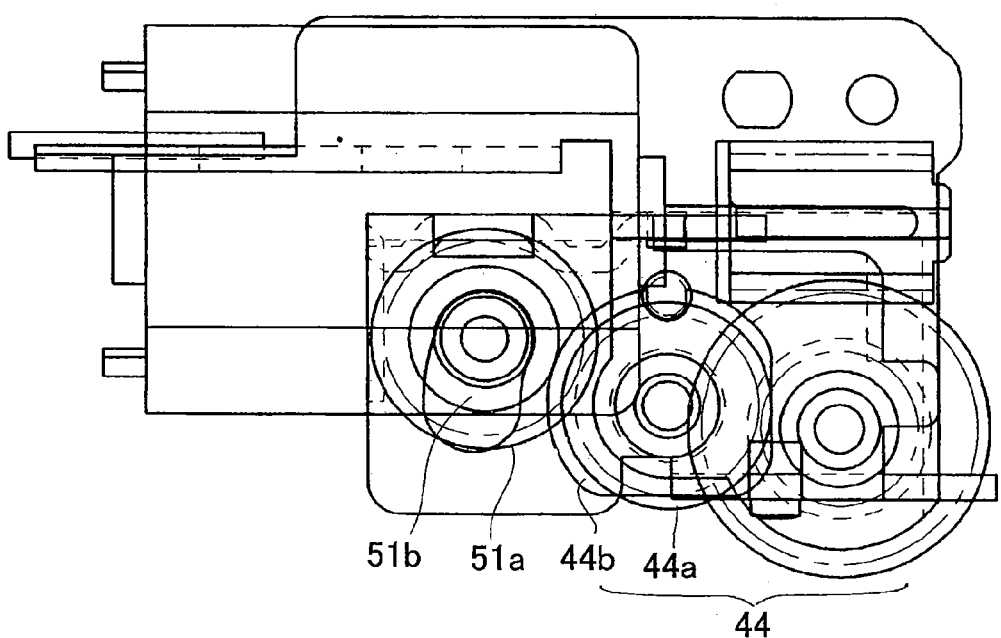
FIG. 74 is a transparent side view of a state where the roller gear of the loading block in FIG. 67 and the loading gear mechanism are in engagement.
Figure 75:
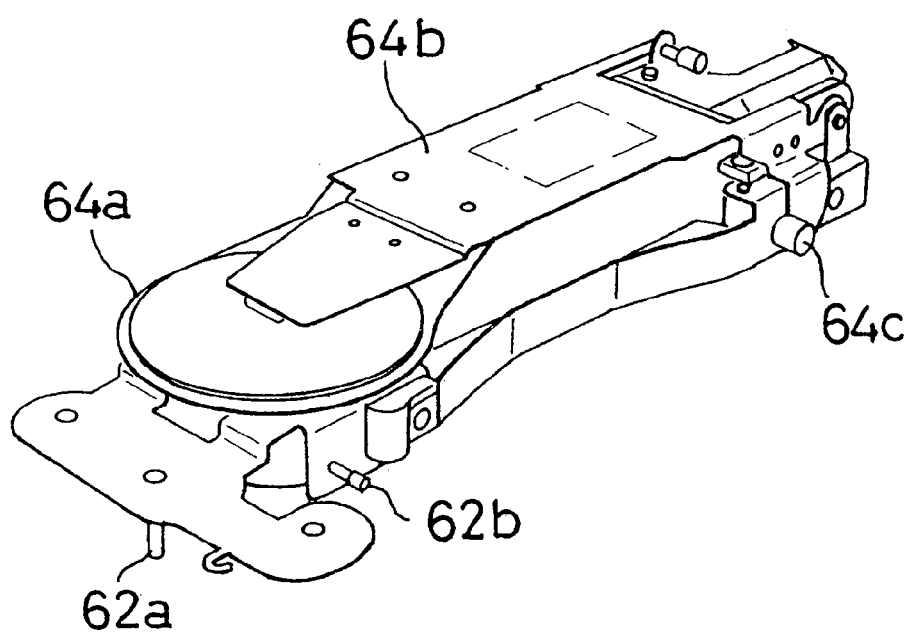
FIG. 75 is a perspective view of the drive unit of the drive chassis unit of FIG. 53.
Figure 76:
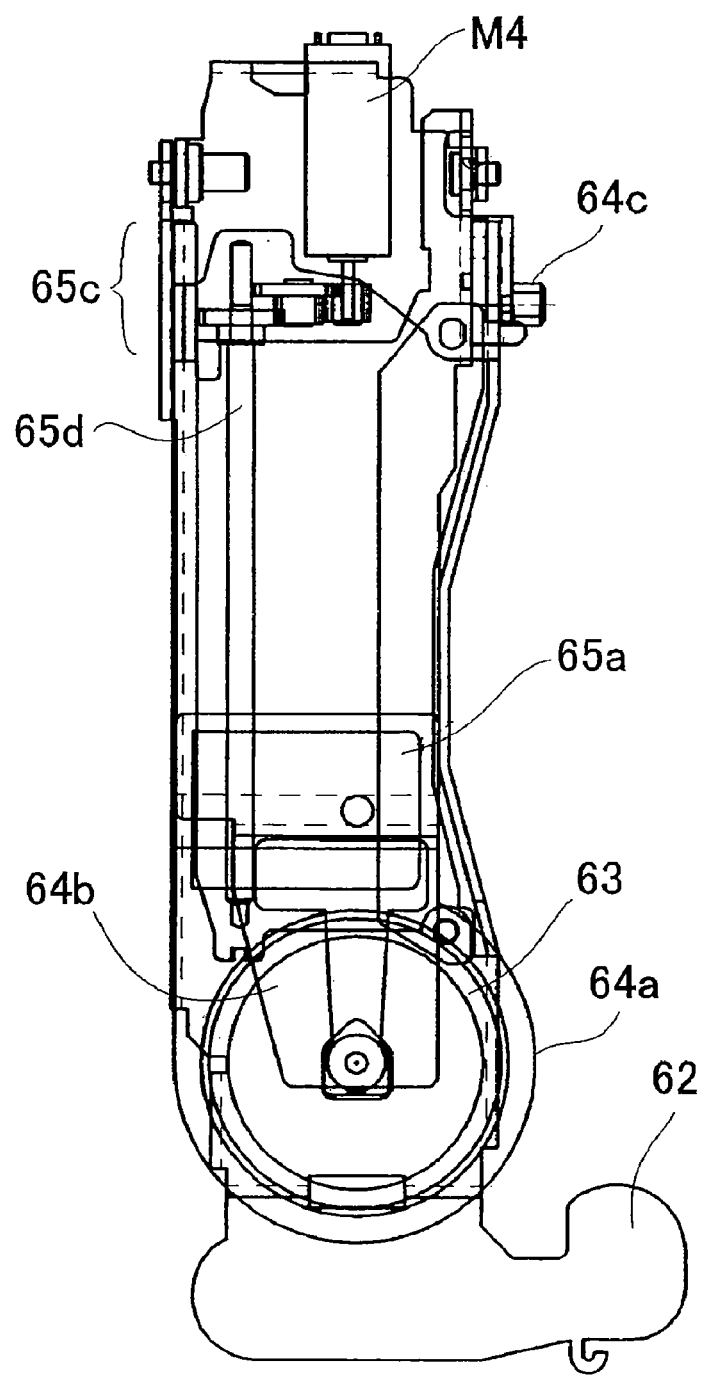
FIG. 76 is a transparent planar view of the drive unit in FIG. 75.

In addition, when the loading block 50 moves backward, a roller gear 51a engages with a gear 44a of the loading gear mechanism 44 as shown in FIGS. 73 and 74. However, here, in order to mesh the roller gear 51a and gear 44a together while keeping a backlash, the right end of the loading roller 51a is provided with a roller sleeve 51b that is concentric with the roller gear 51a and the loading gear mechanism 44 is provided with a stopper plate 44b that is concentric with the gear 44a.

Figure 61:
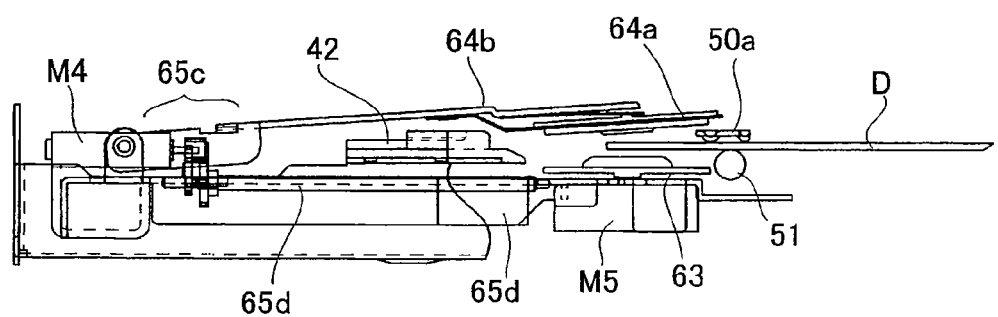
FIG. 61 is a side view of the positional relationship between the drive unit and loading block during insertion/ejection of the disk of the embodiment in FIG. 1.
Figure 62:
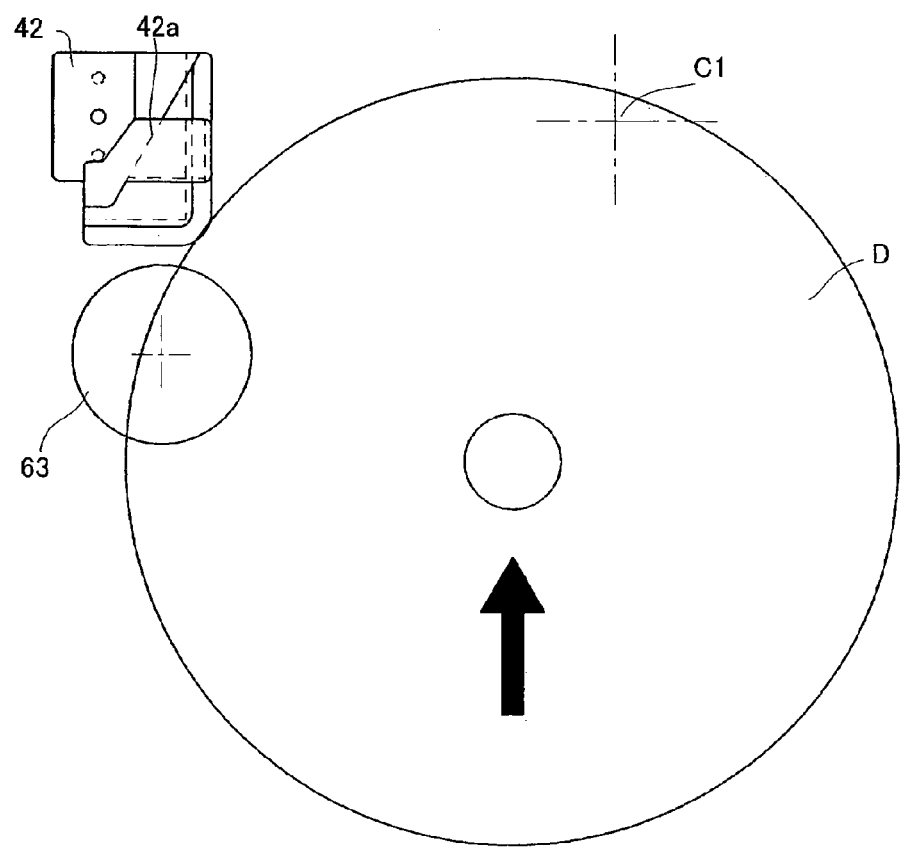
FIG. 62 is an explanatory view of the positional relationship between the disk and the turntable, disk guide, and disk holder center at the start of disk insertion.
Figure 63:
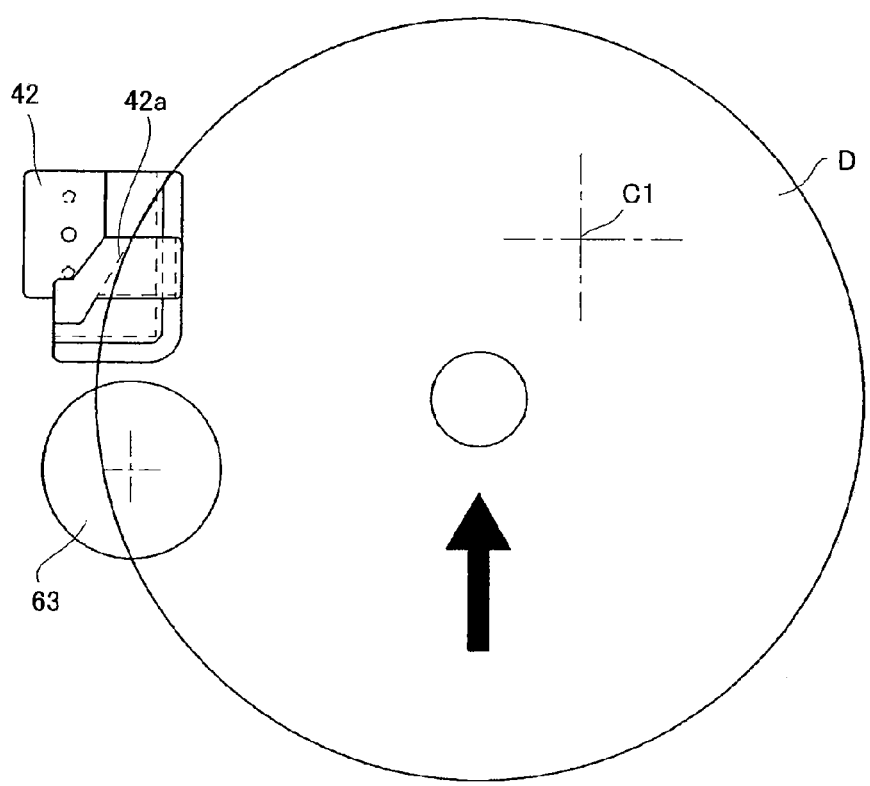
FIG. 63 is an explanatory view of the positional relationship between the disk and the turntable, disk guide, and disk holder center in the course of disk insertion.
Figure 64:
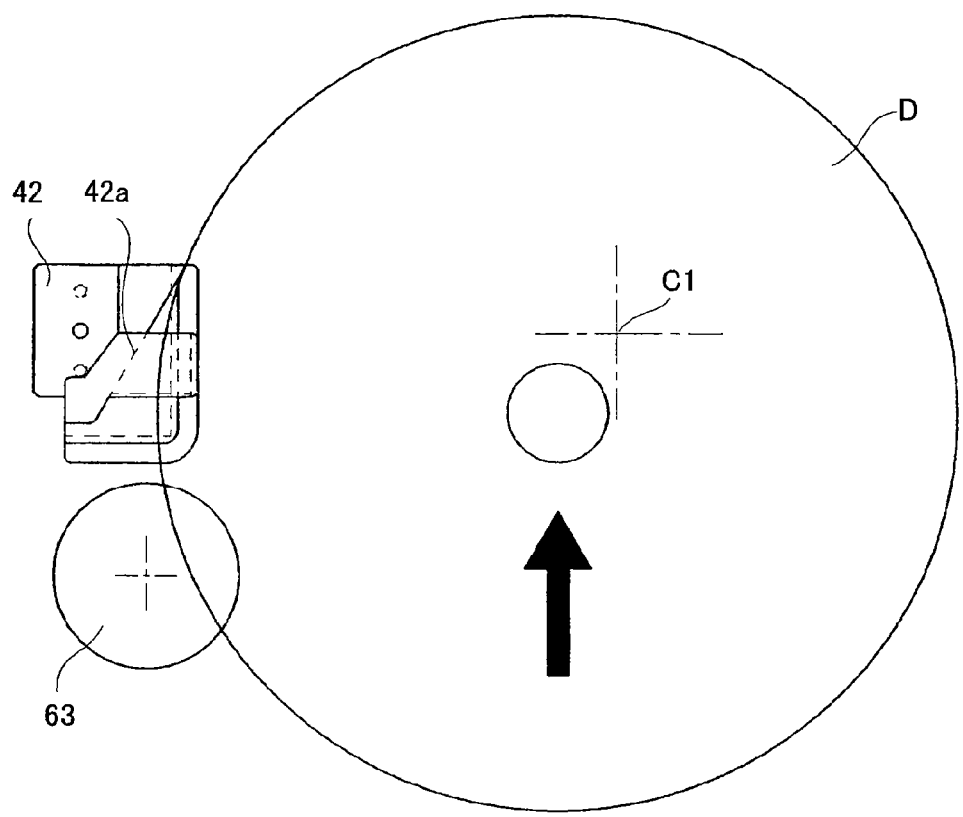
FIG. 64 is an explanatory view of the positional relationship between the disk and the turntable, disk guide, and disk holder center in the course of disk insertion.
Figure 65:
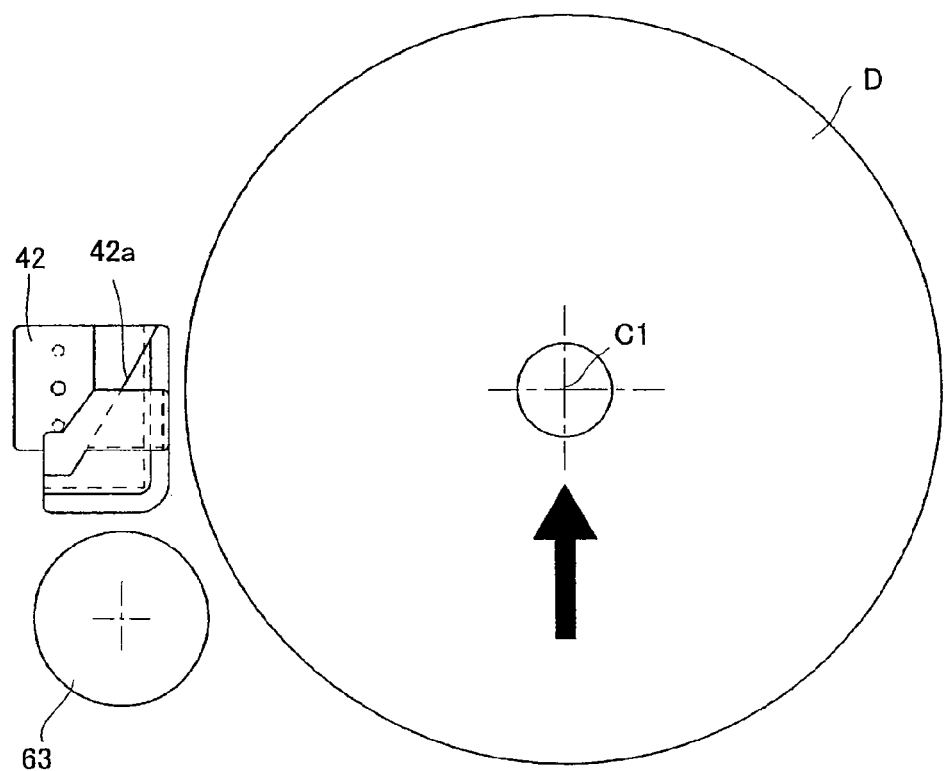
FIG. 65 is an explanatory diagram of the positional relationship between the disk and the turntable, disk guide and disk holder center when the disk is stored in the disk holder.
Figure 67:
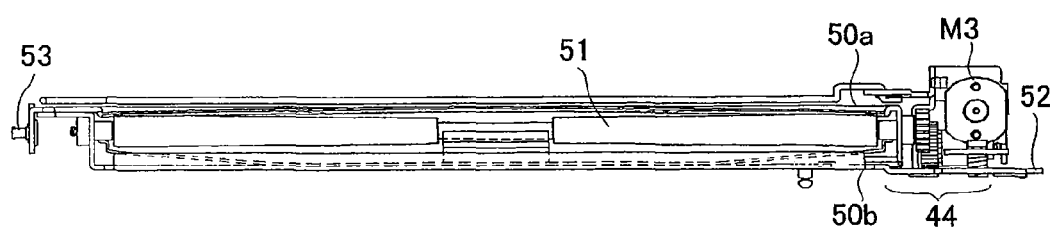
FIG. 67 is a front view of the loading block in the drive chassis unit in FIG. 1.
Figure 68:
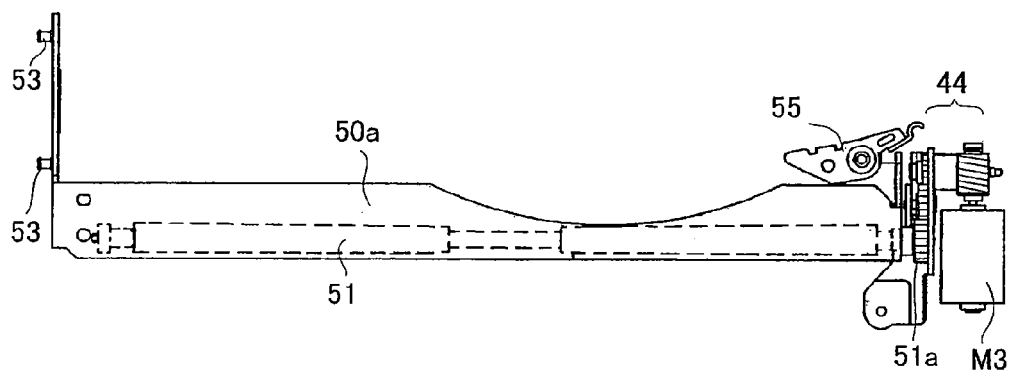
FIG. 68 is a planar view of the loading block in FIG. 67.
Figure 69:
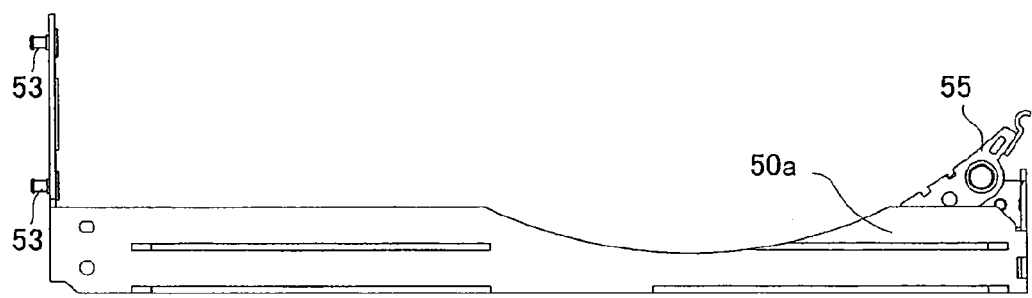
FIG. 69 is a planar view of the upper loading plate in the loading block in FIG. 67.
Figure 70:
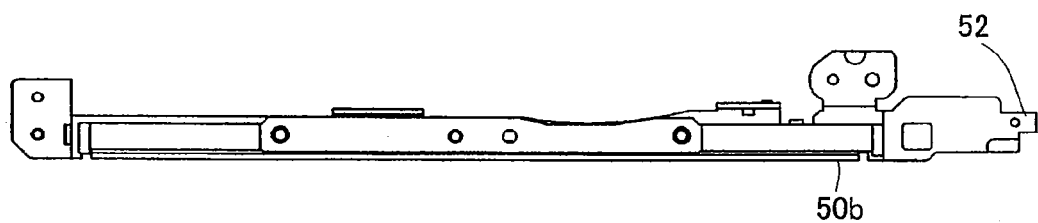
FIG. 70 is a planar view of the lower loading plate of the loading block in FIG. 67.
Figure 71:
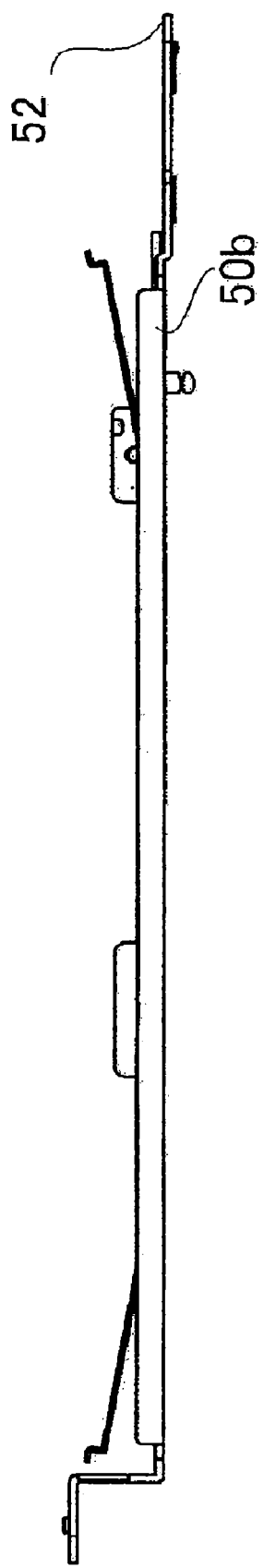
FIG. 71 is a front view of the loading plate in FIG. 70.

Further, as shown in FIG. 61, the lower face of the upper loading block 50 of the loading plate 50a is a roller guide that sandwiches disk D between itself and the loading roller 51. In addition, as shown in FIGS. 68 and 69, the loading block 50 is provided with a bias guide 55 that biases disk D leftward by abutting against the edge of the disk when disk D is ejected from the disk holder 10. The biasing guide 55 is provided such that same is able to turn in a horizontal direction and is biased by a spring (not shown) in a counterclockwise direction in the drawings.

6. Drive Base Unit 6-1. Drive Base

As shown in FIG. 52, the drive base 61 is provided on the left side in the drive chassis unit 40. The front end of the drive base 61 thus provided is provided below the left end of the loading roller 51 from a planar perspective. Further, as shown in FIGS. 77 and 83A to 83C and FIGS. 87 to 90, the drive base 61 is provided such that same is capable of turning about an axis 40d that is attached in the vicinity of the rear left corner of the drive chassis unit 40. This turning of the drive base 61 is performed via a drive shift plate 68 that is driven by the drive base drive plate 28.

Figure 77:
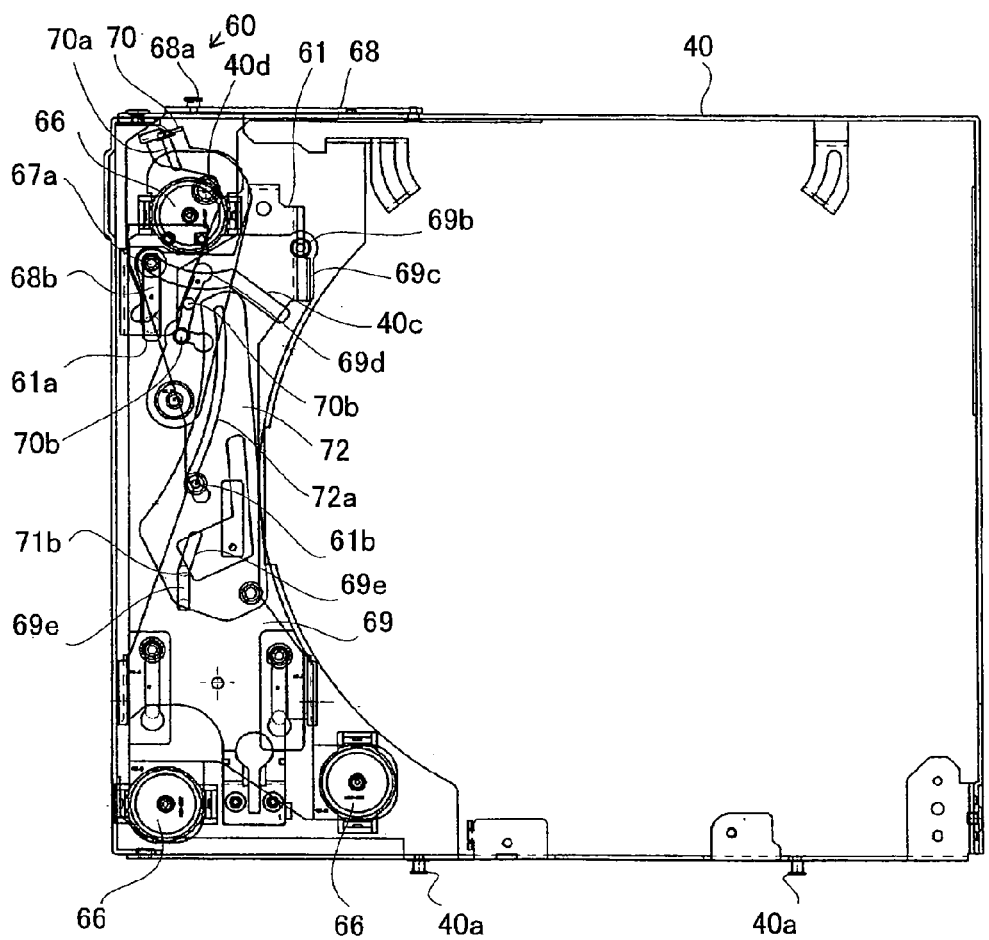
FIG. 77 is a transparent planar view of the initial state of the drive base of the drive chassis unit in FIG. 76.
Figure 78:
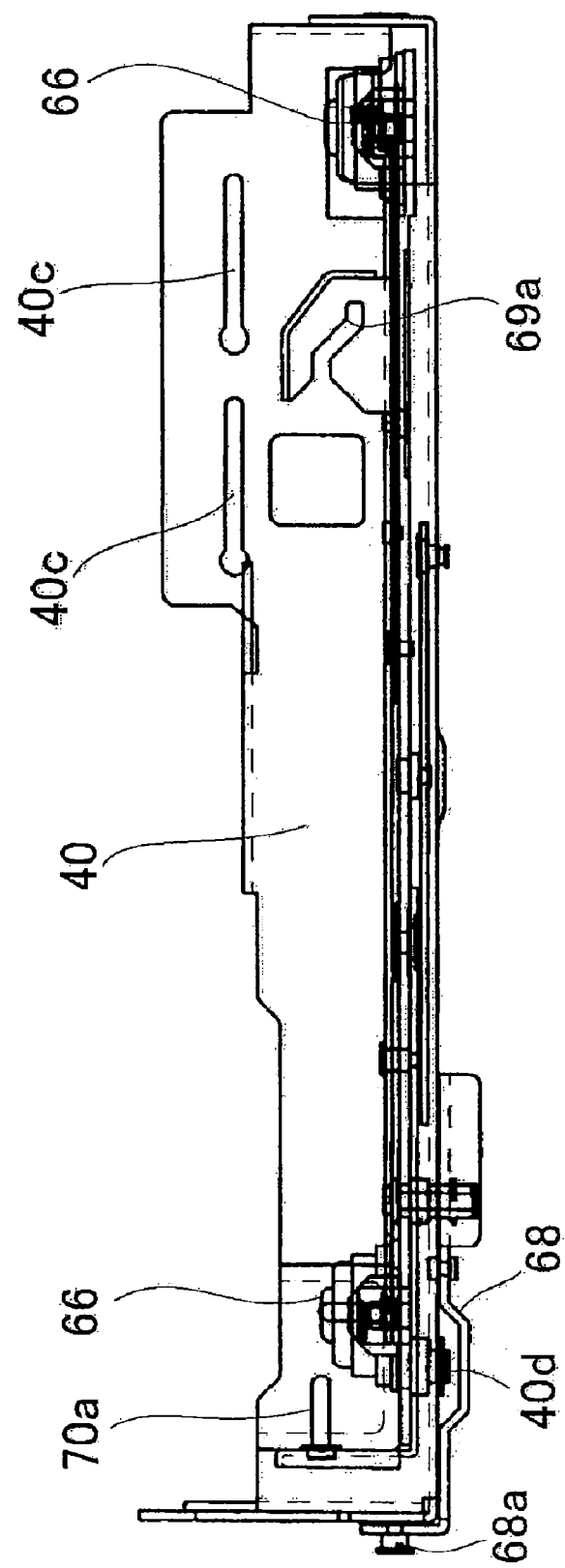
FIG. 78 is a transparent left side view of the drive chassis unit in FIG. 76.

As shown in FIGS. 80A and 80B, the drive shift plate 68 is a plate comprising a horizontal portion that follows the outside bottom of the drive chassis unit 40 and a vertical portion that follows the rear face of the drive chassis unit 40. As shown in FIGS. 77 to 79, the horizontal portion is provided such that same is capable of sliding laterally on the outside bottom of the drive chassis unit 40. As shown in FIG. 79, the vertical portion of the drive shift plate 68 is provided with a pin 68a that moves the drive shift plate 68 together with the drive base drive plate 28 by engaging with the hole 28a of the drive base drive plate 28.

In addition, a forward/backward cam hole 68b is formed in the horizontal portion of the drive shift plate 68. Further, the constitution is such that a linear cam hole 61a is formed in the drive base 61 in the length direction thereof as shown in FIG. 83A and, as a result of inserting a link shaft 67a (described subsequently) in the cam hole 68b of the drive shift plate 68 and in a cam hole 61a of the drive base 61, the link shaft 67a is biased in the direction in which the drive base 61 is turned in accordance with the movement of the drive shift plate 68.

Figure 88:
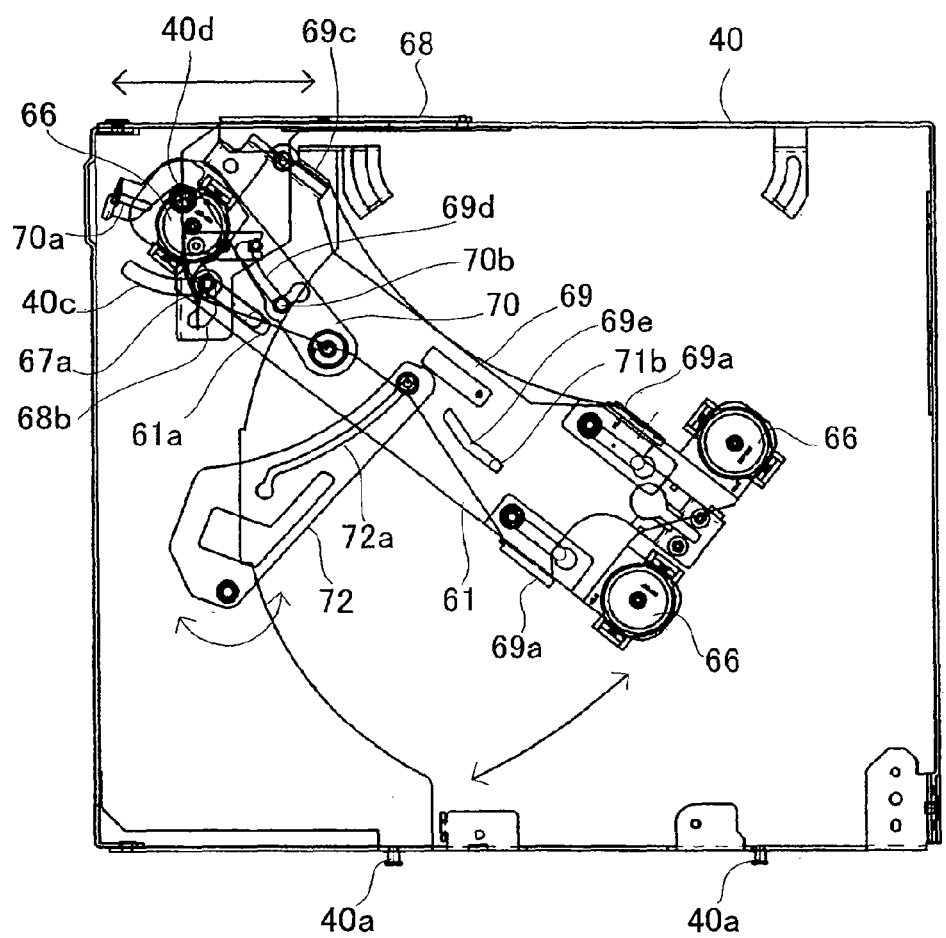
FIG. 88 is a planar view of a state where the drive base starts to turn of the embodiment in FIG. 1.

Furthermore, the drive chassis unit 40 is provided with a drive support plate 72 that guides the insertion of the drive base 61 such that same is capable of turning, as shown in FIGS. 77 and 88. The constitution is such that the drive support plate 72 is formed having a substantially arc-shaped guide hole 72a as shown in FIGS. 86A and 86B and the turning end of the drive base 61 is determined by the end of the guide hole 72a as a result of a guide pin 61b that is provided on the drive base 61 being inserted in the guide hole 72a.

6-2. Drive Unit

As shown in FIGS. 1, 81A and 81B, FIGS. 91A to 91C, and FIGS. 92A to 92C, pins 62a that are fixed to the drive unit 62 are elastically supported by the dampers 66 that are arranged at three points on the drive base 61. As shown in FIGS. 75, 76, 91, and 92, the drive unit 62 has members required to play back a disk provided thereon, such as the turntable 63 on which the disk is mounted, a spindle motor M5 for rotating the turntable, a clamper arm 64b that comprises a clamper ring 64a for pushing the disk onto the turntable 63, the pickup unit 65a that reads the disk signal, a thread motor M4 for moving the pickup unit 65a, and a gear mechanism 65c and a feed screw 65d and so forth.

Figure 82:
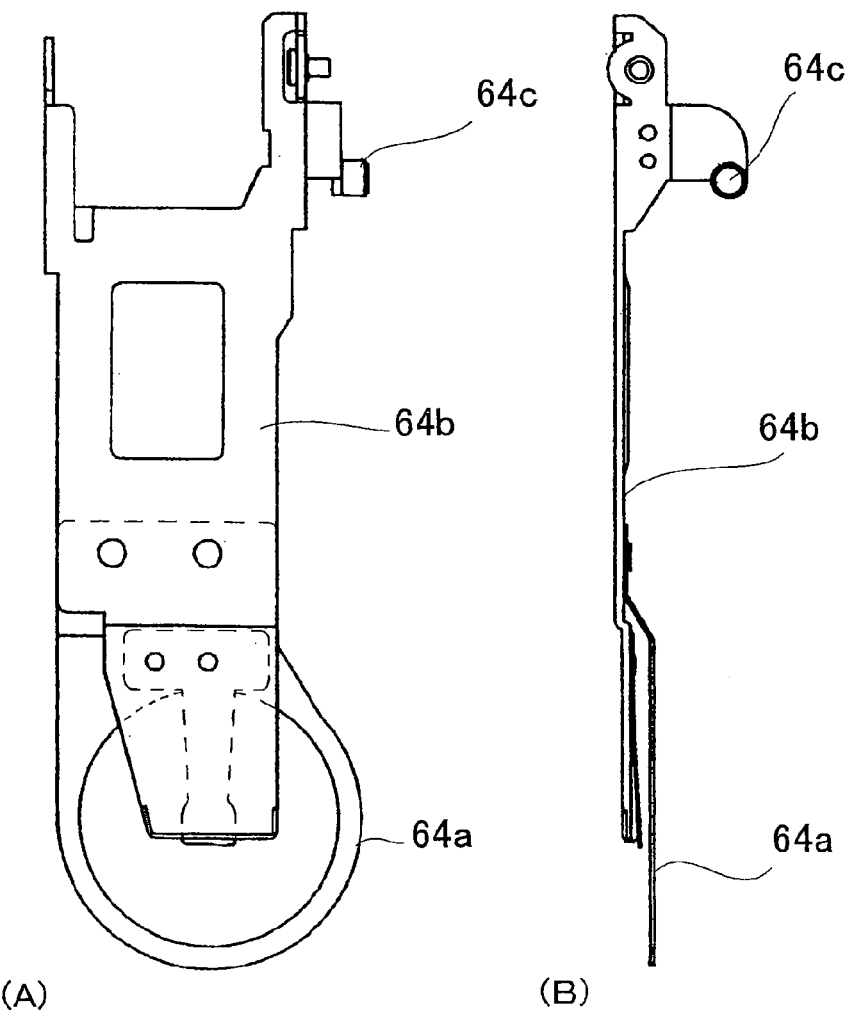
FIG. 82 is a planar view (A) and right-side view (B) of the clamper arm and clamper ring of the drive unit in FIG. 75.

As shown in FIG. 82, one end of the clamper ring 64a is rotatably attached on the same axis as the disk on the turntable 63 to the other end of the clamper arm 64b that is turnably provided on the drive unit 62. The clamper arm 64b is biased in the direction in which the clamper ring 64a is crimped onto the turntable 63 by means of a spring (not shown). Further, as shown in FIG. 92A, the clamper arm 64b is provided with a bias roller 64c that retracts the clamper ring 64a upward against the spring by rotating the clamper arm 64b by means of abutment against a push-up portion 67b (described subsequently) in an initial state.

Figure 81:
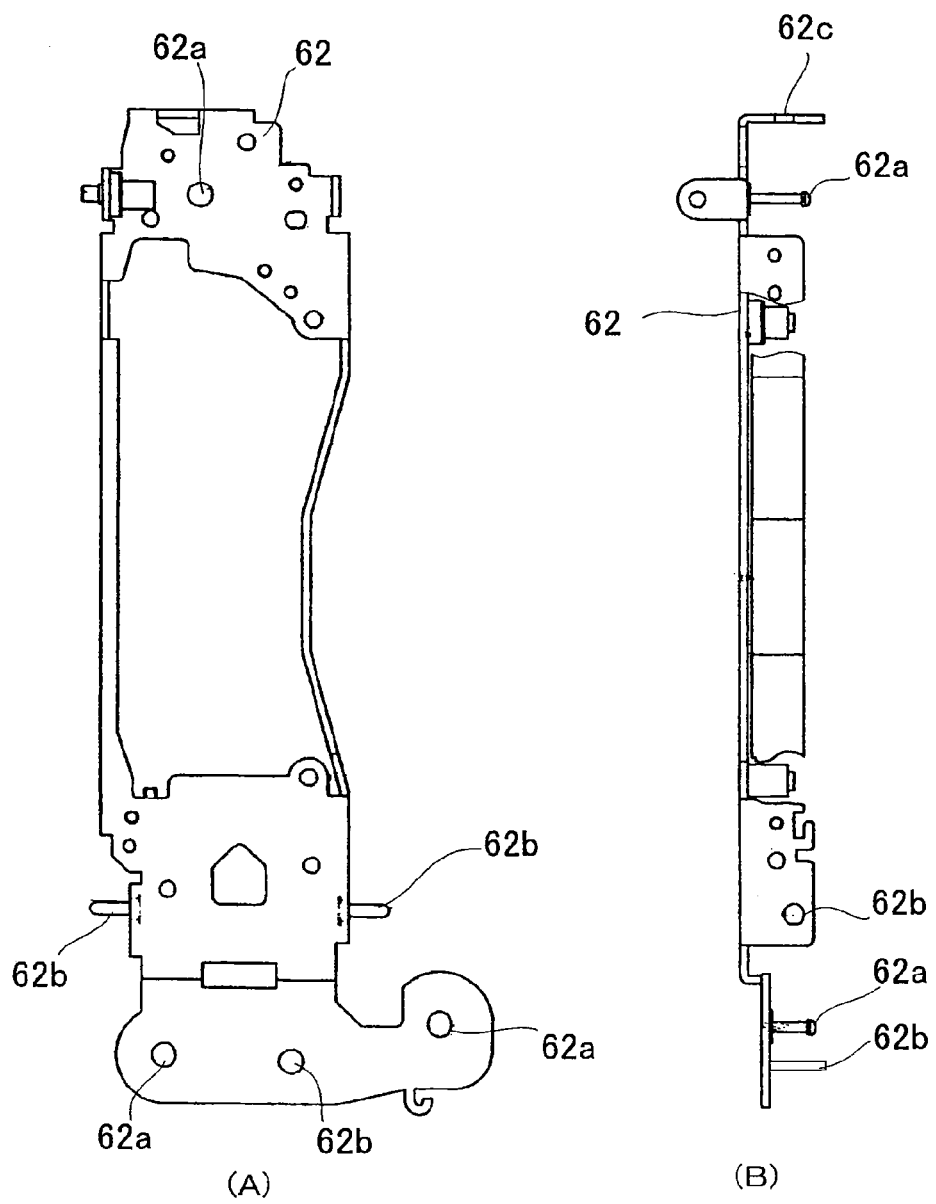
FIG. 81 is a planar view (A) and right-side view (B) of a frame of the drive unit in FIG. 75.

Further, as described above, the front end of the drive base 61 is located at the bottom of the loading block 50 from a planar perspective. However, as shown in FIG. 61, the front end of the drive base 61 is established such that, when disk D is fed in or out, a part of the loading block 50 is accommodated between the upwardly retracted clamper ring 64a and turntable 63 and disk D passes through this part. In addition, as shown in FIG. 81, the drive unit 62 is provided with a locking pin 62b and a lock groove 62c for locking the drive unit 62 to a floating lock mechanism 67.

6-3. Floating Lock Mechanism

Figure 83:
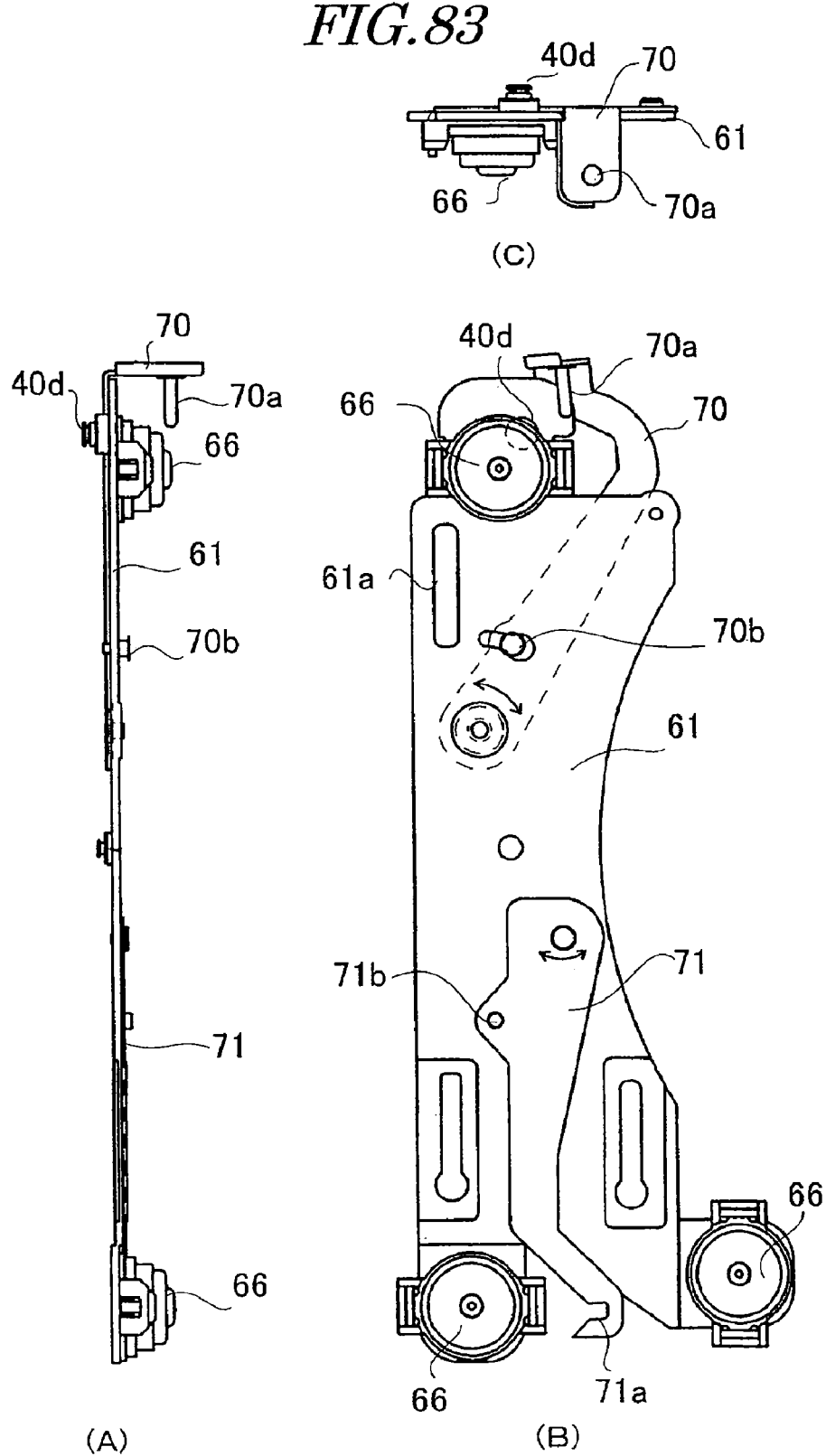
FIG. 83 is a left-side view (A), planar view (B), and rear view (C) of the drive base in FIG. 77.
Figure 84:
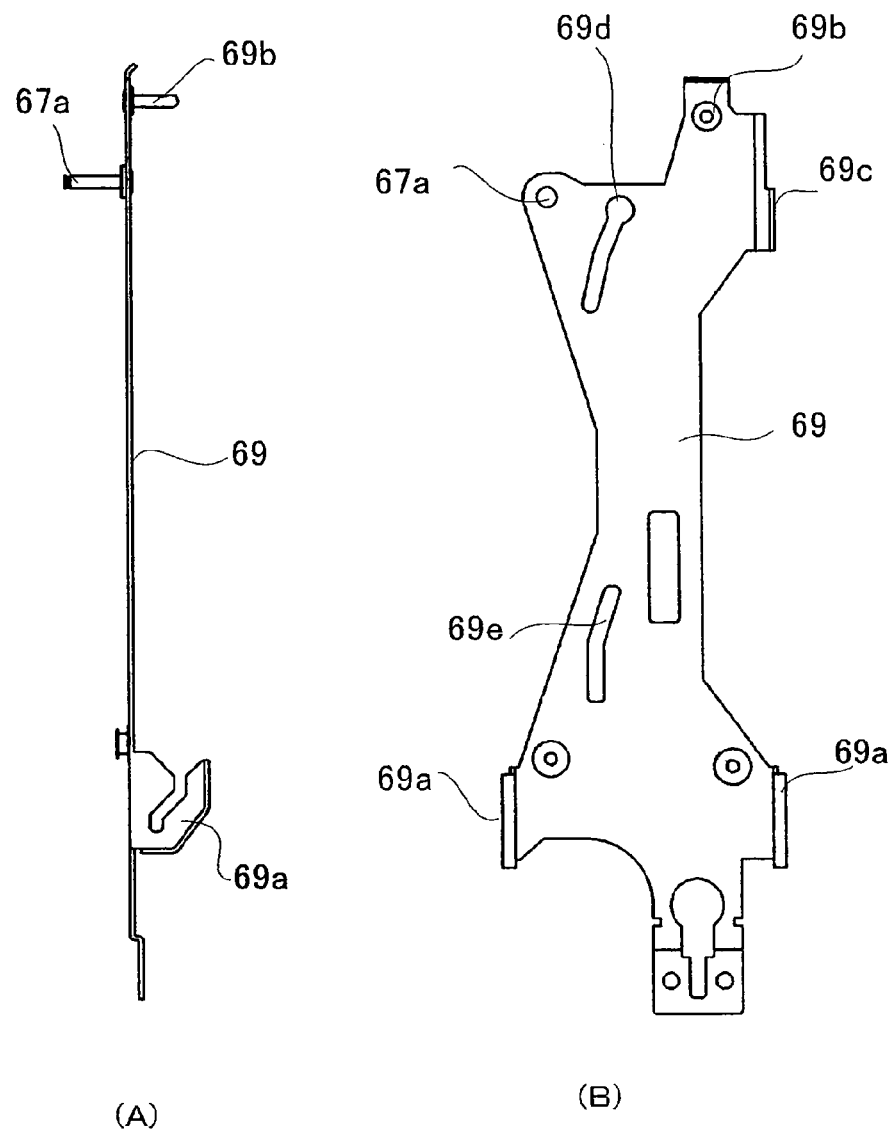
FIG. 84 is a left-side view (A) and planar view (B) of a slide lock plate that is provided on the drive base in FIG. 83.
Figure 91:
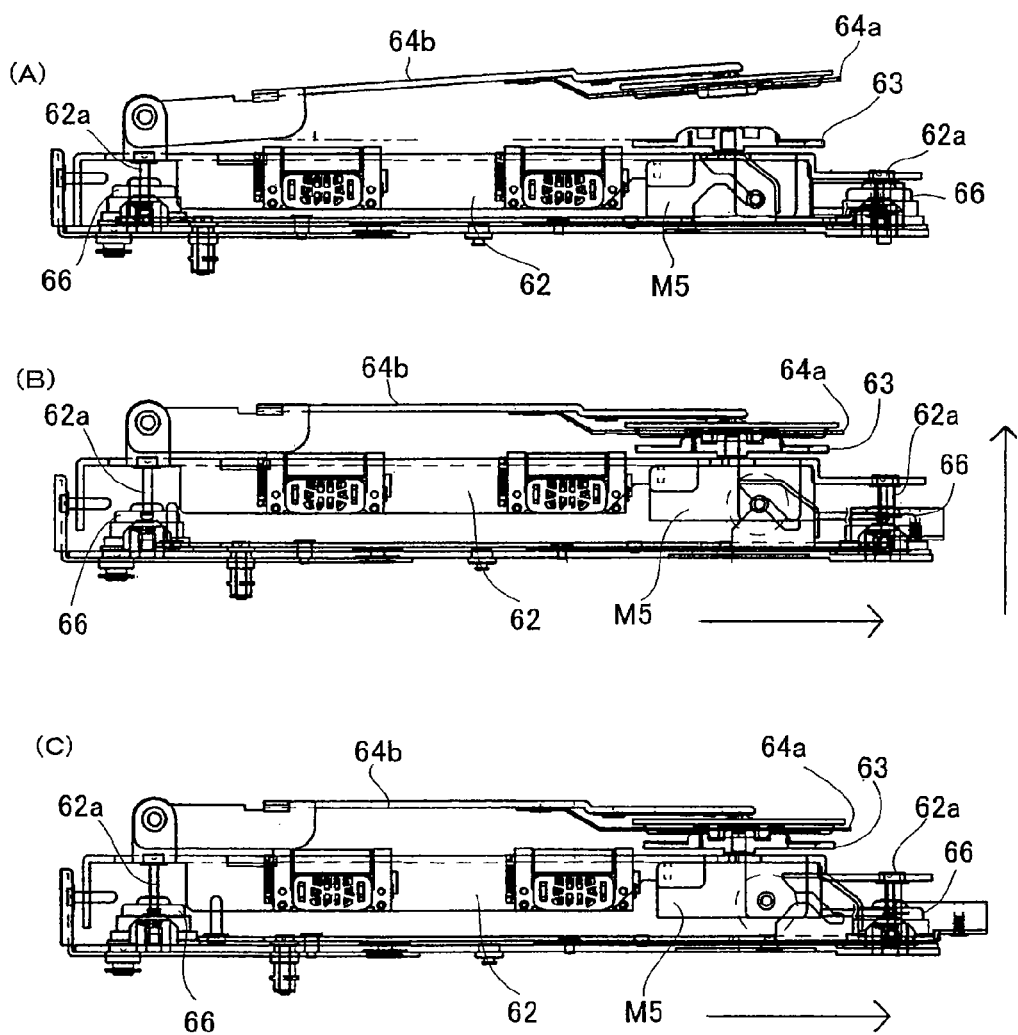
FIG. 91 is a left side view of an initial state (A) of the drive unit, the floating lock release start state (B), and the floating state (C) of the embodiment in FIG. 1.

As shown in FIGS. 83 and 84, the floating lock mechanism 67 comprises a slide lock plate 69 that is slidably provided on the drive base 61 and a turn lock plate 70 and hook plate 71 that are provided such that same are capable of turning on the drive base 61. As shown in FIGS. 91 and 92, the slide lock plate 69 is provided with a lock groove 69a and locking pin 69b that perform a floating lock and lock release through engagement with the locking pin 62b and lock groove 62c of the drive unit 62 in accordance with the sliding movement. Further, a push-up portion 69c for turning the clamper arm 64 to contact and move away from the bias roller 64c in accordance with the movement is formed on the slide lock plate 69.

Figure 93:
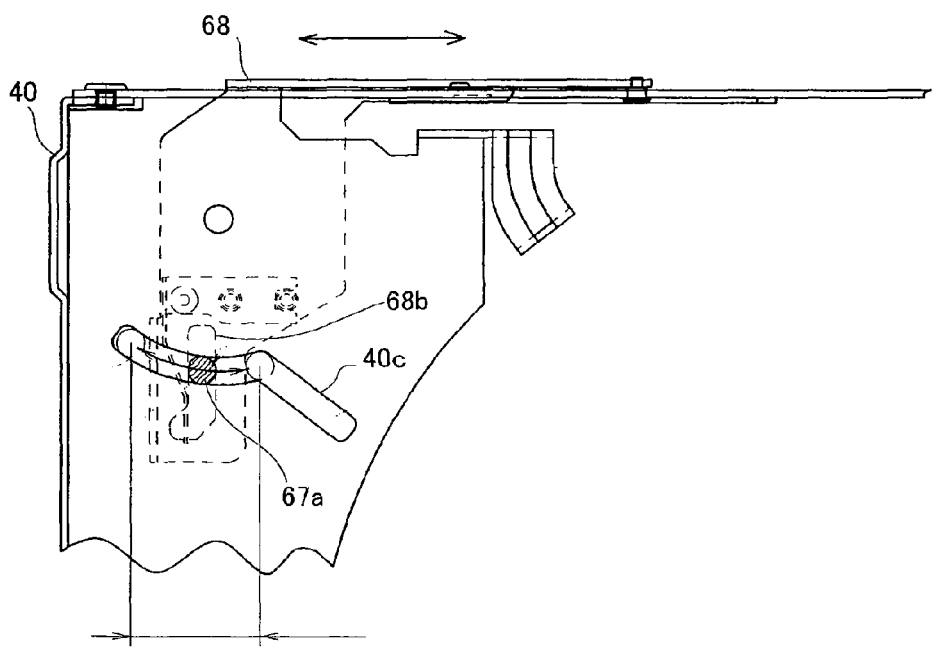
FIG. 93 is a partial planar view of the drive shift plate and link shaft when the drive base of the drive base unit is turning.

Further, the constitution is such that the link shaft 67a is fixed to the slide lock plate 69 and, as a result of biasing the link shaft 67a, the slide lock plate 69 performs a sliding movement. Further, the link shaft 67a is also inserted in a cam hole 40c that is formed in the drive chassis unit 40. As shown in FIGS. 93 and 94, the cam hole 40c comprises an arc-shaped part that turns the drive base 61, drive unit 62, and slide lock plate 69 together and a linear part that allows the slide lock plate 69 to slide on the drive base 61.

Figure 85:
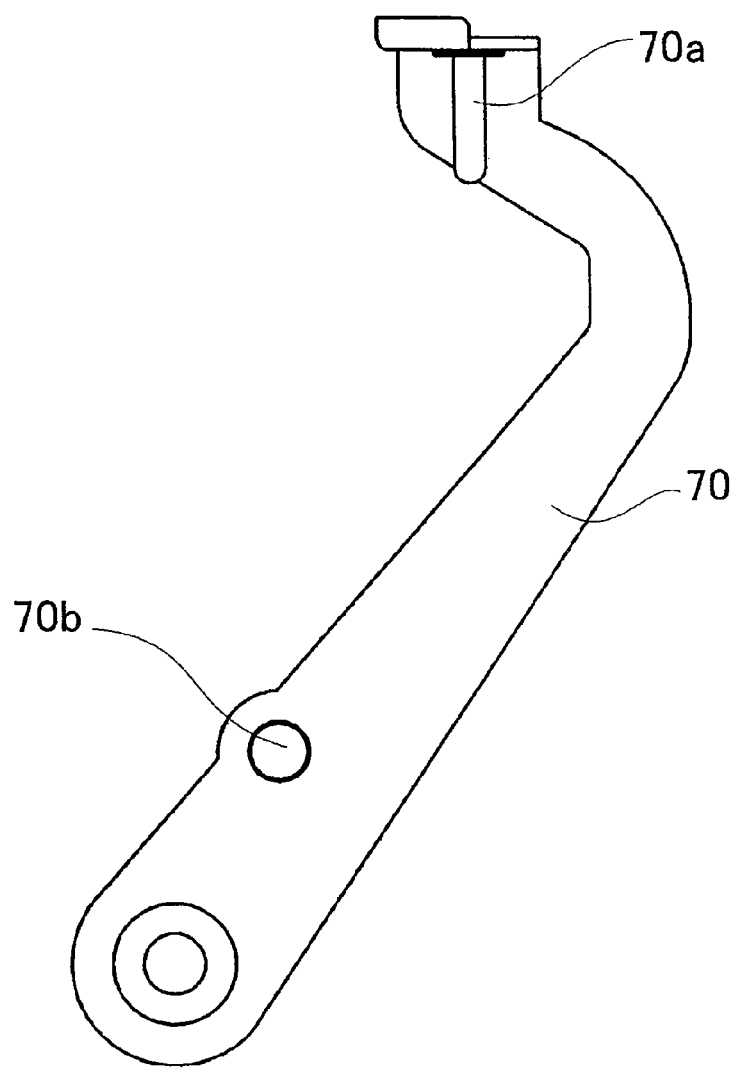
FIG. 85 is a planar view of the turn lock plate in FIG. 83.
Figure 86:
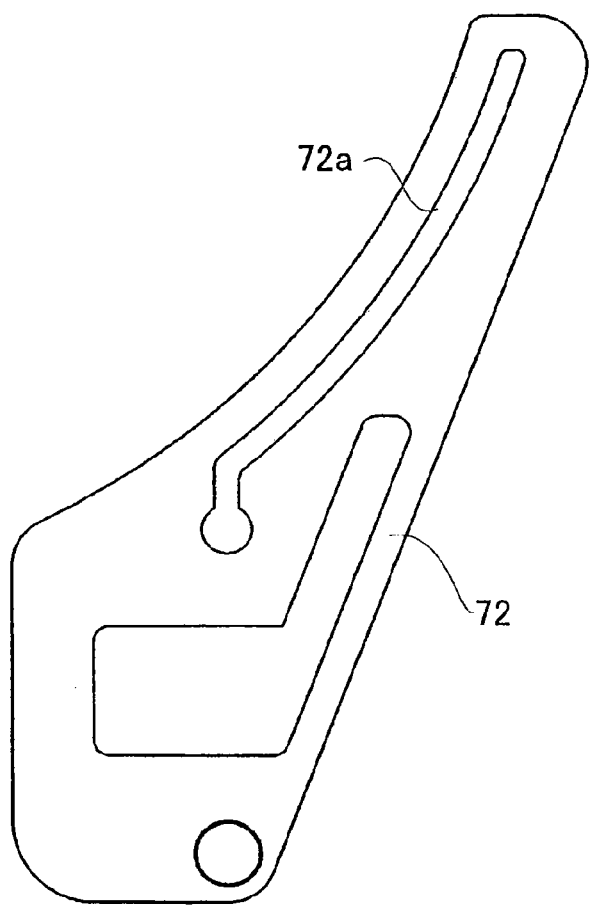
FIG. 86 is a planar view of a drive support plate in the drive chassis unit in FIG. 53.

As shown in FIGS. 83 and 85, the turn lock plate 70 is provided with a lock pin 70a for performing a floating lock and lock release through engagement in the lock groove 62c of the drive unit 62 in accordance with the turning of the turn lock plate 70. The turn lock plate 70 is constituted to turn in accordance with the sliding movement of the slide lock plate 69 as a result of a pin 70b that is fixed to the turn lock plate 70 being inserted in a cam hole 69d that is provided substantially in the shape of a V in the slide lock plate 69.

As shown in FIG. 83, the hook plate 71 comprises a hook 71a that engages with the pin 62a of the drive unit 62 during floating lock in accordance with the turning of the hook plate 71 and which pushes the pin 62a into the lock groove 69a. The hook plate 71 is constituted to turn in accordance with the sliding movement of the slide lock plate 69 as a result of a pin 71b that is fixed to the hook plate 71 being inserted in a cam hole 69e that is provided in substantially a V shape in the slide lock plate 69.

7. Detection Means

The operation of each constituent member of the disk drive above is performed by controlling the action of the cam gear drive motor M1, drive chassis elevator motor M2, loading motor M3, thread motor M4, and spindle motor M5 by a control circuit (not shown). Further, control using such a control circuit is performed on the basis of the detection result of detection means such as a switch and sensor and so forth that are arranged on the respective parts in the drive. Such detection means will be described only for cases where same are required in the following operations and the detection means is omitted from the drawings.

D. Action

An outline of the operation will first be described for the operation of the present embodiment, whereupon the details of the disk loading (disk insertion and storage) operation, disk playback operation, and disk unloading (disk ejection) operation will be sequentially provided.

1. Outline of Operation 1-1. Flow of Operation During Disk Loading

First, an outline of the flow of the operation during disk loading will be described in accordance with FIG. 95. Further, in FIG. 95, M1 to M5 are reference numerals denoting each of the above motors, where a circle sign is appended to a motor that is operated in correspondence with the operation content. That is, the drive chassis unit 40 is moved to a position where the holder plate 11 storing disk D can be selected by allowing the drive chassis elevator motor M2 to operate. Thereafter, the disk selectors 41A and 41B are made to perform a sliding movement by allowing the cam gear drive motor M1 to operate and the disk holder 10 is opened to allow the loading roller 51 to be accommodated on the selected holder plate 11 and disk D to be inserted (holder open position (1)). In addition, by allowing the drive chassis elevator motor M2 to operate, the drive chassis unit 40 is raised to a position enabling disk loading, that is, to a position where the loading roller 51 matches the disk slot 31.

In this state, the cam gear drive motor M1 is allowed to operate continuously to move the loading roller 51 (backward) toward the disk holder 10 so that disk D can be held. The disk slot 31 is then opened by opening the shutter 32, the catches 17a and 17b are closed by allowing the disk hold links 17 and 18 of the disk holding mechanism 15 of the holder plate 11 holding disk D to turn, and the disk holder 10 is opened to prevent the center of the holder plate 11 from obstructing the insertion path of the disk (holder open position (2)).

Thereafter, when disk insertion from the disk slot 31 is detected by a sensor, the loading motor M3 operates and the loading roller 51 rotates in the loading direction (forward direction). As a result, disk D is fed into the disk holder 10. Further, when the fact that disk D has been completely inserted in the disk holder 10 is detected by the sensor, the loading motor M3 stops and the loading roller 51 stops rotating. In addition, as a result of the operation of the cam gear drive motor M1, the shutter 32 closes the disk slot 31 and disk D is held on the holder plate 11 by the loading roller 51 and disk stoppers 25A and 25B.

The drive chassis unit 40 is moved by allowing the drive chassis elevator motor M2 to operate such that the disk holder 10 that stores the disk D in this manner is at the height of the initial position. Thereafter, by causing the cam gear drive motor M1 to operate in the opposite direction to that above, the disk stoppers 25A and 25B are removed from the disk D and the loading roller 51 is removed from the disk D by being moved toward the disk slot 31 (forward). Thereupon, the catches 17a and 17b of the disk hold links 17 and 18 in the disk holding mechanism 15 of the holder plate 11 that holds disk D open and hold the inner edge of the disk.

Thereafter, the disk selectors 41A and 41B are made to perform a sliding movement and move away from the disk holder 10 to put the disk holder 10 in a state where each other's holder plates 11 are bonded by means of the biasing force of the spring 14e. Further, the drive chassis unit 40 is moved to the height of the initial position by allowing the drive chassis elevator motor M2 to operate. The process of the reverse operation is followed when disk D is unloaded.

1-2. Flow of Operation During Disk Playback

An outline of the flow of the operation during disk playback will be described next with reference to FIG. 96. That is, the drive chassis unit 40 is moved to a position that makes it possible to select the holder plate 11 holding the disk D that is played back by allowing the drive chassis elevator motor M2 to operate.

Further, the disk selectors 41A and 41B are made to perform a sliding movement by allowing the cam gear drive motor M1 to operate, and the disk holder 10 is opened to make it possible to insert the loading roller 51 above the selected holder plate 11 (holder open position (1)). In this state, the loading roller 51 is moved (backward) toward the disk holder 10 by allowing the cam gear drive motor M1 to operate continuously, and disk D is held as a result of the disk stoppers 25A and 25B being moved in the direction of contact with disk D.

Catches 17a and 17b of disk hold links 17 and 18 in the disk holding mechanism 15 of the holder plate 11 storing disk D close and release the inner edge of the disk D. Further, disk holder 10 is opened so that the holder plate 11 moves downward and away from disk D (holder open position (2)). The disk holder 10 is opened further so that the drive base 61 is accommodated below disk D that has been released by the disk holding mechanism 15 and held by the loading roller 51 and disk stoppers 25A and 25B (holder open position (3)).

The drive unit 62 is inserted in a space that is produced by opening the disk holder 10 by turning the drive base 61. Thereupon, the clamper ring 64a arrives in a position corresponding to a position above the center hole of disk D and the turntable 63 arrives in a position corresponding to a position below the center hole of disk D. Thereafter, disk D is chucked on the turntable 63 as a result of closing the clamper ring 64a while raising the drive chassis unit 40.

Thereafter, the disk stoppers 25A and 25B move away from disk D and the loading roller 51 is also made to move (forward) toward the disk slot 31 and away from disk D. Thereafter, as a result of the floating lock mechanism 67 releasing the floating lock, the drive unit 62 is placed in a floating state of being supported by only the damper 66. In the above state, the pickup unit 65a is fed to the inner circumference by allowing the thread motor M4 to operate, the disk D is rotated by allowing the spindle motor M5 to operate, and the signal of disk D is read by the pickup unit 65a that moves in the disk radial direction. Further, after disk playback has ended, disk D is stored within disk holder 10 by performing the reverse operation to that described above.

2. Details of the Operation of Each Part

The details of the operation of each part in the flow of the above operation will now be described. In the following description, the operation of each of the motors M1 to M5 and the corresponding gear mechanisms that are prerequisites for the operation for each part will be omitted. Further, FIG. 97 shows the relationship between the operating position of the cam gear 21 and the hold and release of disk D by each part and the relationship with the open position of the disk holder 10.

2-1. During Disk Loading

First, the operation when the disk is stored in the disk holder 10 will be described. Further, the following description illustrates an example in which a disk is stored by the vacant holder plate 11 that is third from the bottom. That is, as shown in FIGS. 56A and 56B, when the third holder plate 11 is vacant, the drive chassis unit 40 is raised and lowered by moving the drive chassis elevator plates 34A and 34B so that the tips of the middle cams 41Ac and 41Bc of the disk selectors 41A and 41B are at the height of the protuberance 14*a* of the third vacant holder plate 11. Thereupon, the cam gear 21 is in an initial position as shown in FIG. 23.

Figure 24:
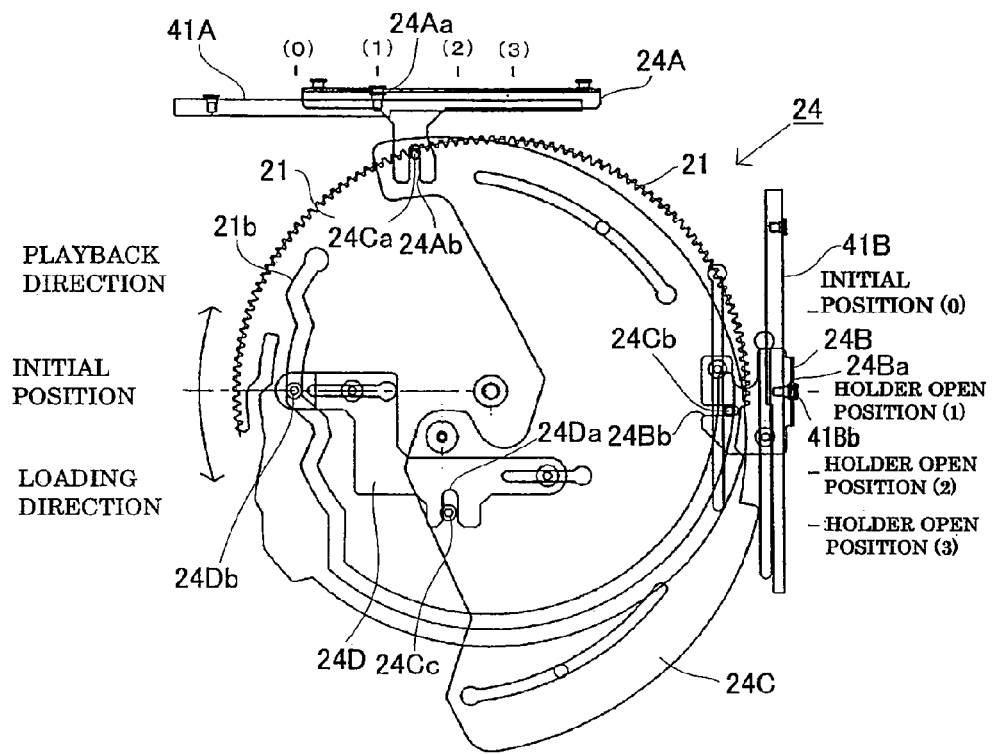
FIG. 24 is a planar view of the cam gear when the disk selector is in a holder open position (1) during disk loading.

Thereafter, as shown in FIG. 24, when the disk selectors 41A and 41B are made to perform a sliding movement to the holder open position (1) via the disk selector drive control cam 21*b* and disk select plates 24D, 24C, 24B, and 24A as a result of allowing the cam gear 21 to turn in the loading direction (counterclockwise direction in the drawings), as shown in FIGS. 57A and 57B, the protuberance 14*a* of the third holder plate 11 enters the middle cams 41Ac and 41Bc and the protuberance 14*a* of the fourth holder plate 11 and higher holder plates 11 are pushed up by the upper cams 41Aa and 41Ba. The protuberance 14*a* of the second holder plate 11 and lower holder plates 11 is pushed down by the lower cams 41Ab and 41Bb. Therefore, a gap into which disk D and the loading block 50 can be inserted is formed above and below the third holder plate 11.

Figure 25:
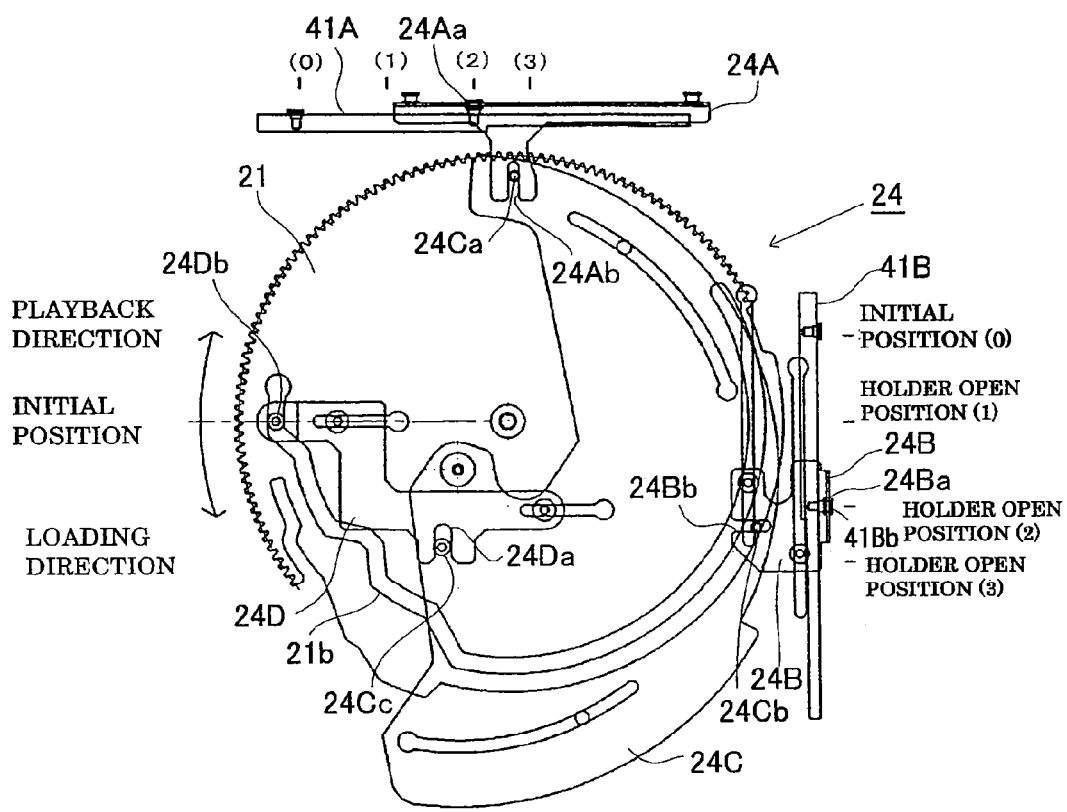
FIG. 25 is a planar view of the cam gear when the disk selector is in a holder open position (2) during disk loading.

In addition, the drive chassis unit 40 is moved by moving the drive chassis elevator plates 34A and 34B so that the gap above the third holder plate 11 and the position of the loading roller 51 match the disk slot 31. Further, when the cam gear 21 is moved further in the loading direction as shown in FIG. 25, the pin 26*b* of the loading block drive control cam 21*e* enters the hold position (2) from the release position (0) and, therefore, the right loading block slide plate 26 moves backward, as shown in FIG. 41. Meanwhile, because pin 27*b* inserted in the cam hole 26*c* is biased to the right in accordance with the movement of the right loading block slide plate 26, the shutter link plate 27 performs a rightward sliding movement. Thereupon, because a turning plate 34 of which pin 34*a* is engaged in recess 27*a* of the shutter link plate 27 is turning, the slide link 36 is biased to the left and performs a leftward sliding movement.

Figure 72:
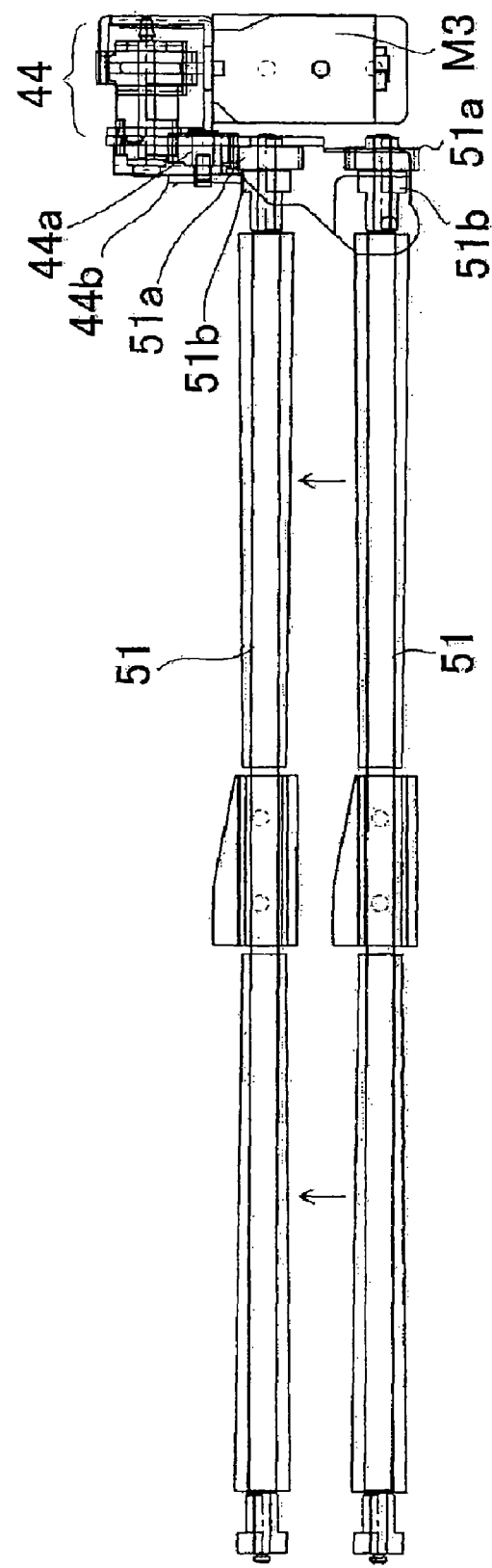
FIG. 72 is a planar view of the movement of the loading roller of the loading block in FIG. 67.

As shown in FIG. 47, the slide link 36 biases the shutter opening/closing plate 33 to the left and, therefore, because the shutter opening/closing plate 33 performs a sliding movement to the left, the pin 32*a* inserted in the slanting cam hole 33*a* is biased upward. Therefore, the shutter 32 on which the pin 32*a* is provided rises and the disk slot 31 opens. At the same time, the slide link 36 moves the turning link 37 by moving to the left and causes the left loading block slide plate 38 linked to the turning link 37 to perform a backward sliding movement. As mentioned above, when the right loading block slide plate 26 and left loading block slide plate 38 move backward, the protruding portion 52 at the right end of the loading block 50 engages with the hole 26*a* in the right loading block slide plate 26 and the pin 53 at the left end of the loading block 50 engages with groove 38*a* in the left loading block slide plate 38. Therefore, as shown in FIGS. 2 and 72, the loading block 50 performs a backward sliding movement. As a result, as shown in FIG. 74, the roller gear 51*a* of the loading roller 51 engages with the gear 44*a* of the loading gear mechanism 44 to enter a state where the roller gear 51*a* can be turned by the loading motor M3.

On the other hand, as a result of allowing the cam gear 21 to turn in the loading direction as mentioned earlier from the initial position shown in FIG. 32, the pin 25Fb of the disk stopper plate 25F enters hold position (2) from release position (1) of the disk stopper drive control cam 21*d* and, therefore, the disk stopper plate 25F performs a rightward sliding movement. Thereupon, the cam hole 25Ec of the disk stopper plate 25E is biased by the pin 25Fa of the disk stopper plate 25F and the disk stopper plate 25E performs a forward sliding movement. As a result, the cam holes 25Fa and 25Fb of the disk stopper plate 25E bias pins 25Cb and 25Db of the disk stopper links 25C and 25D. Therefore, the disk stopper link 25C turns counterclockwise and disk stopper link 25D turns clockwise. The shafts 25Ca and 25Da move in a (forward) direction to approach the edge of disk D.

As a result of such movement of the shafts 25Ca and 25Da, the disk stoppers 25A and 25B also move forward. As a result, the convex portion 25Aa of the disk stopper 25A biases the depressed portion 16*a* of the disk hold arm 16 and, therefore, as shown in FIGS. 2 and 20, disk hold links 17 and 18 turn and catches 17*a* and 17*b* close. Further, because the disk selectors 41A and 41B perform a sliding movement to the holder open position (2) as shown in FIGS. 58A and 58B, in accordance with additional turning of the cam gear 21 as shown in FIG. 25, the protuberance 14*a* of the third holder plate 11 falls as a result of being biased downward by the middle cams 41Ac and 41Bc and the space below disk D increases further.

Based on the above state, when the fact that disk D has been inserted from disk slot 31 is detected by the sensor, the loading roller 51 rotates forward and disk D is drawn into the drive. In the process of being drawn into in this manner, disk D passes between clamper ring 64*a* that is retracted upward and the downward turntable 63, as shown in FIG. 61. Further, while the right edge of disk D is biased by the bias guide 55, the path of disk D is changed as a result of the left edge of disk D abutting against the oblique face 42*a* of the disk guide 42, as shown in FIGS. 60, 62 to 65 and is guided obliquely up and to the right from a planar perspective. Thereafter, as shown in FIG. 2, the rear edge of disk D is grasped by the grasping portions 25Ab and 25Ba of disk stoppers 25A and 25B and, when the fact that the disk is stored in the disk holder 10 is detected by a sensor, the loading roller 51 stops.

Figure 57:
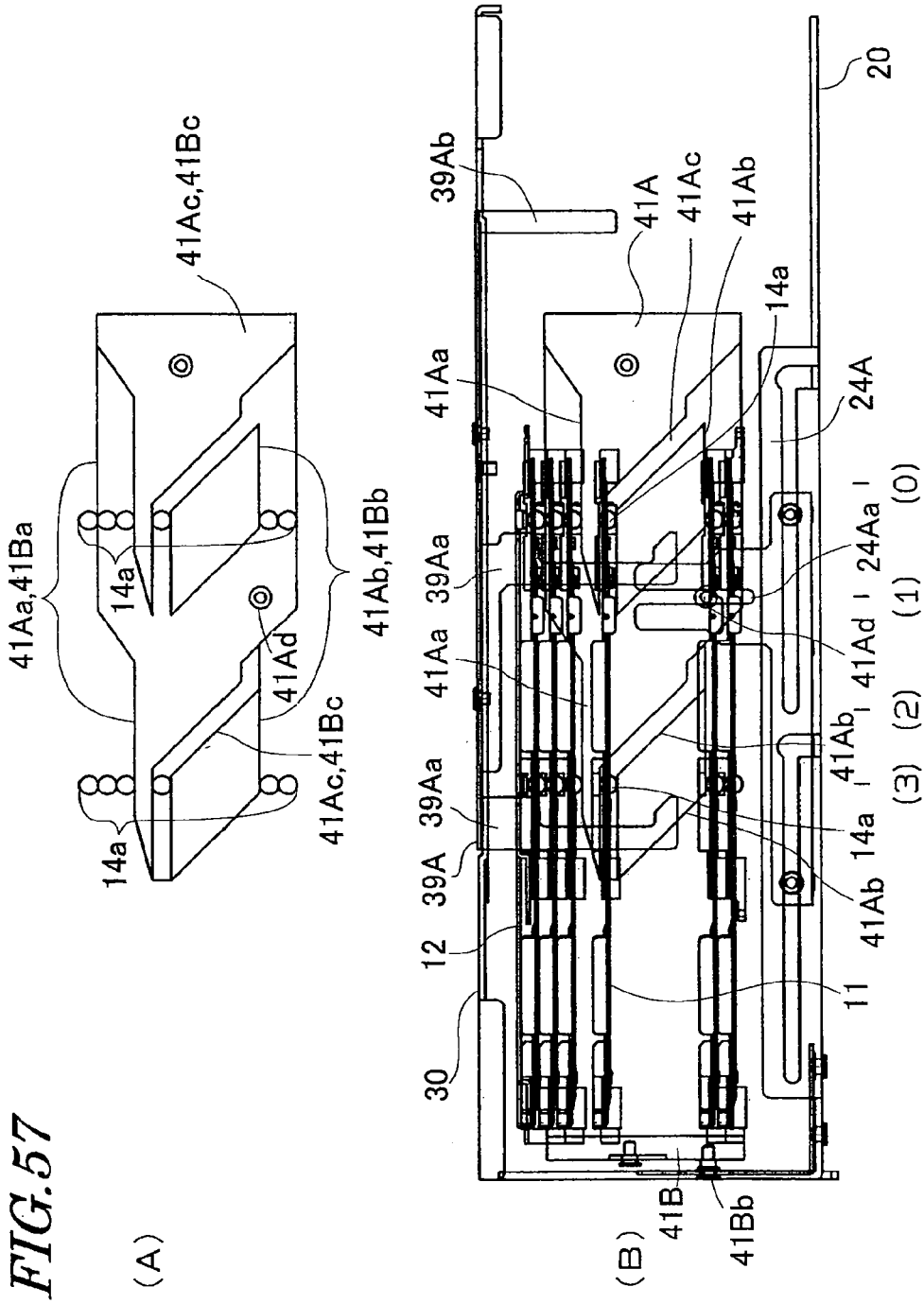
FIG. 57 is an explanatory diagram (A) of the disk selector and protrusion in the holder open position (1) and a transparent rear view (B) of the disk drive in the same state.

Thereafter, as shown in FIG. 57, the cam gear 21 is turned in the opposite direction to that described above and, when disk selectors 41A and 41B are made to perform a sliding movement to the holder open position (1), the protuberance 14*a* of the third holder plate 11 is biased upward by the middle cams 41Ac and 41Bc. Therefore, the third holder plate 11 rises and the center thereof matches the center hole of disk D that is held by the disk stoppers 25A and 25B and loading roller 51.

Furthermore, as a result of rotation of the cam gear 21, as shown in FIG. 39, the pin 26*b* of the loading block drive control cam 21*e* enters the release position (0) from the hold position (2). Therefore, the right loading block slide plate 26 moves forward and, as a result of the slide link 36 operating in the opposite manner to that described above, the shutter 32 falls and the disk slot 31 closes.

Thereupon, the drive chassis unit 40 is moved by allowing the drive chassis elevator plates 34A and 34B to perform a sliding movement so that the disk holder 10 is at the height of the initial position. At the same time, the left loading block slide plate 38 performs a forward sliding movement that is the opposite of that during loading in accordance with the movement of the slide link 36. As mentioned above, because the right loading block slide plate 26 and left loading block slide plate 38 perform a forward sliding movement, the loading block 50 performs a forward sliding movement and moves away from disk D.

Meanwhile, as shown in FIG. 32, pin 25Fb of the disk stopper plate 25F returns to the release position (1) of the disk stopper drive control cam 21d. Therefore, the disk stopper link 25C turns clockwise and the disk stopper link 25D turns counterclockwise via the disk stopper plates 25E and 25F and the shafts 25Ca and 25Da move in a (backward) direction away from the edge of disk D. As a result of the movement of shafts 25Ca and 25Da, the disk stoppers 25A and 25B also move backward and the grasping portions 25Ab and 25Ba release disk D. Further, the convex portion 25Aa of the disk stopper 25A releases the depressed portion 16a of the disk hold arm 16 and, therefore, as shown in FIGS. 3 and 19, the disk hold links 17 and 18 turn, and catches 17a and 17b open and engage with the disk inner edge.

In a state where disk D is set on the holder plate 11, because the cam gear 21 located in the position shown in FIG. 23 turns, when the disk selectors 41A and 41B perform a sliding movement to the initial movement (0) as shown in FIGS. 56A and 56B, the protuberance 14a of the holder plate 11 is released from the disk selectors 41A and 41B and the holder plate 11 moves in the direction of approach as a result of the biasing force of the spring 14e and disk holder 10 closes. Further, as a result of the drive chassis elevator plates 34A and 34B being made to perform a sliding movement, the drive chassis unit 40 is made to move to the height of the initial position.

2-2. During Disk Playback

Thereafter, the operation of each part during disk playback will be described. Further, the following description illustrates an example in which disk D, which is held by the third holder plate 11 from the bottom, is played back. That is, as shown in FIGS. 56A and 56B, the drive chassis unit 40 is moved by allowing the drive chassis elevator plates 34A and 34B to move such that the tips of the middle cams 41Ac and 41Bc of the disk selectors 41A and 41B are at a height matching the protuberance 14a of the third holder plate 11.

Figure 26:
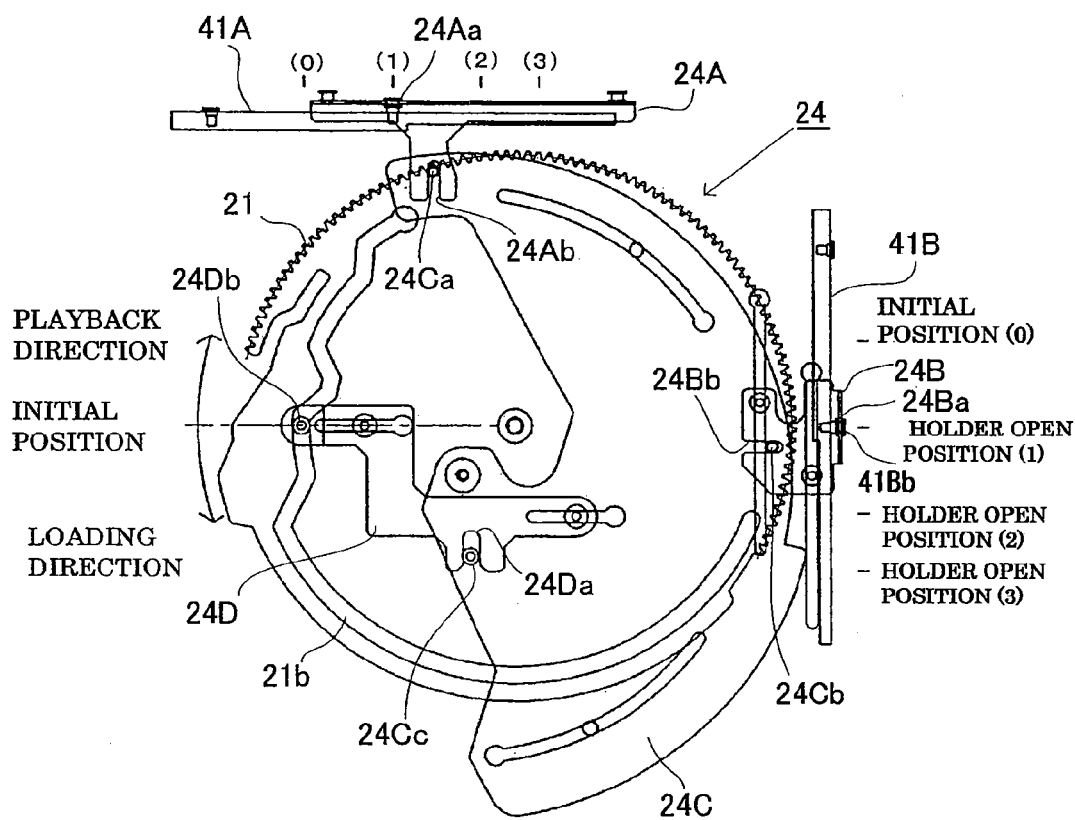
FIG. 26 is a planar view of the cam gear when the disk selector is in holder open position (1) during disk playback.

Further, when the disk selectors 41A and 41B are allowed to perform a sliding movement to the holder open position (1) by causing the cam gear 21 to move in the playback direction (clockwise direction in FIG. 26) as shown in FIG. 26, the protuberance 14a of the third holder plate 11 enters the middle cams 41Ac and 41Bc as shown in FIG. 57, and the protuberance 14a of the fourth holder plate 11 and higher holder plates 11 is pushed upward by the upper cams 41Aa and 41Ba, while the protuberance 14a of the second holder plate 11 and lower holder plates 11 is pushed downward by the lower cams 41Ab and 41Bb. Therefore, a gap that allows the loading block 50 to be inserted is formed above and below disk D that is placed on the third holder plate 11.

In this state, when the cam gear 21 is allowed to turn further in the playback direction, pin 26b of the loading block drive control cam 21e enters the hold position (1) from the release position (0) and therefore the right loading block slide plate 26 moves backward, as shown in FIG. 40. Meanwhile, because the pin 27b inserted in the cam hole 26c is biased toward the right in accordance with the movement of the right loading block slide plate 26, the shutter link plate 27 performs a sliding movement to the right. Thereupon, as described above, the turning plate 34 turns and the slide link 36 performs a sliding movement to the left and, therefore, the left loading block slide plate 38 performs a backward sliding movement via the turning link 37. As mentioned earlier, when the right loading block slide plate 26 and left loading block slide plate 38 move backward, the loading block 50 performs a backward sliding movement such that the loading roller 51 sandwiches disk D.

Thereupon, as shown in FIG. 33, pin 25Fb of the disk stopper plate 25F enters the hold position (2) from the release position (1) of the disk stopper drive control cam 21d. Therefore, the disk stopper links 25C and 25D move (forward) in the direction in which the shafts 25Ca and 25Da approach the edge of disk D via the disk stopper plates 25F and 25E. As shown in FIGS. 2 and 20, as a result of the movement of the shafts 25Ca and 25Da, the disk stoppers 25A and 25B also move forward and the edge of disk D is grasped by the grasping portions 25Ab and 25Ba of the disk stoppers 25A and 25B. Further, the convex portion 25Aa of the disk stopper 25A biases the depressed portion 16a of the disk hold arm 16 and, therefore, the disk hold links 17 and 18 turn and catches 17a and 17b close to release the disk inner edge.

Thus, in a state where disk D is grasped by the disk stoppers 25A and 25B and loading roller 51 and the disk inner edge is released, when the cam gear 21 turns further in the playback direction, as shown in FIG. 58, disk selectors 41A and 41B perform a sliding movement to the holder open position (3) in the process and the protuberance 14a of the third holder plate 11 is biased downward by the middle cams 41Ac and 41Bc. Therefore, the third holder plate 11 falls and moves away from disk D and the gap below disk D widens.

Figure 27:
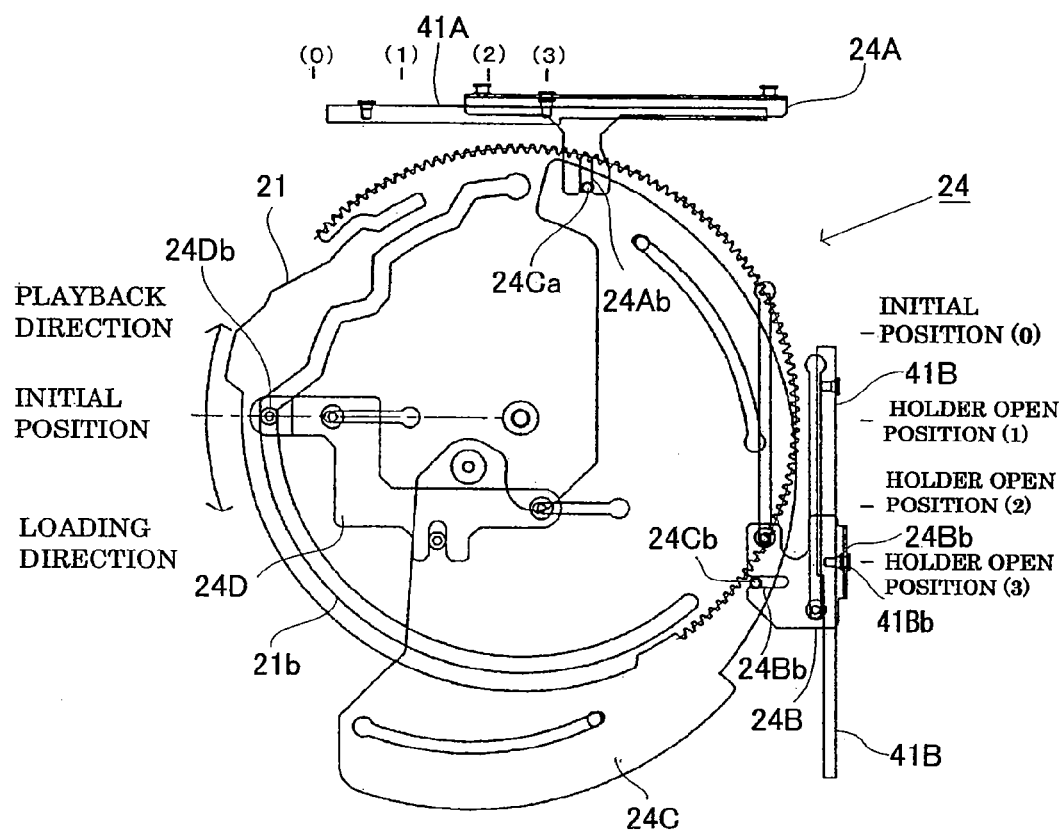
FIG. 27 is a planar view of the cam gear when the disk selector is in the holder open position (2) during disk playback.
Figure 28:
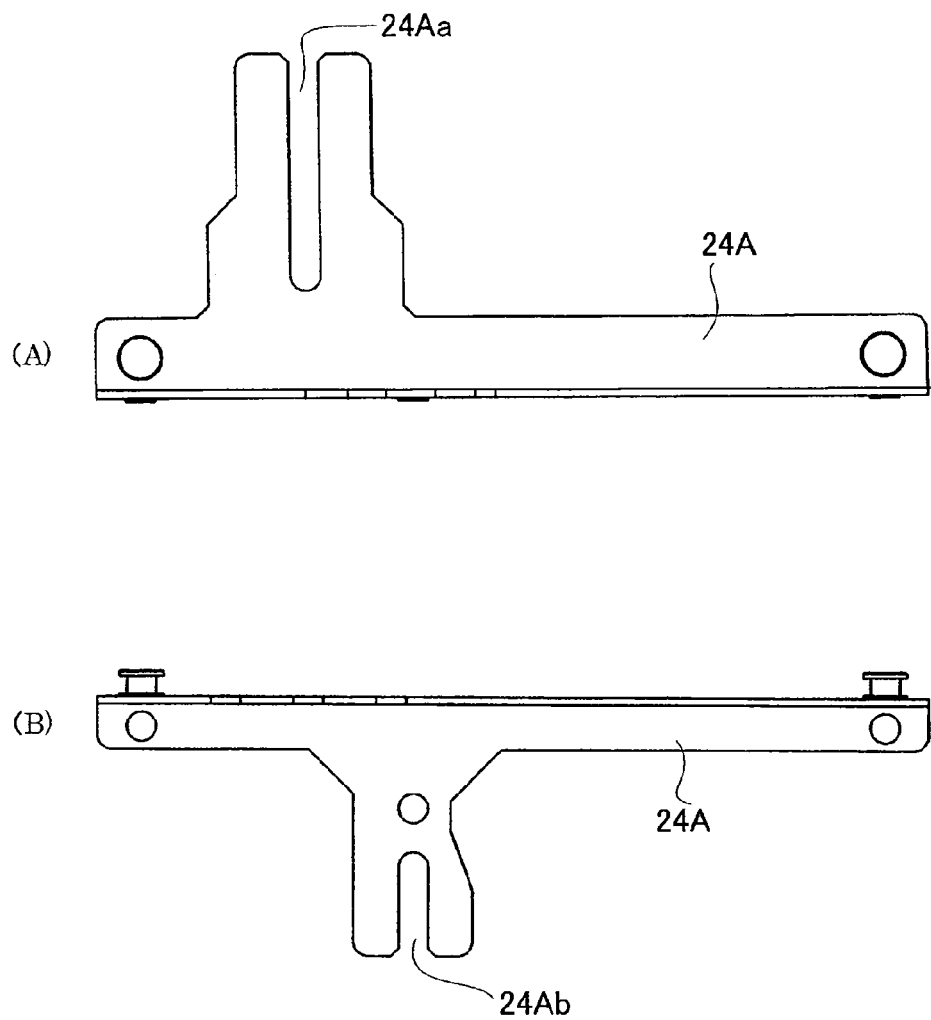
FIG. 28 is a front view (A) and planar view (B) of a disk select plate 24A that drives a disk selector 41A.
Figure 29:
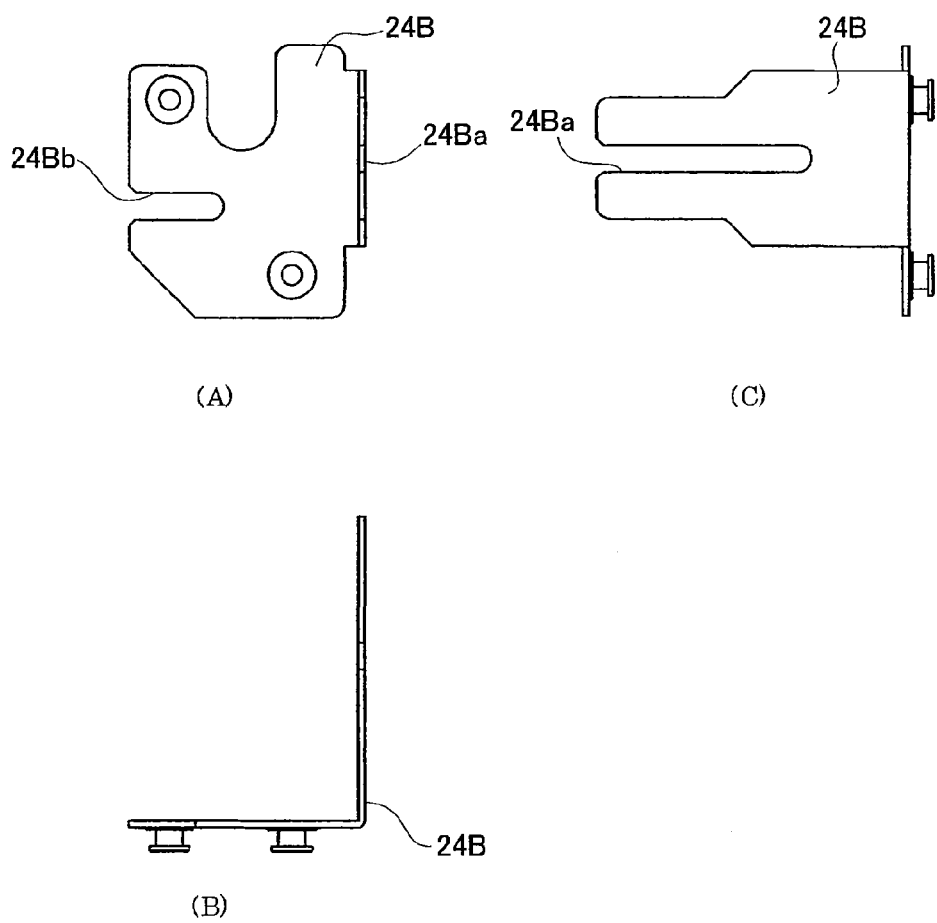
FIG. 29 is planar view (A), front view (B) and right-side view (C) of a disk selector 24B that drives a disk selector 41B.
Figure 59:
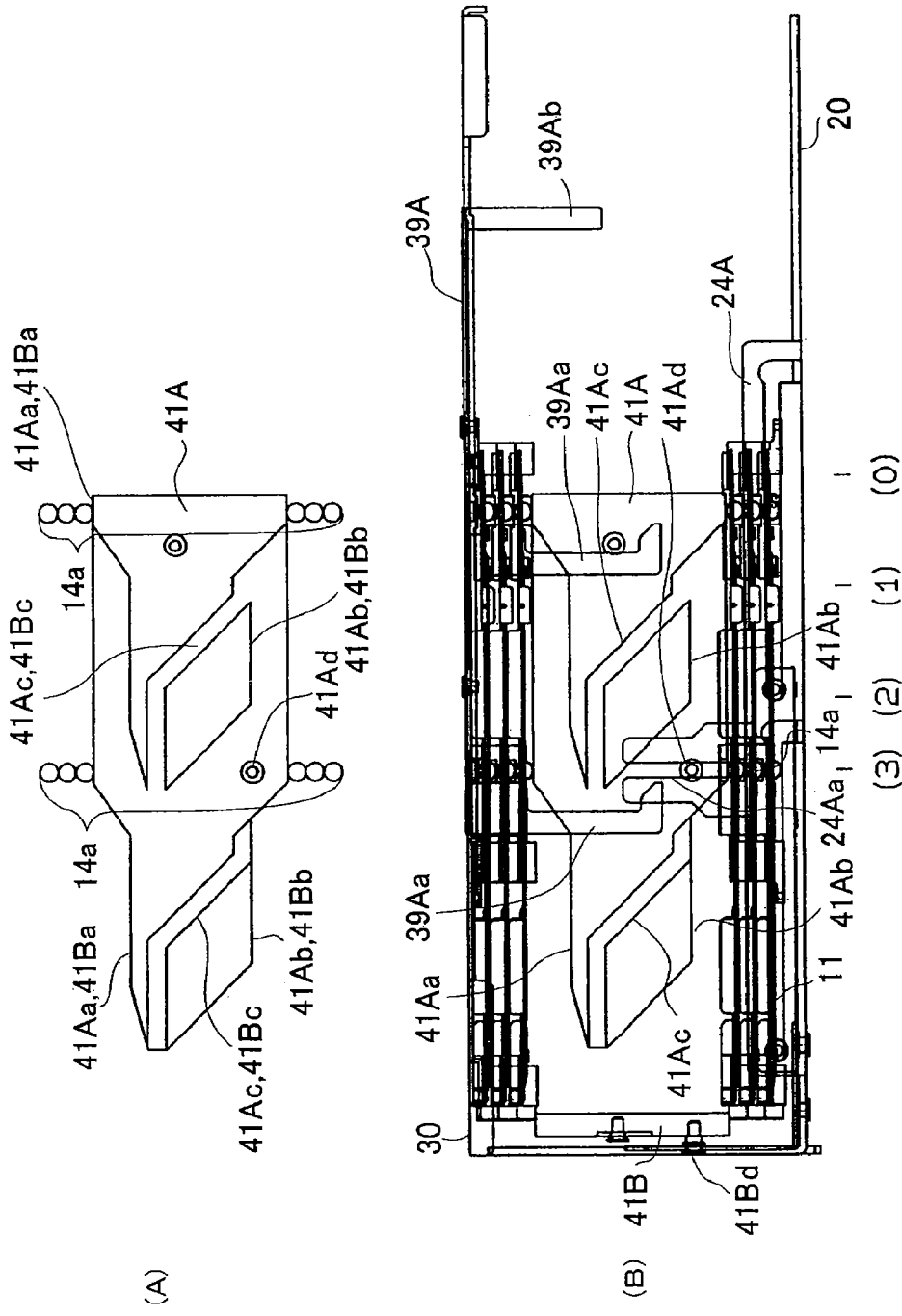
FIG. 59 is an explanatory diagram (A) of the disk selector and protrusion in a holder open position (3) and a transparent rear view (B) of the disk drive in the same state.

In addition, as shown in FIG. 27, when the rotation of the cam gear 21 progresses, the disk selectors 41A and 41B perform a sliding movement to the holder open position (3) and, as shown in FIG. 59, the protuberance 14a of the third holder plate 11 merges with the lower cams 41Ab and 41Bb, the protuberance 14a of the upper holder plates 11 moves to the highest level of the upper cams 41Aa and 41Bb, and the protuberance 14a of the third holder plate 11 and lower holder plates 11 moves to the lowest level of the lower cams 41Ab and 41Bb. As a result, the division of the disk holder 10 progresses further and a space permitting the introduction of the drive base unit 60 is formed above and below the disk D.

Furthermore, because the drive unit drive control cam 21c shown in FIG. 43 moves in accordance with the turning of the cam gear 21, the drive base drive plate 28 performs a sliding movement to the right as a result of pin 28b inserted in the drive unit drive control cam 21c entering the turning position. Thereupon, as shown in FIG. 79, the drive shift plate 68 performs a rightward sliding movement via the pin 68a that is engaged in the hole 28a of the drive base drive plate 28. As a result, as shown in FIG. 88, the drive base 61 is biased via the link shaft 67a that is inserted in the cam hole 68b of the drive shift plate 68 and the cam hole 61a of the drive base 61 and starts to turn in the counterclockwise direction in FIG. 88. Here, as shown in FIG. 93, the link shaft 67a moves the arc-shaped part of the cam hole 40c of the drive chassis unit 40.

When the drive base 61 turns thus, the guide hole 72a is biased by the guide pin 61b of the drive base 61 and, therefore, the drive support plate 72 moves in the clockwise direction. Further, the drive base 61 stops turning when the guide pin 61b reaches the edge of the cam hole 72a. Here, as shown in FIG. 87, the turntable 63 of the drive unit 62 is aligned below the center of disk D that is grasped by the disk stoppers 25A and 25B and loading roller 51 and the clamper ring 64a is aligned above the center of disk D.

Figure 89:
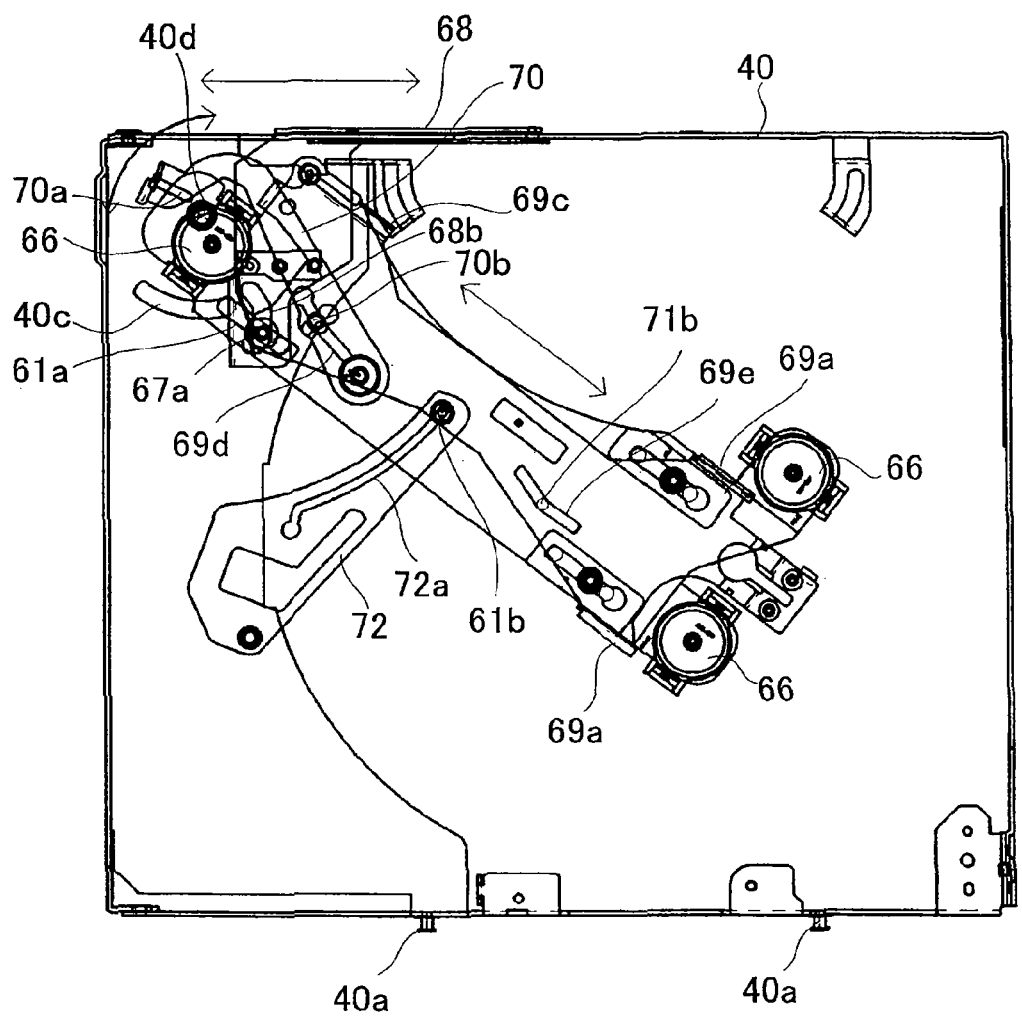
FIG. 89 is a planar view of a floating lock release start state of the drive base of the embodiment in FIG. 1.
Figure 90:
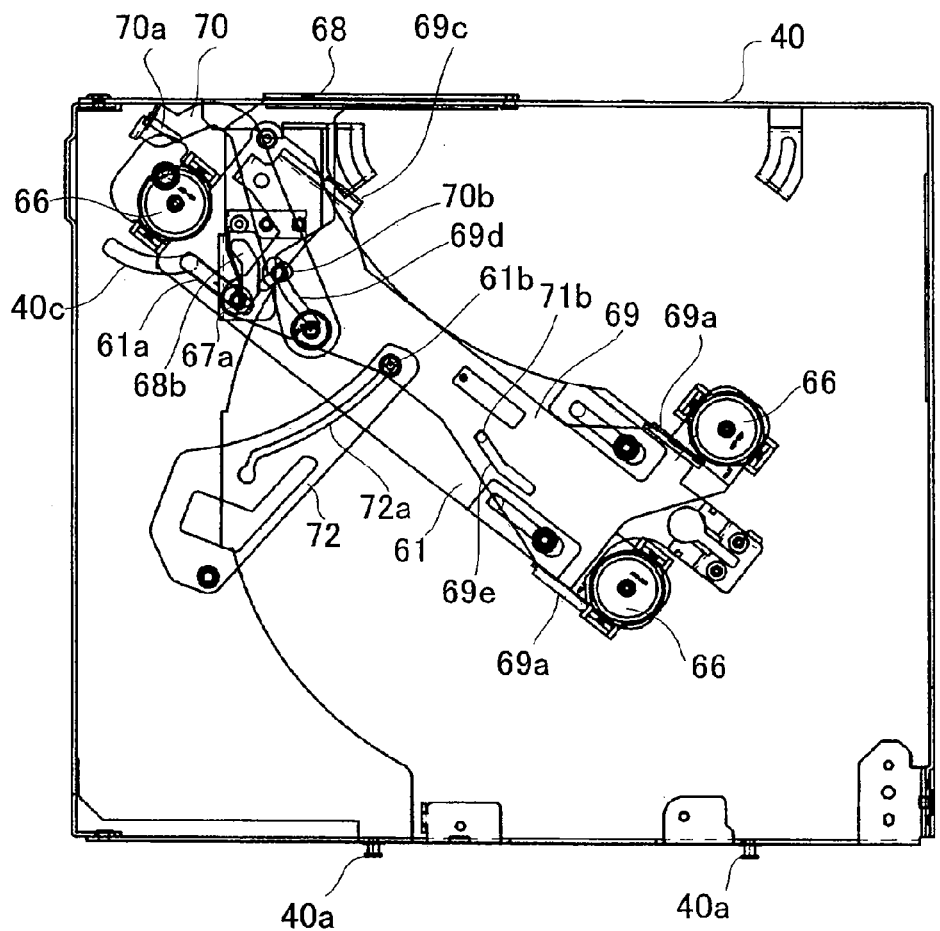
FIG. 90 is a planar view of a floating state of the drive base of the embodiment in FIG. 1.
Figure 94:
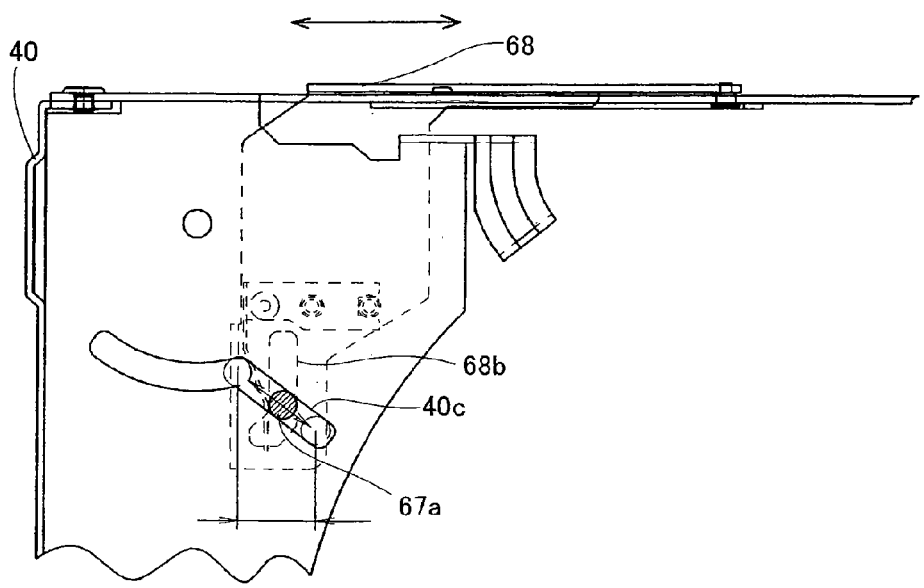
FIG. 94 is a partial planar view of the drive shift plate and link shaft when the floating lock of the drive base unit is released.

In addition, the drive shift plate 68 continuously performs a rightward sliding movement while the drive chassis unit 40 is raised by the drive chassis elevator plates 34A and 34B, and, as shown in FIG. 94, the link shaft 67a of the slide lock plate 69 moves to enter the linear part of the cam hole 40c of the drive chassis unit 40. Thereupon, as shown in FIG. 89 and FIGS. 92A to 92B, the slide lock plate 69 moves and the push-up portion 67b is removed from the bias roller 64c.

Hence, as a result of the spring biasing force, the clamper arm 64 turns downward and the clamper ring 64a pushes, the disk onto the turntable 63.

When the cam gear 21 turns in this manner, in a state where disk D is chucked on the turntable 63, pin 26b of the loading block drive control cam 21e enters release position (0) from the hold position (1) shown in FIG. 39 and, therefore, the right loading block slide plate 26 moves forward. At the same time, as described above, the left loading block slide plate 38 also performs a forward sliding movement and, therefore, the loading block 50 performs a forward sliding movement and disk D is released.

Meanwhile, as a result of the turning of the cam gear 21, the pin 25Fb of the disk stopper plate 25F enters release position (1) from hold position (2) of the disk stopper drive control cam 21d shown in FIG. 33. Hence, the disk stopper link 25C turns in a clockwise direction and disk stopper link 25D turns in a counterclockwise direction via the disk stopper plate 25F and disk stopper plate 25E and the shafts 25Ca and 25Da move (backward) in a direction away from the edge of the disk. As a result of the movement of the shafts 25Ca and 25Da, the disk stoppers 25A and 25B also move backward and the grasping portions 25Ab and 25Bb release disk D.

In addition, as shown in FIGS. 90, 91A to 91C and FIGS. 92A to 92C, the lock groove 69a and locking pin 69b move away from the locking pin 62b and lock groove 62c of the drive unit 62 in accordance with the movement of the slide lock plate 69. Further, the turn lock plate 70 and hook plate 71 also turn and the locking pin 70a and hook 71a move away from the lock groove 62c and pin 62a of the drive unit 62. As a result, the drive unit 62 enters a floating state of being elastically supported by only the damper 66.

Thus, the disk is placed on the turntable 63 such that the circumference thereof is released and the disk is in a floating state, whereupon the pickup unit 65a is moved to the disk inner circumference to rotate the turntable 63. Further, the signal of disk D is read while the pickup unit 65a is moved in the disk radial direction.

2-3. Upon Completion of Disk Playback

A description of the operation of each part when disk D is returned to within the disk holder 10 upon completion of disk playback will be provided next. Further, the following description illustrates an example in which disk D is returned to the third holder plate 11 from the bottom.

That is, because the drive unit drive control cam 21c moves when the cam gear 21 turns in the direction of the initial position shown in FIG. 43 after disk playback, the pin 28b that is inserted in the drive unit drive control cam 21c is biased and, as a result, the drive base drive plate 28 performs a leftward sliding movement. As a result, the drive shift plate 68 performs a leftward sliding movement via the pin 68a that is in engagement with the hole 28a of the drive base drive plate 28.

Thereupon, as shown in FIG. 94, because the link shaft 67a inserted in the cam hole 68b of the drive shift plate 68 is biased to the left, the linear part of the cam hole 40c of the drive chassis unit 40 moves to the left. As a result of the movement of the link shaft 67a, as shown in FIGS. 89, 91C to 91A, and FIGS. 92C to 92A, the slide lock plate 69 to which the link shaft 67a is fixed also performs a sliding movement on the drive base 61. Therefore, the lock groove 69a and locking pin 69b engage with the locking pin 62b and lock groove 62c of the drive unit 62. Further, the turn lock plate 70 and hook plate 71 also turn in accordance with the movement of the slide lock plate 69 and the locking pin 70a and hook 71a engage with the lock groove 62c and pin 62a of the drive unit 62. As a result, the drive unit 62 enters a locked state of being pushed onto and secured to the damper 66.

At the same time, as a result of the cam gear 21 turning to the initial position, as shown in FIG. 40, the pin 26b of the loading block drive control cam 21e enters the hold position (1) from release position (0) and, therefore, the right loading block slide plate 26 moves backward. Meanwhile, because the pin 27b inserted in the cam hole 26c is biased rightward in accordance with the movement of the right loading block slide plate 26, the shutter link plate 27 performs a rightward sliding movement. Thereupon, as mentioned earlier, the turning plate 34 turns and the slide link 36 performs a leftward sliding movement. Hence, the left loading block slide plate 38 performs a backward sliding movement via the turning link 37. As above, when the right loading block slide plate 26 and left loading block slide plate 38 move backward, the loading block 50 performs a backward sliding movement and the loading roller 51 sandwiches disk D as mentioned earlier.

Further, as shown in FIG. 33, the pin 25Fb of the disk stopper plate 25F enters the hold position (2) from the release position (1) of the disk stopper drive control cam 21d. Therefore, the disk stopper links 25C and 25D move (forward) in the direction in which the shafts 25Ca and 25Da approach the edge of the disk via the disk stopper plates 25F and 25E. As a result of the movement of the shafts 25Ca and 25Da, the disk stoppers 25A and 25B also move forward and the edge of disk D is grasped by the grasping portions 25Ab and 25Ba.

Further, the push-up portion 67b abuts against the bias roller 64c as shown in FIGS. 92C to 92A in accordance with the movement of the slide lock plate 69 and, therefore, the clamper arm 64 turns upward against the spring bias force and the clamper ring 64a moves away from disk D. Thus, when the rotation of the cam gear 21 progresses in a state where disk D is grasped by the loading roller 51 and the disk stoppers 25A and 25B and released from the clamper ring 64a and turntable 63, the drive base drive plate 28 performs a sliding movement further to the left. Thereupon, the drive shift plate 68 performs a leftward sliding movement via the pin 68a that is engaged with the hole 28a of the drive base drive plate 28.

As a result, as shown in FIG. 88, the drive base 61 is biased to the left via the link shaft 67a inserted in the cam hole 68b of the drive shift plate 68 and the cam hole 61a of the drive base 61 and turns clockwise. Thereupon, as shown in FIG. 93, the link shaft 67a moves the arc-shaped part of the cam hole 40c of the drive chassis unit 40. When the drive base 61 turns in this manner, the guide hole 72a is biased by the guide pin 61b of the drive base 61 and, therefore, the drive support plate 72 turns counterclockwise. Further, as shown in FIG. 77, the drive base 61 stops turning in a state where the link shaft 67a has reached the edge of the cam hole 40c and returned to the initial position.

As shown in FIGS. 26 and 57, in accordance with the turning of the cam gear 21, the disk selectors 41A and 41B perform a sliding movement to the holder open position (1) and the protuberance 14a of the third holder plate 11 is biased upward by the middle cams 41Ac and 41Bc. Therefore, the third holder plate 11 rises and the center thereof matches the center hole of disk D that is held by the disk stoppers 25A and 25B and the loading roller 51.

As a result of the cam gear 21 turning further, as shown in FIG. 32, the pin 25Fb of the disk stopper plate 25F returns to the release position (1) of the disk stopper drive control cam 21d and, therefore, the disk stopper links 25C and 25D move (backward) in the direction in which the shafts 25Ca and 25Da move away from the edge of disk D via the disk stopper plates 25F and 25E. As a result of the movement of the shafts 25Ca and 25Da, the disk stoppers 25A and 25B also move backward and the grasping portions 25Ab and 25Ba release disk D. Further, the convex portion 25Aa of the disk stopper 25A releases the depressed portion 16a of the disk hold arm 16. Therefore, as shown in FIGS. 3 and 19, the disk hold links 17 and 18 turn and the catches 17a and 17b open and engage with the inner edge of the disk.

In addition, as shown in FIG. 39, the pin 26b of the loading block drive control cam 21e enters the release position (0) from the hold position (1) and the right loading block slide plate 26 therefore moves forward. At the same time, as mentioned earlier, the left loading block slide plate 38 moves forward in accordance with the movement of the slide link 36. As a result, the loading block 50 performs a forward sliding movement and releases disk D.

When disk selectors 41A and 41B perform a sliding movement to initial position (0) as shown in FIGS. 23 and 56 in a state where the disk is placed on holder plate 11 in this manner, the protuberance 14a of the holder plate 11 is released by the disk selectors 41A and 41B and, therefore, as mentioned earlier, the disk holder 10 closes. Further, the drive chassis unit 40 is allowed to move to the height of the initial position by causing the drive chassis elevator plates 34A and 34B to perform a sliding movement.

2-4. When Disk is Unloaded

In addition, the operation of each part when disk D is ejected from the drive will be described. Further, the following description illustrates an example where disk D is ejected from the holder plate 11 that is third from the bottom. That is, when an instruction to eject disk D is inputted in a case where disk D is stored in the third holder plate 11, as shown in FIG. 23, the drive chassis unit 40 is raised and lowered by allowing the drive chassis elevator plates 34A and 34B to move such that the tip of the middle cams 41Ac and 41Bc of the disk selectors 41A and 41B is at a height that matches the protuberance 14a of the third holder plate 11. Here, as shown in FIG. 56, the cam gear 21 is in the initial position.

Further, as shown in FIG. 57, by turning the cam gear 21 in the loading direction, when the disk selectors 41A and 41B are made to perform a sliding movement to the hold open position (1) via the disk selector drive control cam 21b and the disk select plates 24D, 24C, 24B, and 24A by allowing the cam gear 21 to move in the loading direction, as shown in FIG. 58, the protuberance 14a of the third holder plate 11 enters the middle cams 41Ac and 41B, the protuberance 14a of the fourth holder plate 11 and higher holder plates 11 is pushed up by the upper cams 41Aa and 41Ba and the protuberance 14a of the second holder plate 11 and lower holder plates 11 is pushed down by the lower cams 41Ab and 41Bb. Therefore, a gap permitting the insertion of the disk D and loading block 50 is formed above and below the third holder plate 11.

In addition, the drive chassis unit 40 is moved by moving the drive chassis elevator plates 34A and 34B so that the gap above the third holder plate 11 and the position of the loading roller 51 match the disk slot 31. Further, when the cam gear 21 is moved thus, the pin 26b of the loading block drive control cam 21e enters the hold position (2) from the release position (0) and, therefore, the right loading block slide plate 26 moves backward, as shown in FIG. 41. Meanwhile, because the shutter link plate 27 performs a rightward sliding movement in accordance with the movement of the right loading block slide plate 26, as mentioned earlier, the shutter opening/closing plate 33 moves to the left via the turning plate 34 and slide link 36.

As a result of the movement of the shutter opening/closing plate 33, as shown in FIG. 47, the shutter 32 rises to open the disk slot 31. At the same time, the slide link 36 causes the left loading block slide plate 38 to perform a backward sliding movement via the turning link 37. As mentioned earlier, as a result of the right loading block slide plate 26 and left loading block slide plate 38 moving backward, the loading block 50 performs a backward sliding movement and the loading roller 51 sandwiches the disk. At the same time, the loading roller 51 enters a state in which same can be turned by the loading motor M3. Further, as shown in FIGS. 2 and 60, the end of the bias guide 55 abuts against the right edge of disk D.

Meanwhile, the pin 25Fb of the disk stopper plate 25F enters the hold position (2) from the release position (1) of the disk stopper drive control cam 21d shown in FIG. 32. Therefore, disk stopper links 25C and 25D move (forward) in the direction in which the shafts 25Ca and 25Da approach the edge of disk D via the disk stopper plates 25F and 25E. As a result of the movement of the shafts 25Ca and 25Da, as shown in FIGS. 2 and 20, the disk stoppers 25A and 25B also move forward and the edge of disk D is grasped by the grasping portions 25Ab and 25Ba of the disk stoppers 25A and 25B. Furthermore, the convex portion 25Aa of the disk stopper 25A biases the depressed portion 16a of the disk hold arm 16 and, therefore, the disk hold links 17 and 18 turn and catches 17a and 17b close to release the inner edge of disk D.

In addition, because the disk selectors 41A and 41B perform a sliding movement to the holder open position (2) in accordance with the turning of the cam gear 21 in the loading direction as shown in FIG. 25, the protuberance 14a of the third holder plate 11 falls as a result of being biased downward by the middle cams 41Ac and 41Bc as shown in FIG. 58, and the gap below the disk widens further.

As described earlier, when the loading roller 51 rotates in the reverse direction in a state where the disk has been released by the holder plate 11, the disk starts to move in the direction of ejection from the disk holder 10. In this process, the disk is guided obliquely down and to the left from a planar perspective as shown in FIG. 60 while the right edge of disk D is biased by the bias guide 55. However, as a result of the left edge of disk D abutting against the oblique face 42a of the disk guide 42, the course of disk D is changed in a direction that is orthogonal to the loading roller 51 and, as shown in FIG. 61, disk D passes between the clamper ring 64a that is retracted upward and the turntable 63 below the clamper ring 64a. In addition, disk D is ejected from the disk slot 31 that is open as a result of shutter 32 being raised and disk D can be completely removed by withdrawing disk D, which is protruding from the drive, by hand.

E. Effect

According to the present embodiment above, disk D is held in the holder plate 11 by allowing catches 17a and 18a of the disk hold links 17 and 18 respectively to engage with and disengage from the center hole of disk D and, therefore, in comparison with a case where the outer periphery of disk D is held, the centers of the respective disks D can be easily matched to enable the correct alignment. Therefore, disk D can be reliably chucked by means of the clamper ring 64a and the turntable 63 that are introduced above and below disk D.

Further, because the circumference of disk D of the holder plate 11 does not require a space for the members and mechanisms for holding the outer edge of disk D, miniaturization of the disk holder 10 is possible. In addition, the convex portion 25Aa of the disk stopper 25A biases the depressed portion 16a of the disk hold arm 16, whereby the disk hold links 17 and 18 are turned via the disk hold arm 16 to enable the catches 17a and 18b to engage with and disengage from the center hole of disk D. Therefore, the disk holding mechanism is simplified and miniaturization of the disk holder 10 is permitted. Thus, because miniaturization of the disk holder 10 is possible, the overall size of the disk drive can also be miniaturized.

Furthermore, the hole 11a is formed in a position corresponding with the center hole of disk D in the holder plate 11 and the disk hold links 17 and 18 are provided in hole 11a. Therefore, the gap between individual holder plates 11 when the holder plates 11 are arranged stacked can be reduced, whereby an increase in the thickness is suppressed and there is no increase in the stacking direction.

Further, the arc of the holder plate 11 is formed shorter than a semi-circle of the disk D. Therefore, the space required by the disk holder 10 in the disk drive can be reduced. In addition, when the disk holder 10 is formed with this shape, disk D can be grasped by moving the loading roller 51 forward and backward upon dividing the disk holder 10. Therefore, in order to pass disk D from the holder plate 11 to the turntable 63, a complex operation is not required of a specified holder plate 11 and the cam shape and operation of the disk selectors 41A and 41B are simple.

As a result of the disk stopper 25A grasping disk D and the convex portion 25A biasing the depressed portion 16a of the disk hold arm 16 when the disk holder 10 is divided, the catches 17a and 18b of the disk hold links 17 and 18 release the center hole of disk D, whereby the retraction of the holder plate 11 in order to playback the desired disk D can be performed smoothly.

Furthermore, when the desired disk D is transferred from the holder plate 11 of the disk holder 10 to the turntable 63 of the drive unit 62, disk D can be temporarily grasped by the loading roller 51 of the loading block 50 and the grasping portions 25Ab and 25Bb of the disk stoppers 25A and 25B of the disk stopper mechanism 25. As a result, the holder plate 11 may only perform an operation to retract from the desired disk D, the cams and drive mechanism can be simplified, and the transfer operation can be performed smoothly. Further, because it is possible to introduce drive unit 62 by retracting the holder plates 11 above and below the desired disk D, reliable chucking that sandwiches disk D from above and below can be executed by means of the turntable 63 and clamper ring 64a, which results in resistance to vibration.

In addition, because the loading block 50, which comprises the loading roller 51 for feeding the disk D, is also used in grasping disk D, a reduction in the number of members and miniaturization of the disk drive can be implemented in comparison with a case where a special disk-grasping member is provided. In particular, because the loading roller 51 itself moves in the direction of contact with and separation from disk D, disk D can be fed and grasped reliably and, when disk D is played back, the loading roller 51 can be retracted from disk D. Therefore, collision with disk D can be prevented by securing a vibration-preventing stroke that permits a change of position when vibrations occur.

Further, the grasping portions 25Ab and 25Bb of the disk stoppers 25A and 25B of the disk stopper mechanism 25 grasp the outer edge of disk D, whereby reliable alignment is permitted without obstructing the holder plate 11 or drive unit 62. In particular, the combination of the grasping of disk D by the disk stopper mechanism 25 and the grasping of disk D by the loading roller 51 permits more reliable and accurate alignment, which results in resistance to vibration.

Further, the disk holding mechanism 15 of the holder plate 11 releases the center hole of disk D in sync with the grasping of disk D by the loading roller 51 and disk stopper mechanism 25, and the disk holding mechanism 15 holds the center hole of disk D in sync with the release of disk D by the loading roller 51 and disk stopper mechanism 25. It is therefore possible to perform a transition operation from the disk release of the disk holder 10 to a disk alignment state and then storage of the disk in the disk holder 10, as well as the reverse operation, smoothly and reliably.

In addition, the clamper ring 64a of the drive unit 62 releases the center hold of disk D in sync with the grasping of disk D by the loading roller 51 and disk stopper mechanism 25 and the clamper ring 64a crimps and holds the center hole of disk D on the turntable 63 in sync with the release of disk D by the loading roller 51 and disk stopper mechanism 25. Hence, the transition operation from a state of alignment of disk D to the placing of disk D on the drive unit 62, disk release of the drive unit 62, to a state where disk D is aligned, as well as the reverse operation, can be smoothly and reliably performed.

In addition, according to the present embodiment, in the series of operations of disk storage in the disk holder 10, the introduction of the drive unit 62 and disk installation, the withdrawal of the drive unit 62, re-storage of the disk in the disk holder 10, and disk ejection from the disk holder 10, because alignment of the disk by the loading roller 51 and disk stoppers 25A and 25B is performed each time the disk holder 10 is divided, smooth movement can be achieved while preventing the collision of the holder plate 11 and drive unit 62 by means of a relatively simple constitution.

F. Second Embodiment

In the above embodiment, the disk D in the disk holder 10 is held as a result of the catches 17a and 18a of the disk hold links 17 and 18 engaging with the center hole of disk D. Further, when the disk D to be played back and ejected is selected, disk D is sandwiched between the loading roller 51 and roller guide in accordance with the movement of the loading block 50. However, here, when vibrations from outside the disk drive are applied, the outer periphery of disk D vibrates vertically and there is the possibility of a shift from the position between the loading roller 51 and roller guide. In order to combat this, although a constitution in which the width between the loading roller 51 and roller guide is widened by providing an opening/closing mechanism to open and close the loading roller 51 and roller guide so that the disk D can be sandwiched even when there is a swing width of disk D may be considered. However, the disk drive increases in size because a space for securing the opening/closing mechanism and opening/closing width is required. Therefore, an embodiment that makes it possible sandwich disk D reliably during vibration while retaining miniaturization due to a small footprint will be described hereinbelow.

Constitution

Figure 98:
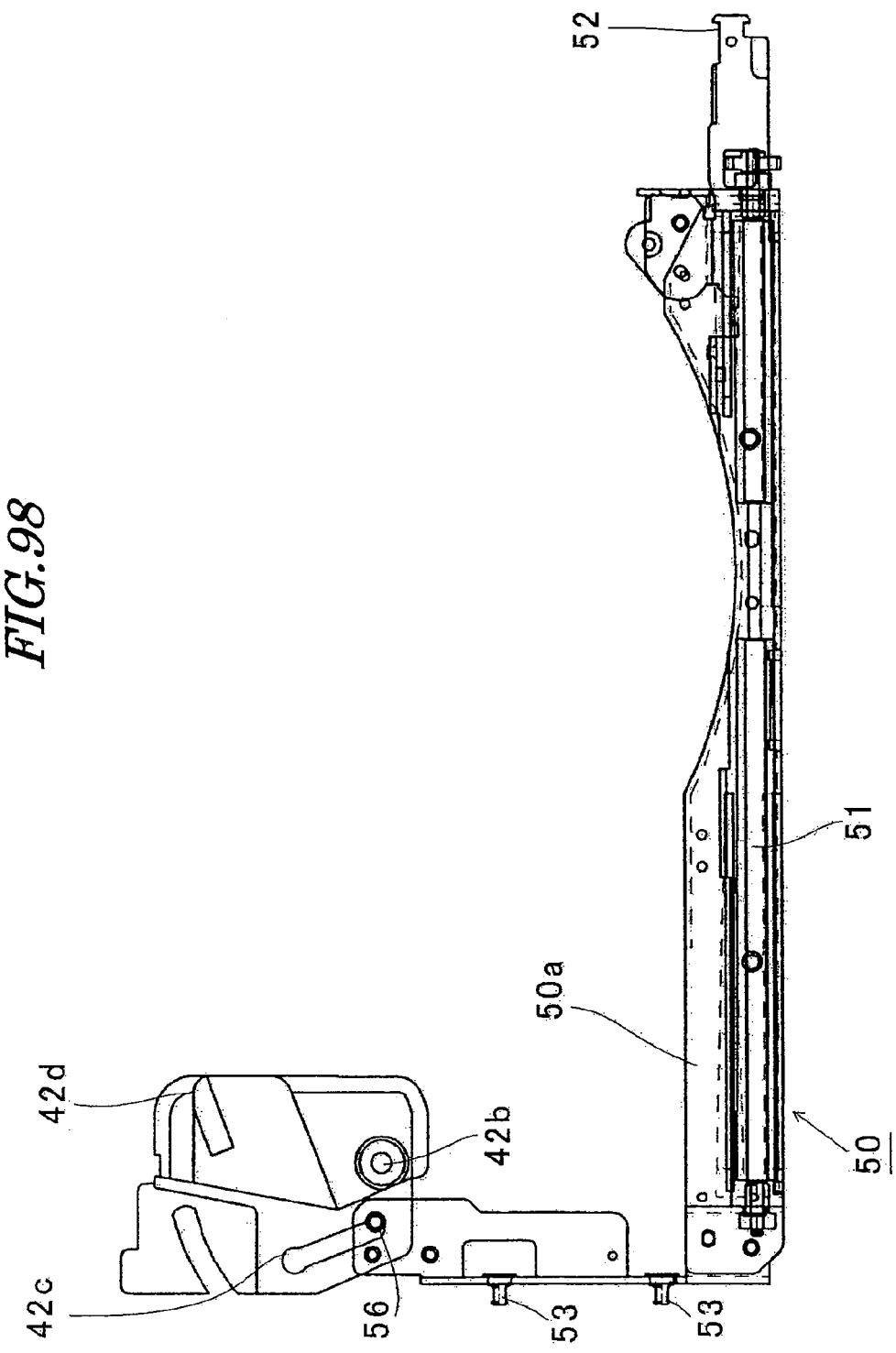
FIG. 98 is a planar view of a state where the loading block and disk guide are retracted from the disk of a second embodiment of the present invention.

First, the constitution of the present embodiment will be described. A description relating to constituent parts that are the same as those of the embodiment above is omitted here. That is, in the present embodiment, as shown in FIG. 98, the disk guide 42 that is provided in the drive chassis unit 40 is constituted to be capable of turning about an axis 42b at the front end of the disk guide 42. Further, a cam hole 42c in which the pin 56 of the loading block 50 (described subsequently) is inserted is formed in the disk guide 42. In addition, the disk guide 42 is provided with a holding portion 42d that grasps or releases disk D by contacting or moving away from the left edge of disk D.

Figure 99:
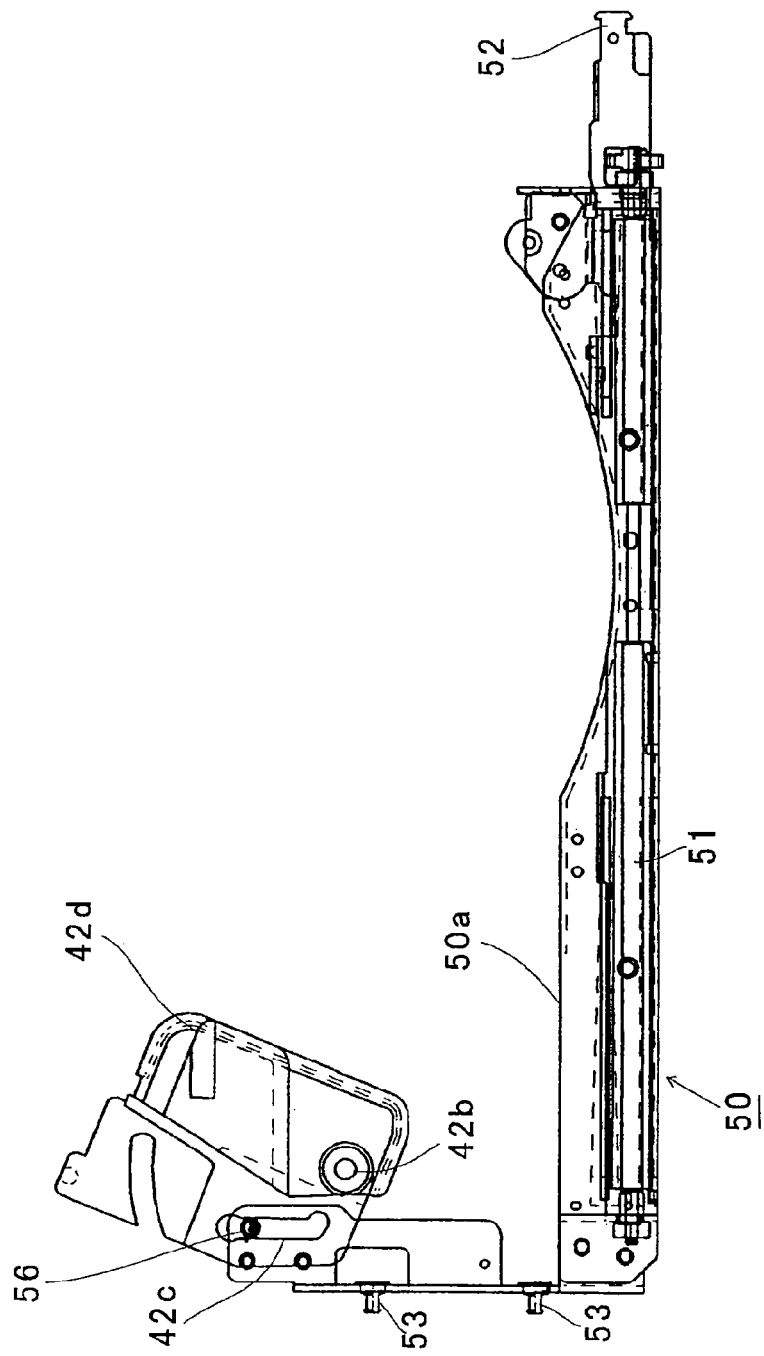
FIG. 99 is a planar view of a disk contact state of the embodiment in FIG. 98.

Meanwhile, the loading block 50 comprises a horizontal plate toward the back on the left-hand side and the pin 56 is provided at the rear end of the plate. Further, as shown in FIG. 98, the pin 56 is at the front end of the cam hole 42*c* when the loading block 50 is at the front (direction of retraction from disk D) and the holding portion 42*d* of the disk guide 42 is in a position separate from disk D. Further, as shown in FIG. 99, pin 56 is at the rear end of cam hole 42*c* when the loading block 50 is at the rear (direction in which disk D is sandwiched) and disk guide 42 turns such that the holding portion 42*d* thereof grasps the left edge of disk D.

Figure 100:
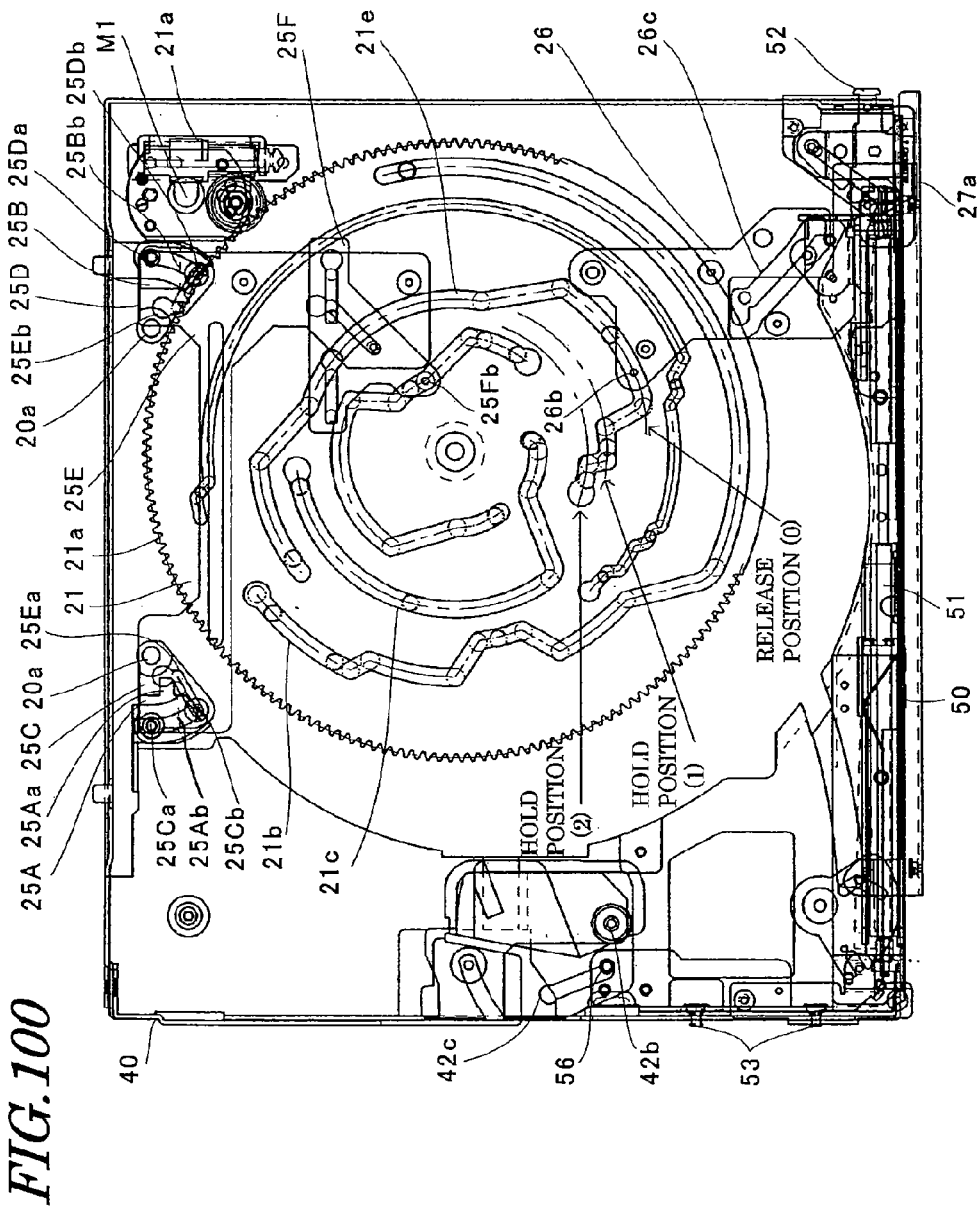
FIG. 100 is a planar view of a state where a member group driven by the cam gear is retracted from the disk of the embodiment in FIG. 98.
Figure 101:
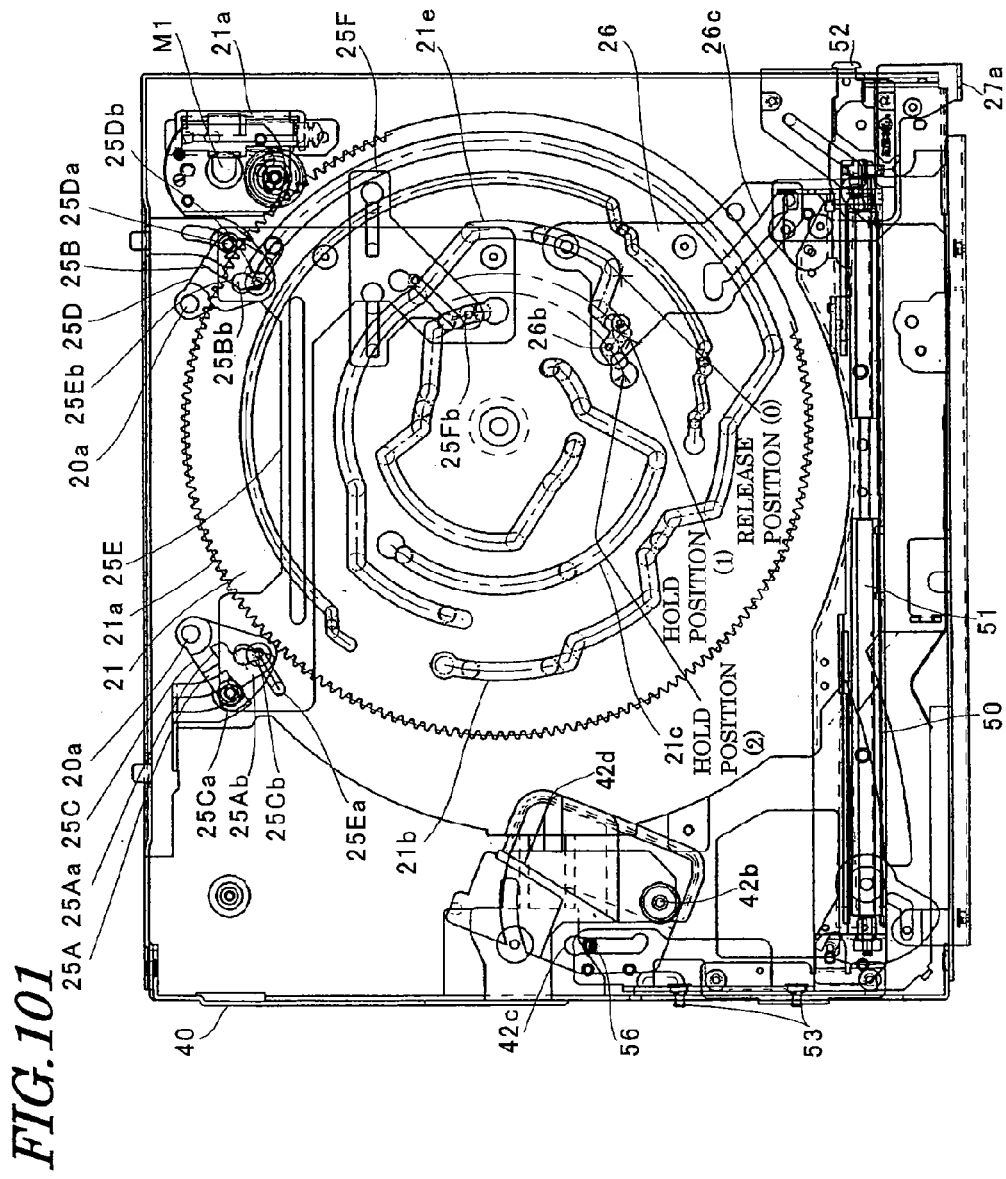
FIG. 101 is a planar view of the disk contact state in FIG. 100.

Thereafter, as shown in FIGS. 100 and 101, cam gear 21 is formed having the disk selector drive control cam 21*b*, drive unit drive control cam 21*c*, disk stopper drive control cam 21*d*, and loading block drive control cam 21*e*. However, in order to be able to control the loading block 50 and the disk stoppers 25A and 25B by means of timing that will be described subsequently, the respective positions and lengths and so forth thereof are established. In particular, even when the cam gear 21 turns in the loading direction, a hold position (1) like that used for turning in the playback direction is established for the loading block drive control cam 21*e*.

Action

Figure 102:
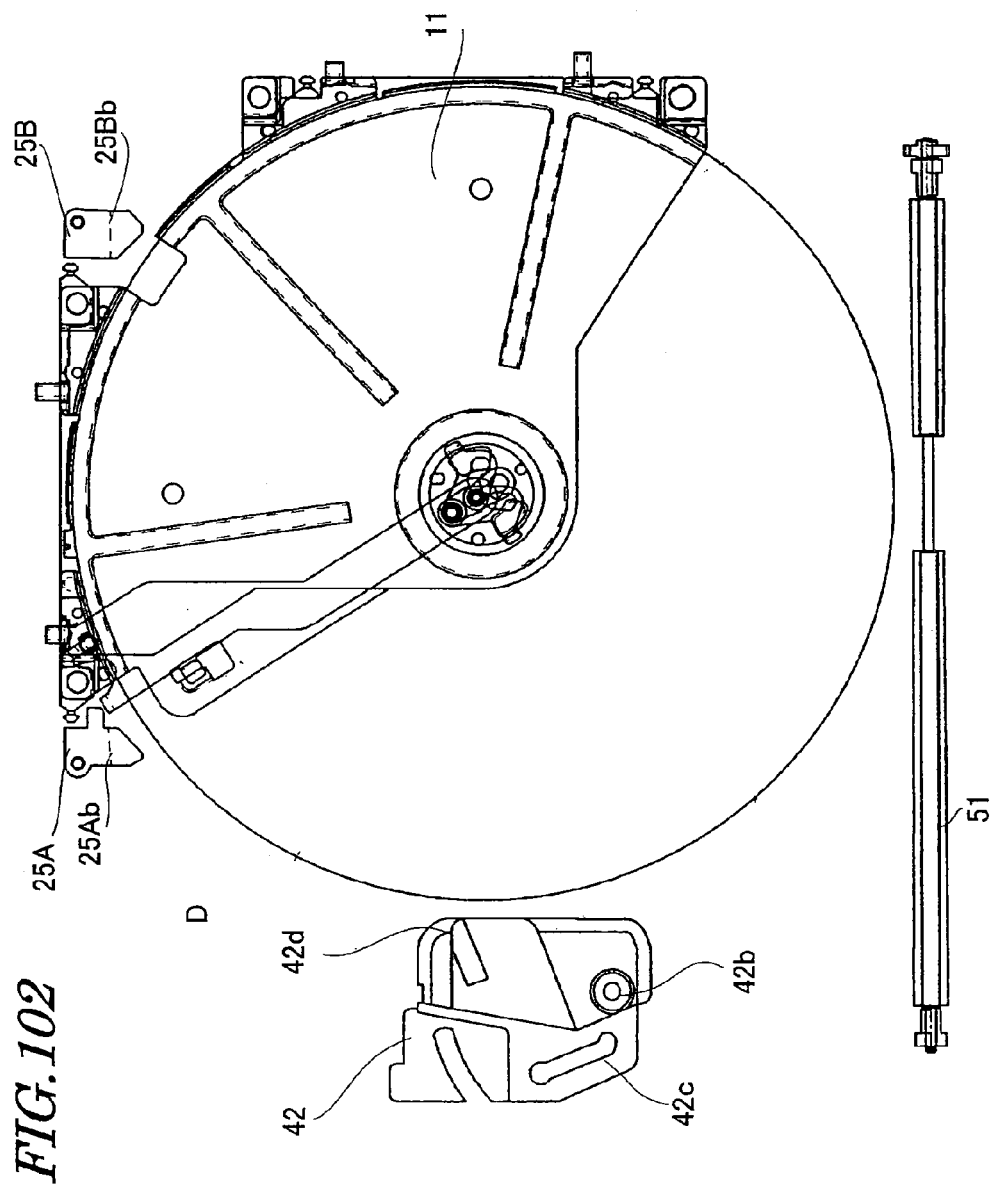
FIG. 102 is a planar view of a state where the disk is stored in the holder plate of the embodiment in FIG. 98.
Figure 103:
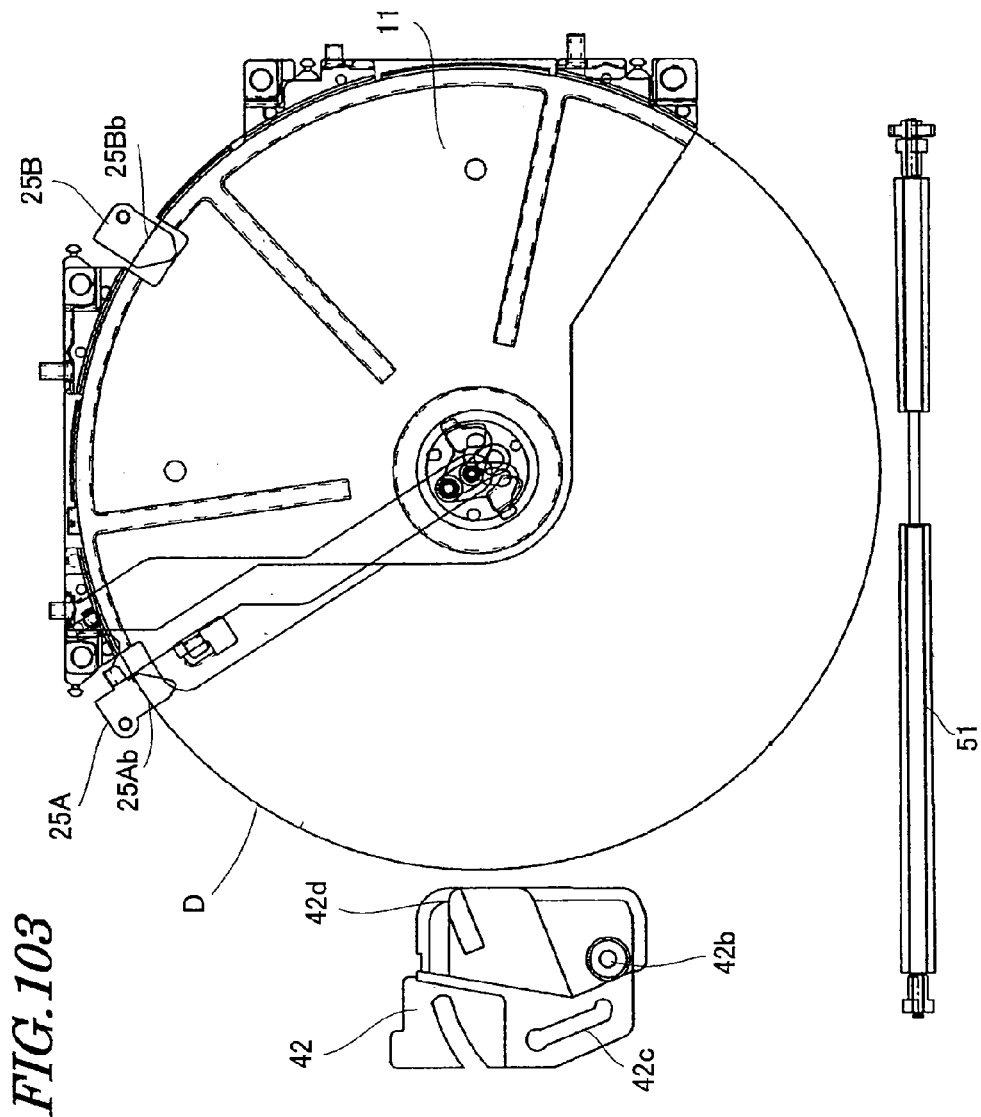
FIG. 103 is a planar view of a state where the disk is held by the disk stopper in FIG. 102.

The action of the present embodiment with a constitution like that described above is as follows. Further, the operation that is described hereinbelow is the operation performed when disk D is sandwiched by the loading roller 51 in order to select the disk D to be played back and ejected, and other operations are the same as those of the above embodiment. That is, as shown in FIG. 102, from a state where disk D is stored in the holder plate 11 of the disk holder 10, the disk selectors 41A and 41B are made to perform a sliding movement by allowing the cam gear 21 to turn by operating the cam gear drive motor M1 and the disk holder 10 is opened in order to allow the loading roller 51 to be inserted above the selected holder plate 11 (holder open position (1)). In this state, as shown in FIG. 103, disk D is held by allowing the disk stoppers 25A and 25B to move in the direction of contact with disk D by operating the cam gear drive motor M1 continuously.

Figure 104:
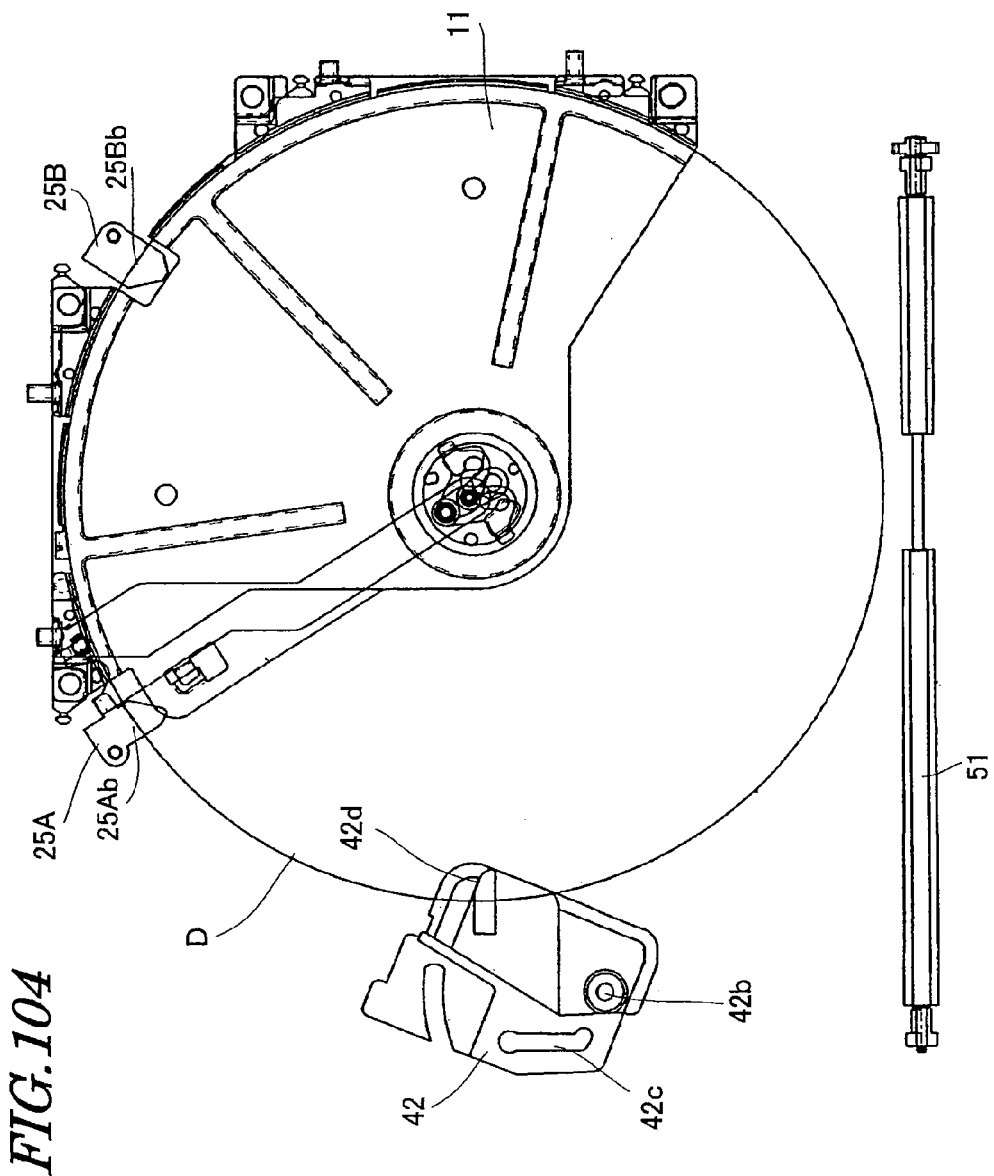
FIG. 104 is a planar view of a state where the disk is held by the disk stopper and disk guide in FIG. 102.
Figure 105:
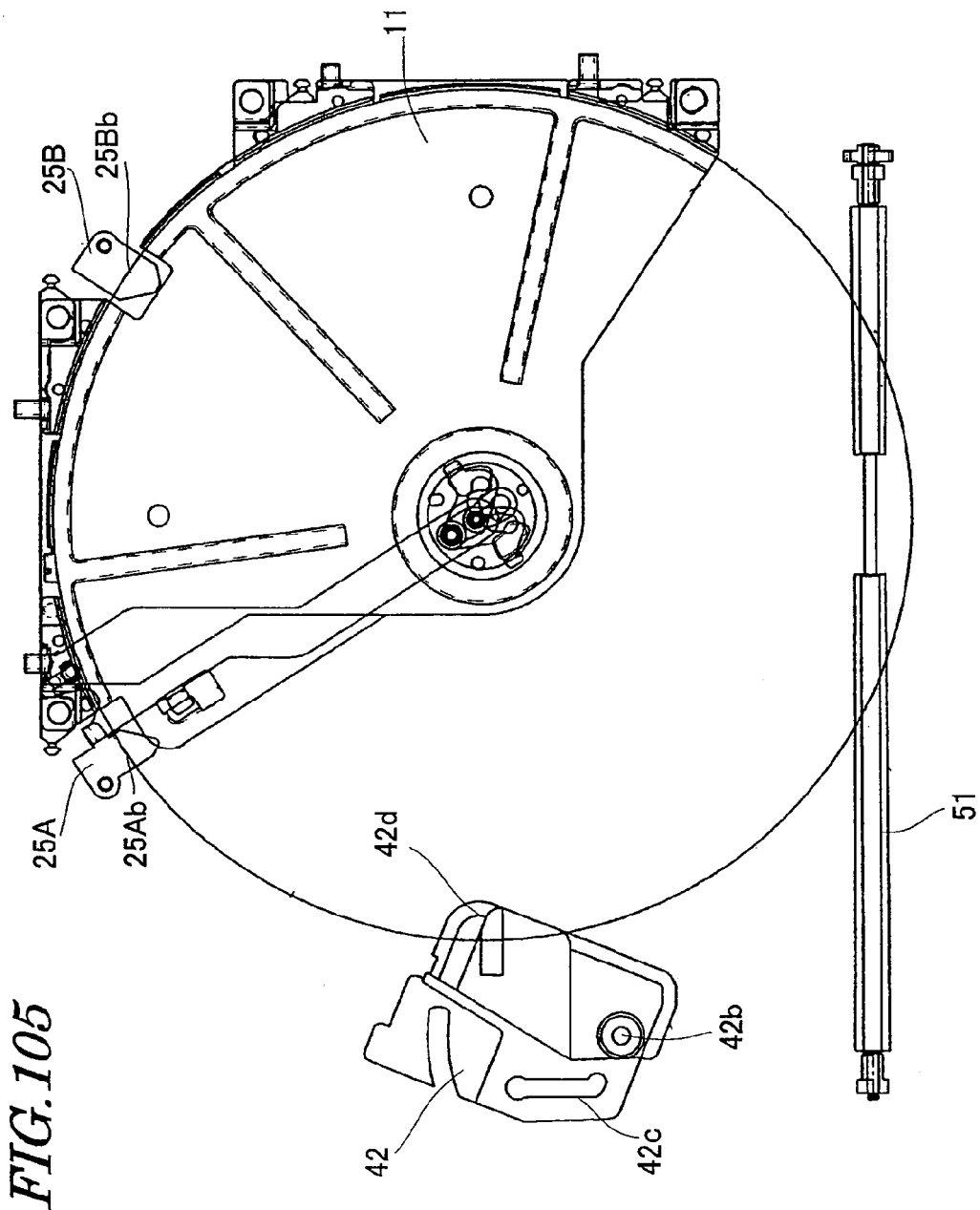
FIG. 105 is a planar view of a state where the disk is held by the disk stopper, disk guide and loading roller in FIG. 102.

Thereafter, because the cam gear 21 continues to turn, the loading block 50 starts to move (backward) toward the disk holder 10. Therefore, in accordance with this movement, as shown in FIG. 104, disk guide 42 turns and the holding portion 42*d* thereof grasps the left edge of disk D. Because the cam gear 21 turns further, as shown in FIG. 105, the loading block 50 moves backward and the loading roller 51 sandwiches disk D.

Figure 106:
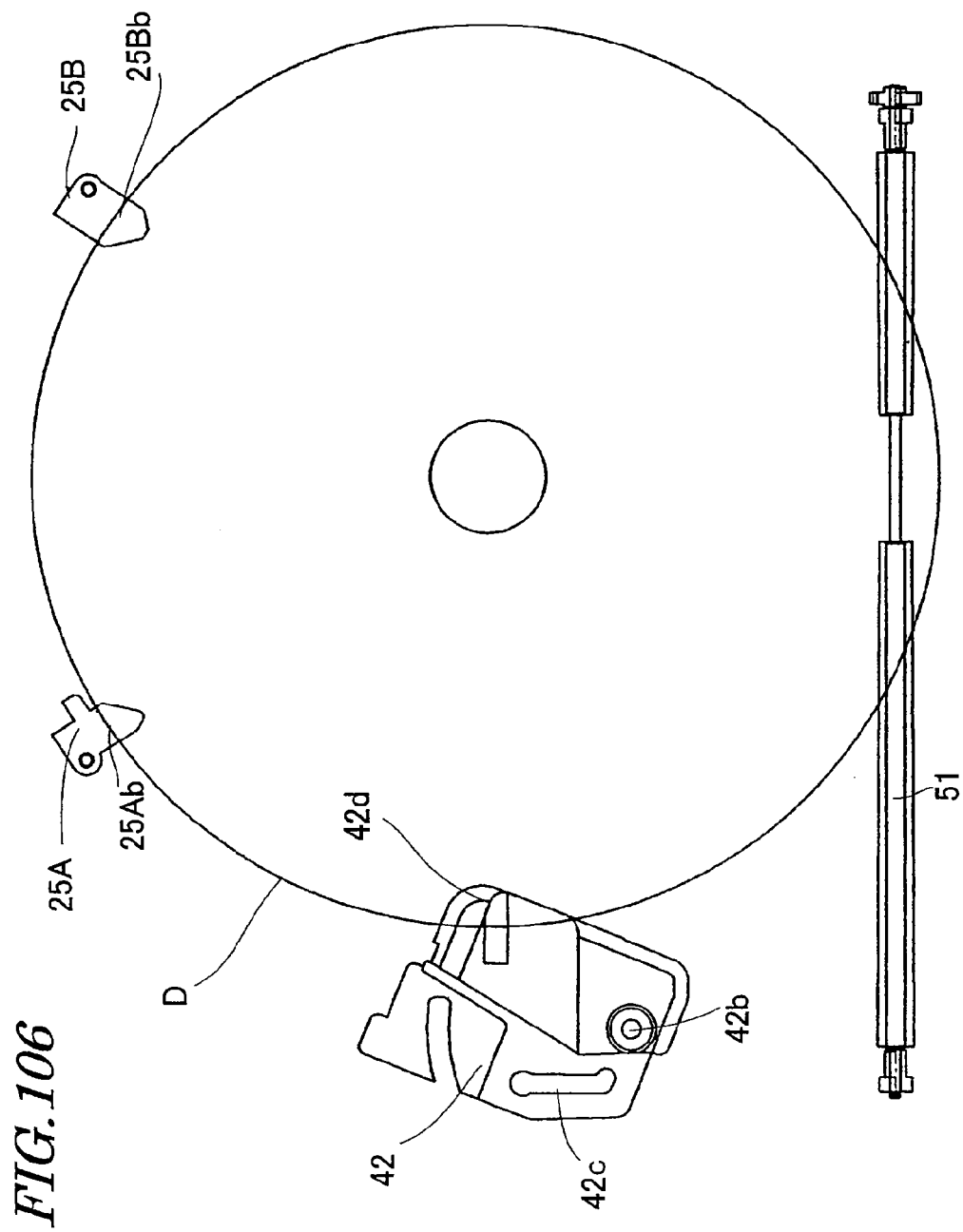
FIG. 106 is a planar view during retraction of the holder plate in FIG. 102.

Further, as mentioned above, when the disk stopper 25A turns, the convex portion 25Aa biases the depressed portion 16*a* of the disk hold arm 16. Hence, the disk hold links 17 and 18 turn and catches 17*a* and 17*b* close and release the disk inner edge. Thus, when the cam gear 21 turns further in a state where disk D is grasped by the disk stoppers 25A and 25B and loading roller 51 and the disk inner edge is released, as shown in FIG. 106, the holder plate 11 is retracted from disk D and enters a state permitting disk playback or disk ejection as per the earlier embodiment.

That is, after disk D has been held in order starting with the disk holder 10, followed by the disk stoppers 25A and 25B, the disk guide 42, and, finally, the loading roller 51, disk D can be transferred to the drive unit 62 as per the earlier embodiment and disk D can be ejected from the disk drive. After disk D has been played back, disk D is held by means of an order like that above and disk D can be transferred from the drive unit 62 to the disk holder 10. Further, although the turning direction of the cam gear 21 when disk D is ejected is the reverse of the turning direction during playback, disk D can be held in an order similar to the order above by the loading block drive control cam 21*e* and disk D can be ejected by the loading roller 51 as shown in FIG. 101.

Effect

According to the present embodiment as described above, when disk D is transferred between the drive unit 62 and disk holder 10, disk D is held in order starting with the component for which the amount of swing of disk D that is caused by vibration is smallest when disk D is ejected from the disk holder 10, that is, in the order of the disk stoppers 25A and 25B, disk guide 42, and then the loading roller 51. Hence, the outer circumference of disk D is not free and swing due to vibration is prevented and the transfer and ejection of disk D can be reliably performed.

Moreover, a mechanism for opening and closing the gap between the loading roller 51 and roller guide need not be provided and a constitution in which disk D is inserted between the loading roller 51 and roller guide may be used as is. Hence, miniaturization arising from a small footprint can be retained. In addition, the disk guide 42 turns in the direction of contact with disk D only when disk D moves, being retracted at other times, whereby the disk guide 42 is not an obstacle to other members and space can be used effectively.

G. Further Embodiments

The present invention is not limited to the embodiments above. For example, the mechanism for biasing the disk hold arm is not limited to that exemplified by the above embodiments. As long as biasing is permitted in sync with the disk grasping means, any mechanism may be employed. Further, the size, number, and shape of the disk hold links, disk hold arm, and holder plates are not limited to those illustrated in the above embodiments.

Further, the specific constitution of the disk feed mechanism, the mechanism for driving the disk feed mechanism, and the mechanism for moving in the direction of contact with and separation from the disk is not limited to that exemplified by the above embodiment, nor is the specific constitution of the disk stopper mechanism and the mechanism for driving the disk stopper mechanism limited to that exemplified in the above embodiment.

In addition, in the above embodiment, the disk is sandwiched between the loading roller and loading plate. However, the constitution may be such that the disk is sandwiched by a pair of loading rollers that are arranged above and below the disk. In this case, the loading rollers are desirably elastically held in mutual contact but a constitution in which one roller is fixed and the other is elastically held or both rollers are elastically held may be considered. Further, as long as the means is capable of feeding a disk, a component other than a loading roller may be employed. In addition, the specific constitution of the disk holder and drive unit and so forth is also not limited to that exemplified by the above embodiments.

Moreover, the specific numeric values of each member as well as the disposition gaps and operating distances and so forth are also arbitrary. Further, the present invention is applied to a disk drive that handles CDs and DVDs and so forth but is not limited to such a disk drive. The present invention is also widely applicable to plate-like recording media. In addition, the present invention is suited to an in-vehicle disk drive but is not limited thereto, being applicable to a variety of disk drives such as stationary-type or portable-type disk drives.

INDUSTRIAL APPLICABILITY

As illustrated hereinabove, the present invention makes it possible to provide a disk holder, disk alignment mechanism and disk drive that make it possible to perform accurate alignment of a disk in a disk drive.

The invention claimed is:

1. A disk alignment mechanism for aligning a desired disk when the desired disk is transferred between a disk holder capable of housing a plurality of disks and a drive unit for playing back the desired disk, comprising:
   disk grasping means for grasping only the desired disk by separating the same from the disk holder in a space that is produced by dividing the disk holder, wherein
   a disk holding mechanism, which releases a center hole of the disk in sync with a grasping of the disk by the disk grasping means and holds the center hole of the disk in sync with the release of the disk by the disk grasping means, is provided in the disk holder.

2. The disk alignment mechanism according to claim 1, wherein a disk clamping mechanism, which releases the center hole of the disk in sync with the grasping of the disk by the disk grasping means and holds the center hole of the disk in sync with the release of the disk by the disk grasping means, is provided in the drive unit.

3. The disk alignment mechanism according to claim 2, wherein the disk grasping means comprises a disk feed mechanism that feeds a disk into and out of the disk holder.

4. The disk alignment mechanism according to claim 3, wherein the disk feed mechanism comprises a loading roller that is provided to be able move in the direction of contact with and separation from the desired disk.

5. The disk alignment mechanism according to claim 4, wherein the disk grasping means comprises a disk stopper mechanism that grasps the outer edge of the desired disk.

6. The disk alignment mechanism according to claim 1, wherein the disk grasping means comprises a disk feed mechanism that feeds a disk into and out of the disk holder.

7. The disk alignment mechanism according to claim 6, wherein the disk feed mechanism comprises a loading roller that is provided to be able to move in the direction of contact with and separation from the desired disk.

8. The disk alignment mechanism according to claim 7, wherein the disk grasping means comprises a disk stopper mechanism that grasps the outer edge of the desired disk.

9. The disk alignment mechanism according to claim 1, wherein the disk grasping means comprises a disk feed mechanism that feeds a disk into and out of the disk holder.

10. The disk alignment mechanism according to claim 1, wherein the disk feed mechanism comprises a loading roller that is provided to be able to move in the direction of contact with and separation from the desired disk.

11. The disk alignment mechanism according to claim 1, wherein the disk grasping means comprises a disk stopper mechanism that grasps the outer edge of the desired disk.

* * * * *